Figure 1:
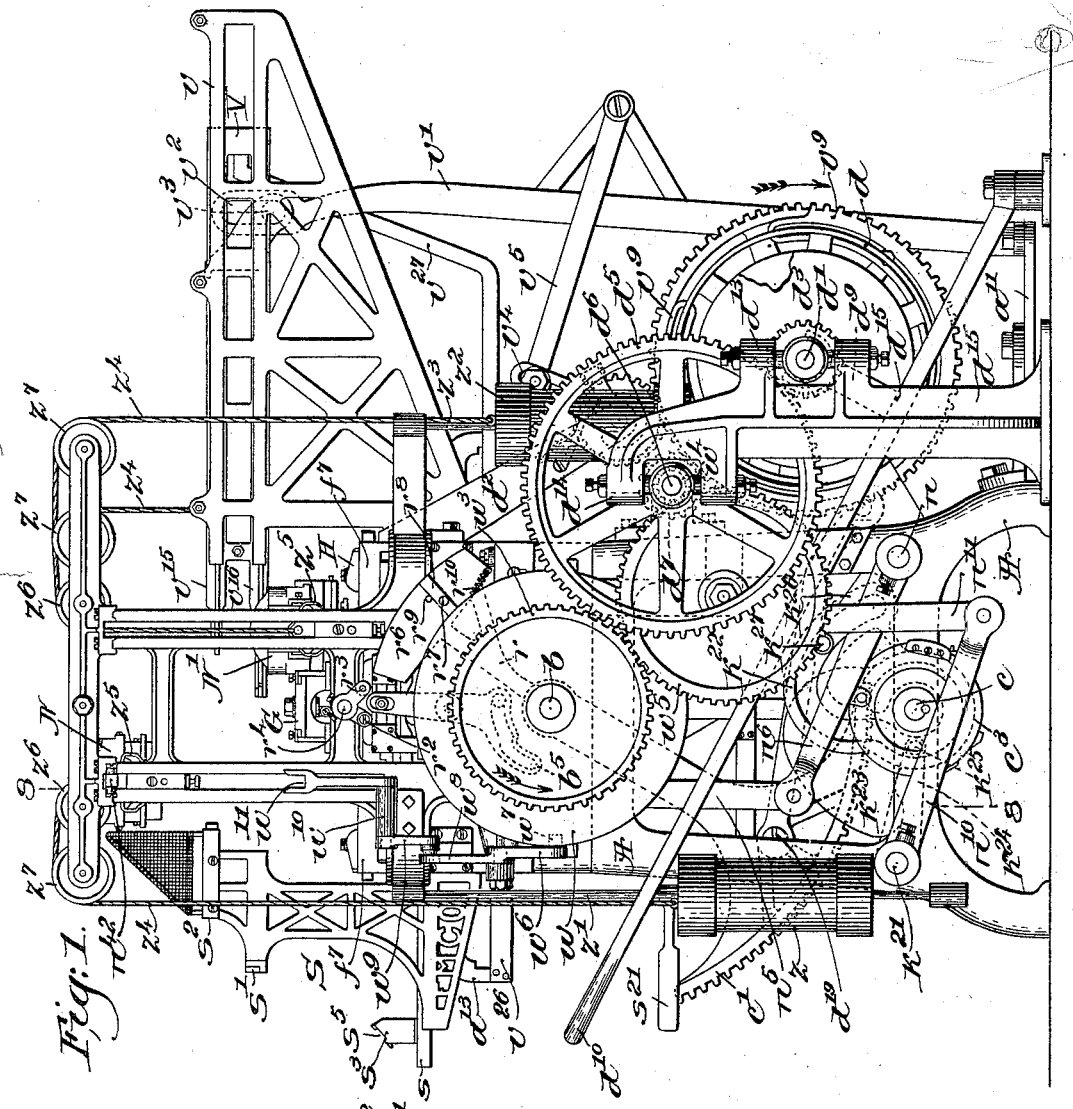

(No Model.) 25 Sheets—Sheet 1.

A. D. FENWICK.
MACHINE FOR FORMING AND FOLDING COLLAR BLANKS OR THE LIKE.

No. 606,528. Patented June 28, 1898.

Witnesses.
Edward F. Allen
Thomas J. Drummond

Inventor:
Albert D. Fenwick
by Crosby Gregory
attys.

(No Model.)

A. D. FENWICK.

MACHINE FOR FORMING AND FOLDING COLLAR BLANKS OR THE LIKE.

No. 606,528. Patented June 28, 1898.

25 Sheets—Sheet 4.

(No Model.) 25 Sheets—Sheet 5.
A. D. FENWICK.
MACHINE FOR FORMING AND FOLDING COLLAR BLANKS OR THE LIKE.
No. 606,528. Patented June 28, 1898.

Witnesses
Edward H. Allen
A. C. Harmon

Inventor:
Albert D. Fenwick
by Crosby Gregory
Attys.

(No Model.) 25 Sheets—Sheet 6.
A. D. FENWICK.
MACHINE FOR FORMING AND FOLDING COLLAR BLANKS OR THE LIKE.
No. 606,528. Patented June 28, 1898.
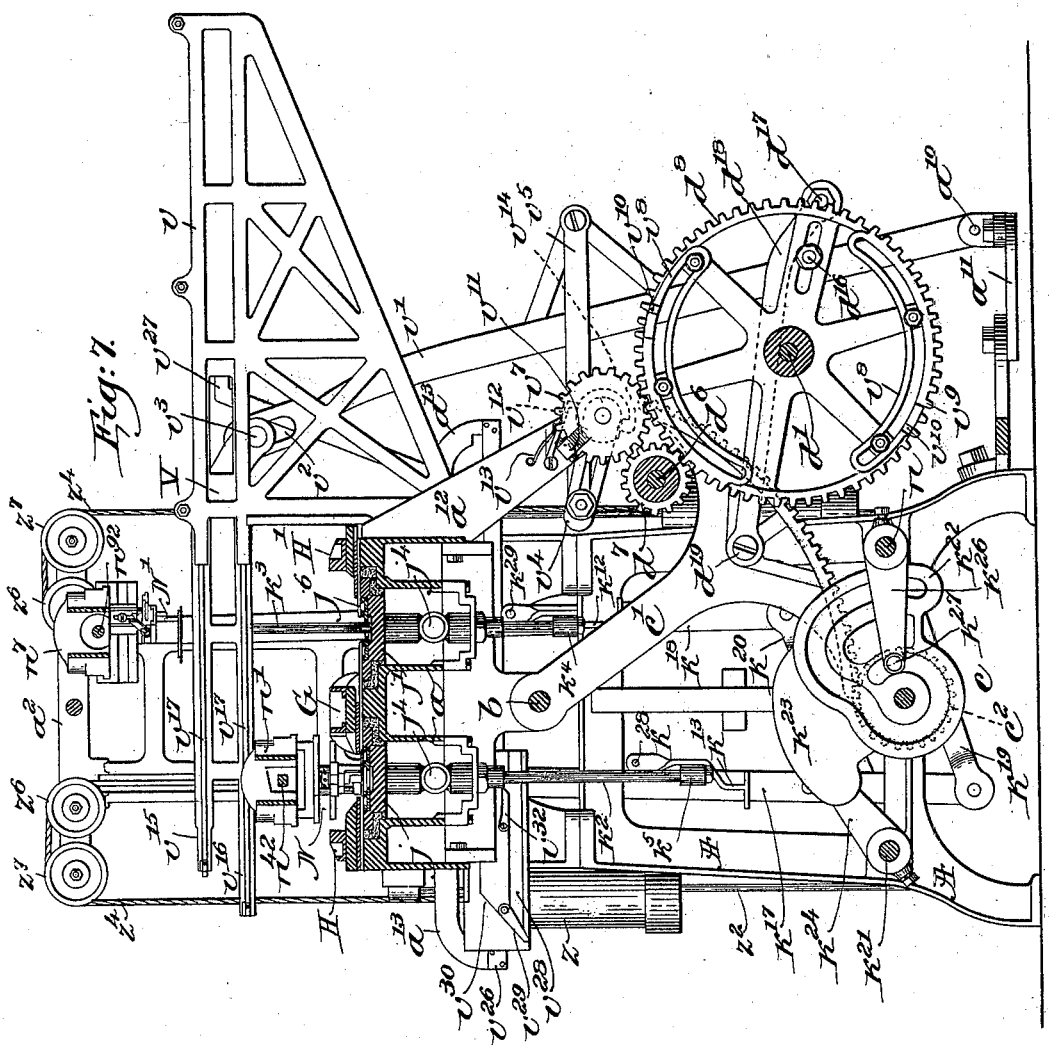
Witnesses
Edward G. Allen.
A. C. Harmon
Inventor:
Albert D. Fenwick.
by Crosby Gregory
attys.

(No Model.) 25 Sheets—Sheet 7.
A. D. FENWICK.
MACHINE FOR FORMING AND FOLDING COLLAR BLANKS OR THE LIKE.
No. 606,528. Patented June 28, 1898.
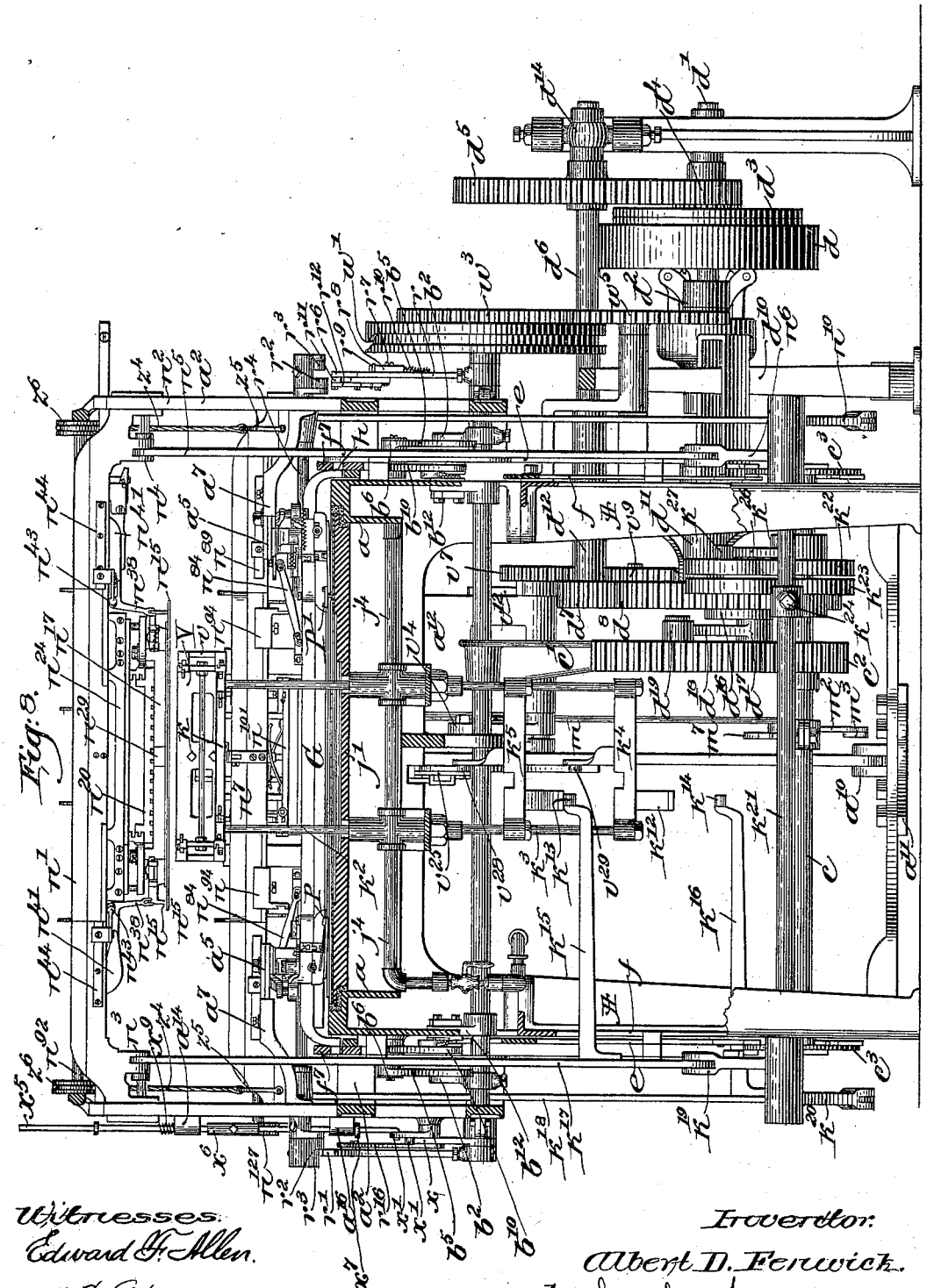

(No Model.)
25 Sheets—Sheet 8.
A. D. FENWICK.
MACHINE FOR FORMING AND FOLDING COLLAR BLANKS OR THE LIKE.
No. 606,528.   Patented June 28, 1898.
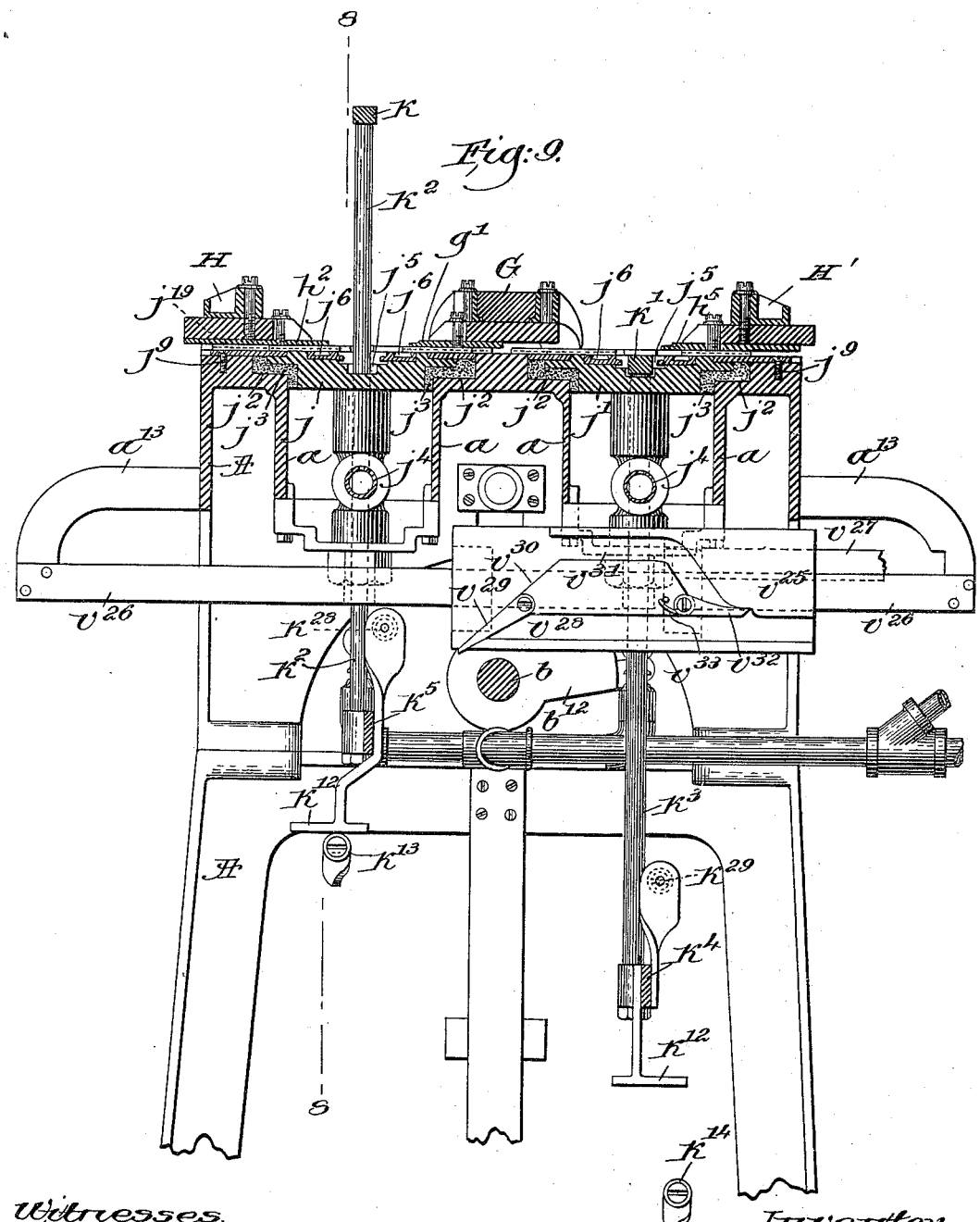
Witnesses.
Edward F. Allen.
Thomas J. Drummond.
Inventor:
Albert D. Fenwick.
by Crosby Gregory
attys.

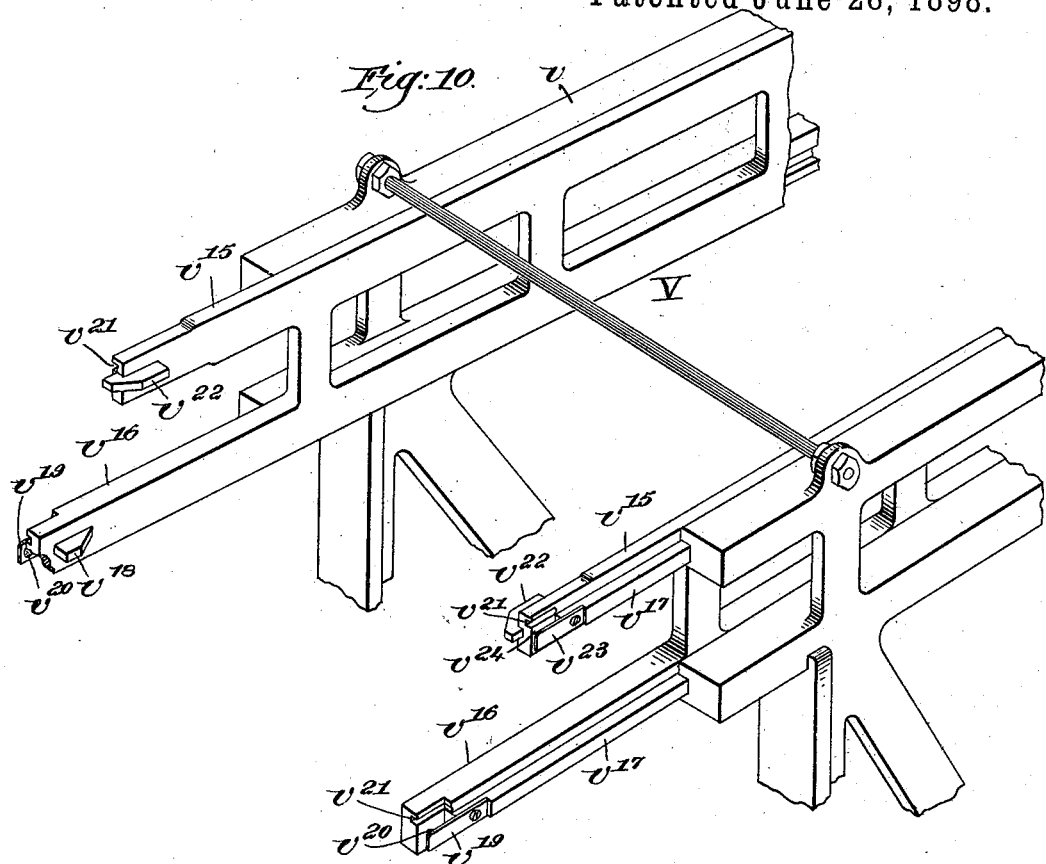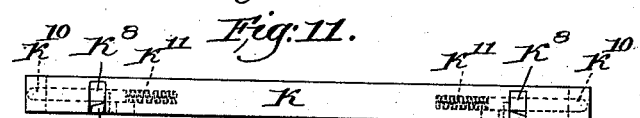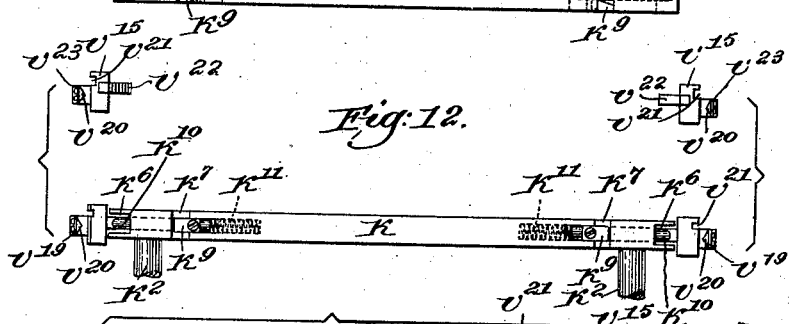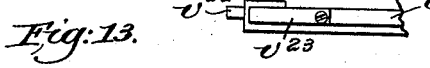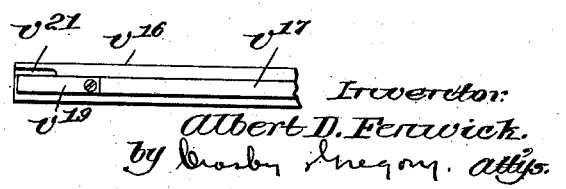

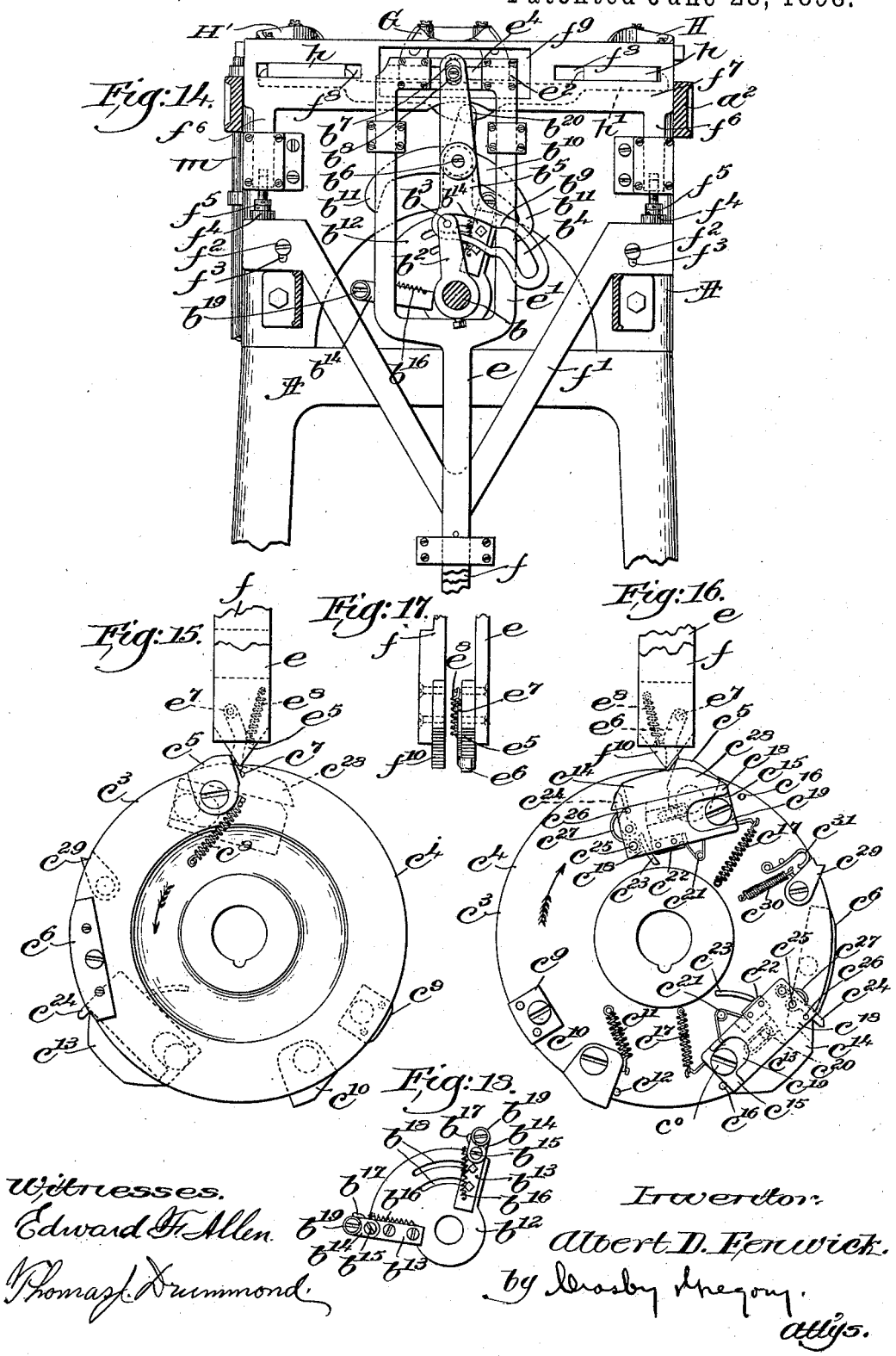

(No Model.)

25 Sheets—Sheet 11.

A. D. FENWICK.
MACHINE FOR FORMING AND FOLDING COLLAR BLANKS OR THE LIKE.

No. 606,528. Patented June 28, 1898.

Witnesses.
Edward F. Allen.
Thomas J. Drummond.

Inventor:
Albert D. Fenwick.
by Dudley Gregory
attys.

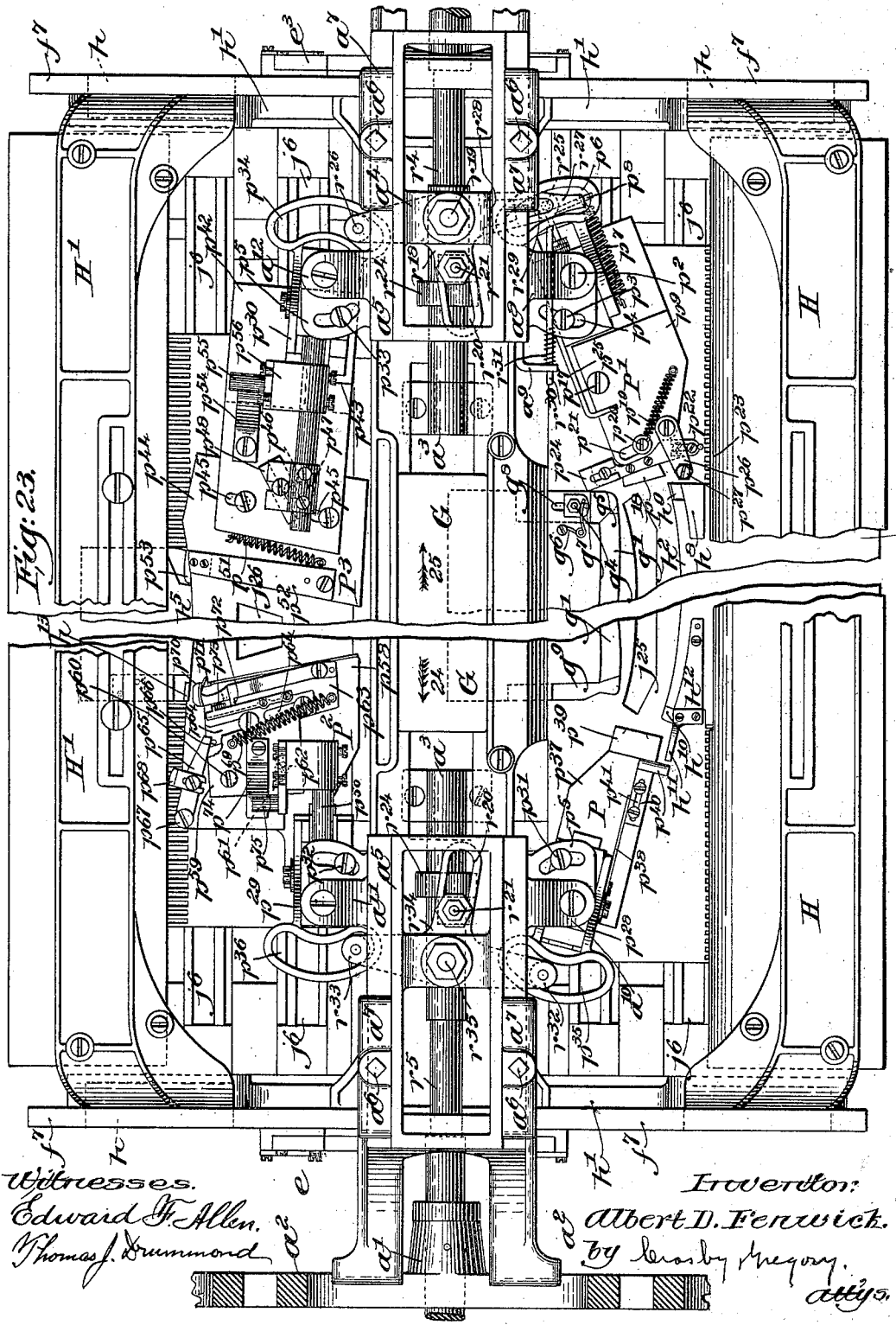

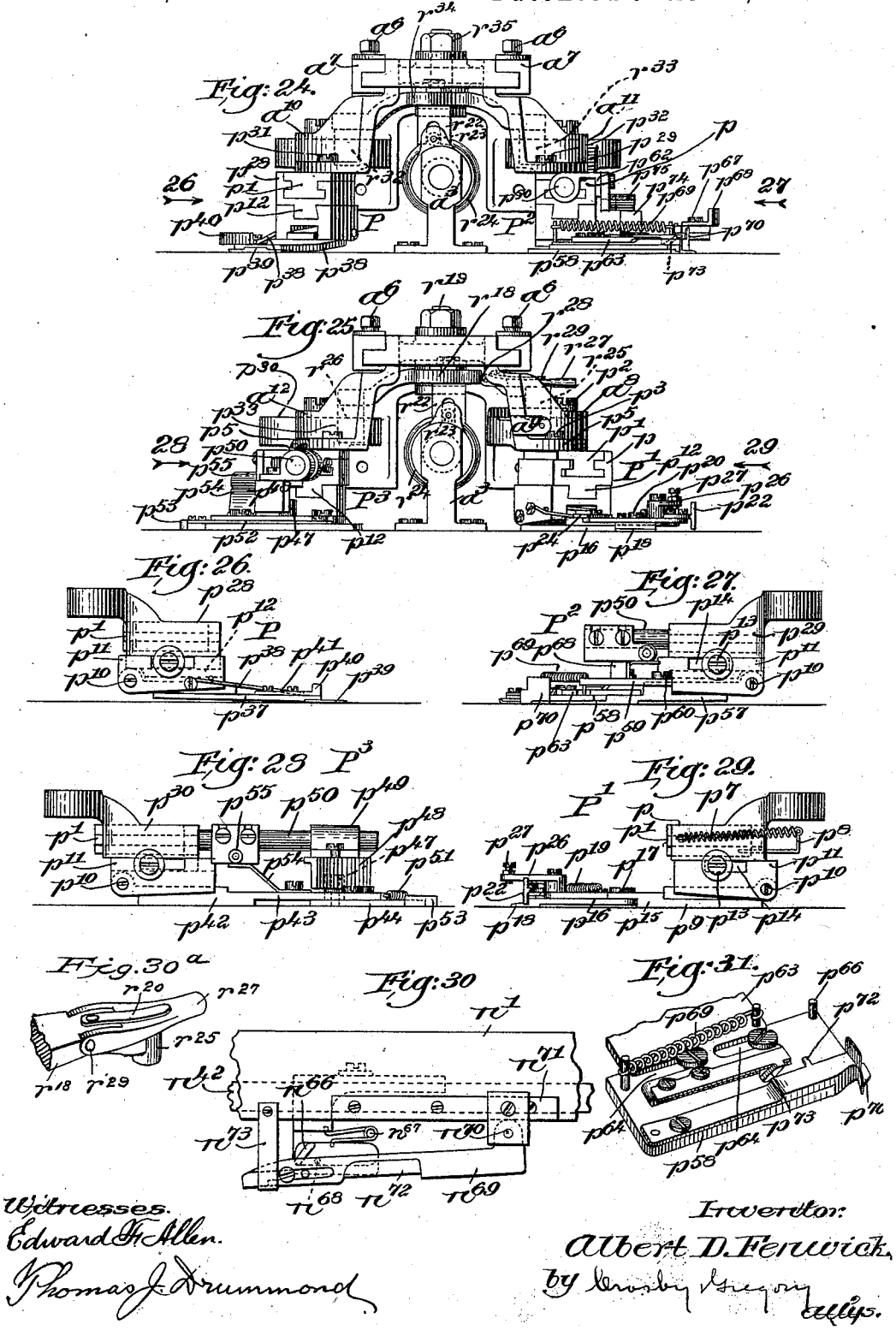

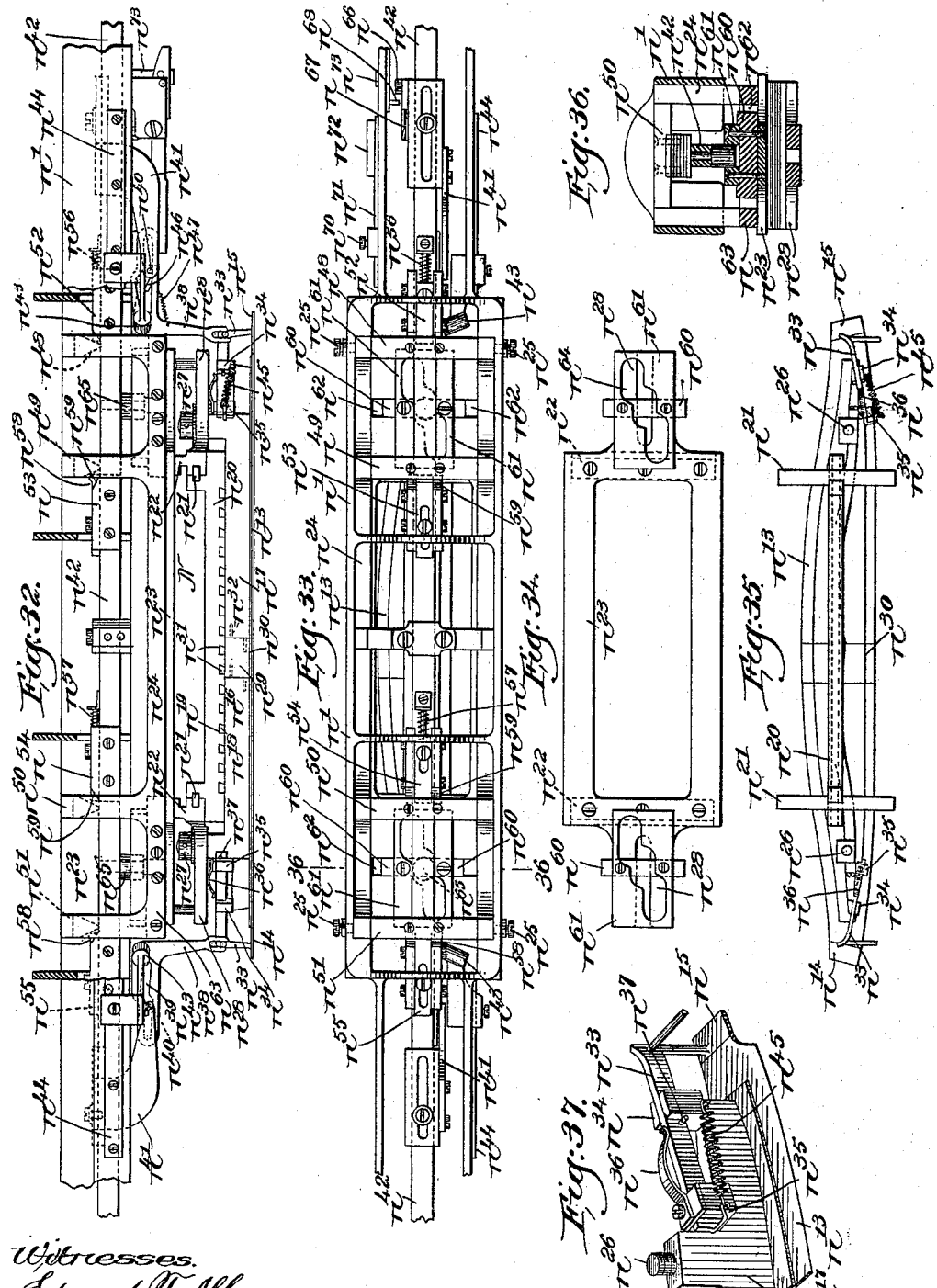

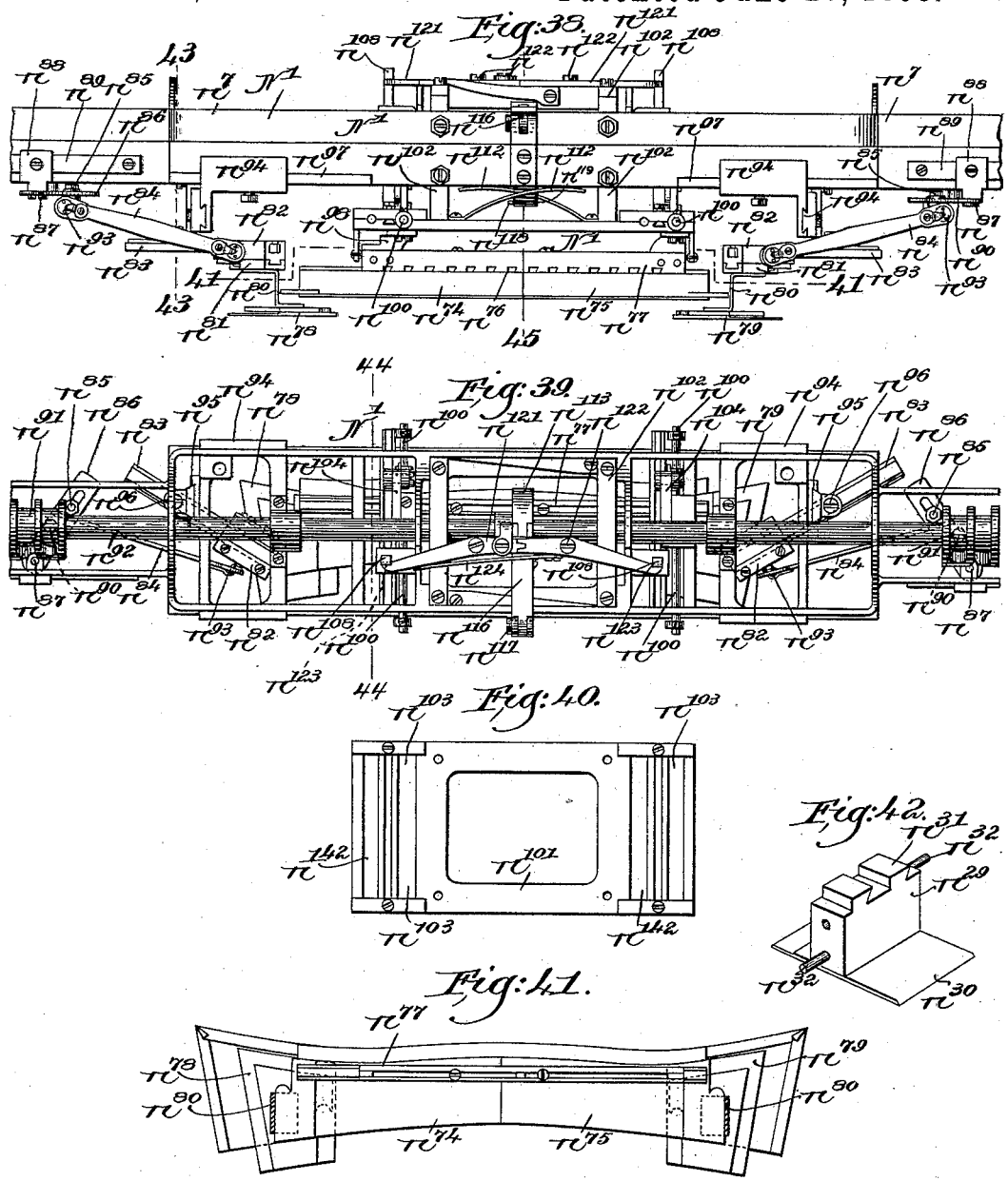

(No Model.) 25 Sheets—Sheet 16.
A. D. FENWICK.
MACHINE FOR FORMING AND FOLDING COLLAR BLANKS OR THE LIKE.
No. 606,528. Patented June 28, 1898.
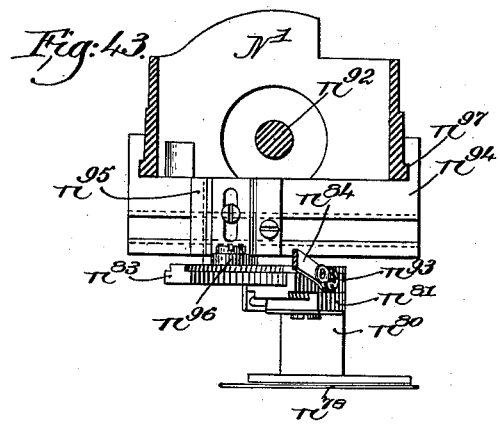
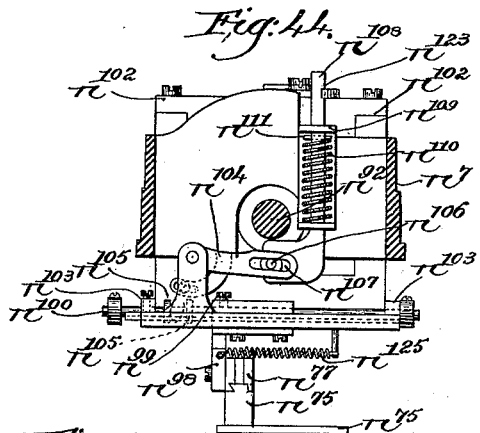 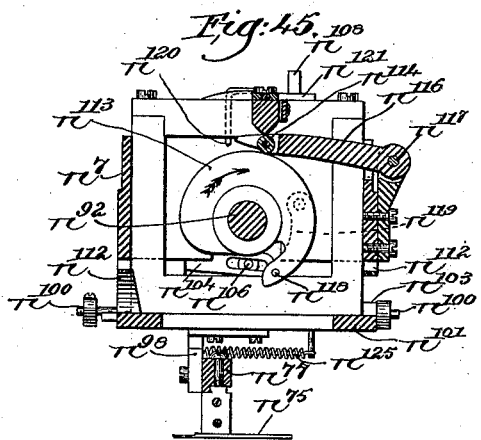
  
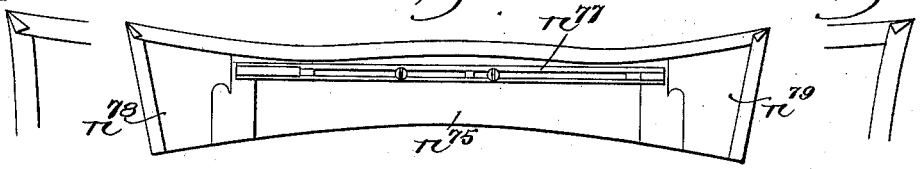
  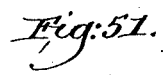
Witnesses
Edward F. Allen
A. C. Harmon
Inventor:
Albert D. Fenwick
by Crosby Gregory
atty's
THE NORRIS PETERS CO., PHOTO-LITHO., WASHINGTON, D. C.

(No Model.)   25 Sheets—Sheet 17.
A. D. FENWICK.
MACHINE FOR FORMING AND FOLDING COLLAR BLANKS OR THE LIKE.
No. 606,528.   Patented June 28, 1898.
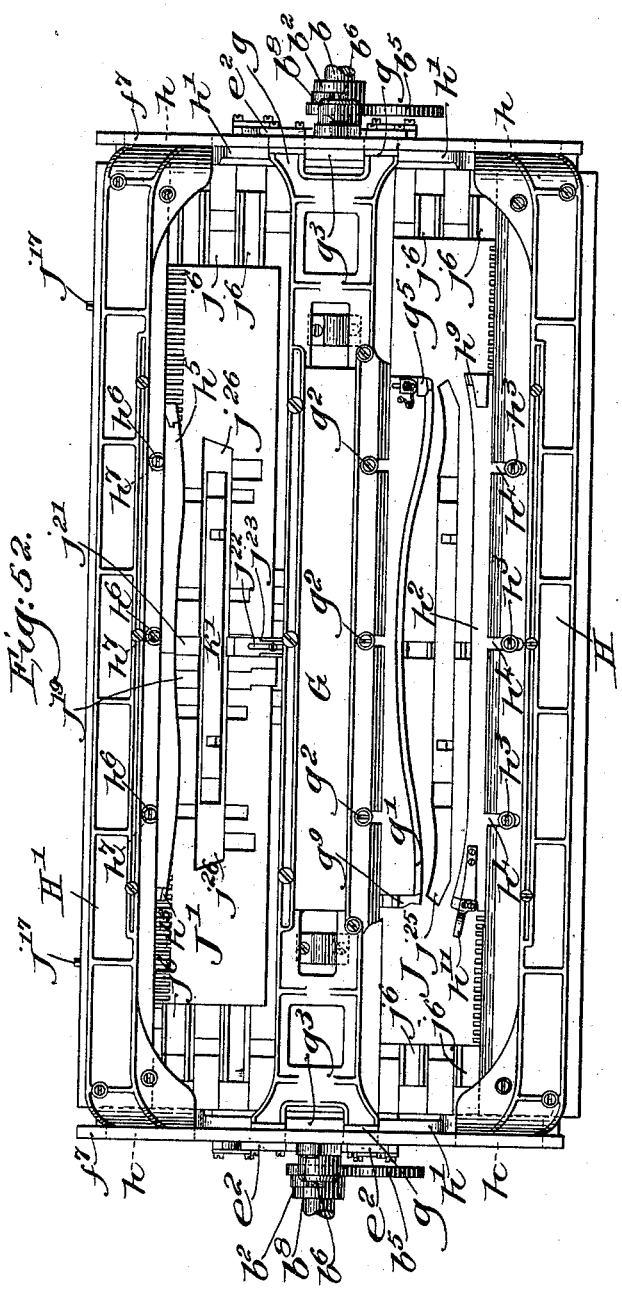

(No Model.)  25 Sheets—Sheet 18.
A. D. FENWICK.
MACHINE FOR FORMING AND FOLDING COLLAR BLANKS OR THE LIKE.
No. 606,528. Patented June 28, 1898.
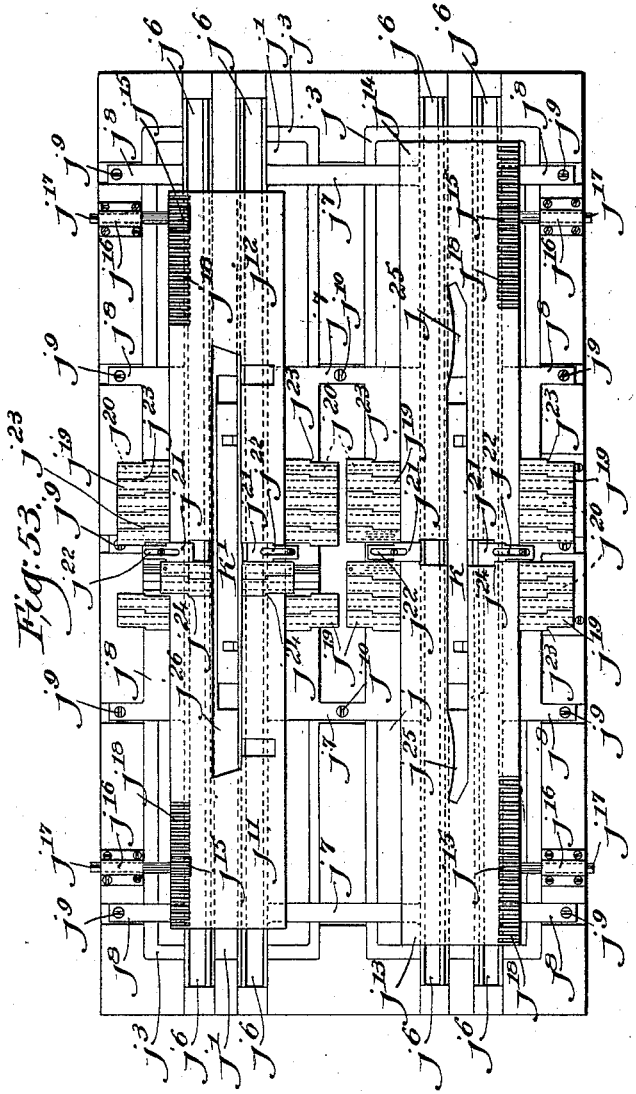
Witnesses.
Edward F. Allen.
Thomas Drummond.
Inventor:
Albert D. Fenwick.
by Crosby Gregory
attys.

(No Model.) 25 Sheets—Sheet 19.
A. D. FENWICK.
MACHINE FOR FORMING AND FOLDING COLLAR BLANKS OR THE LIKE.
No. 606,528. Patented June 28, 1898.
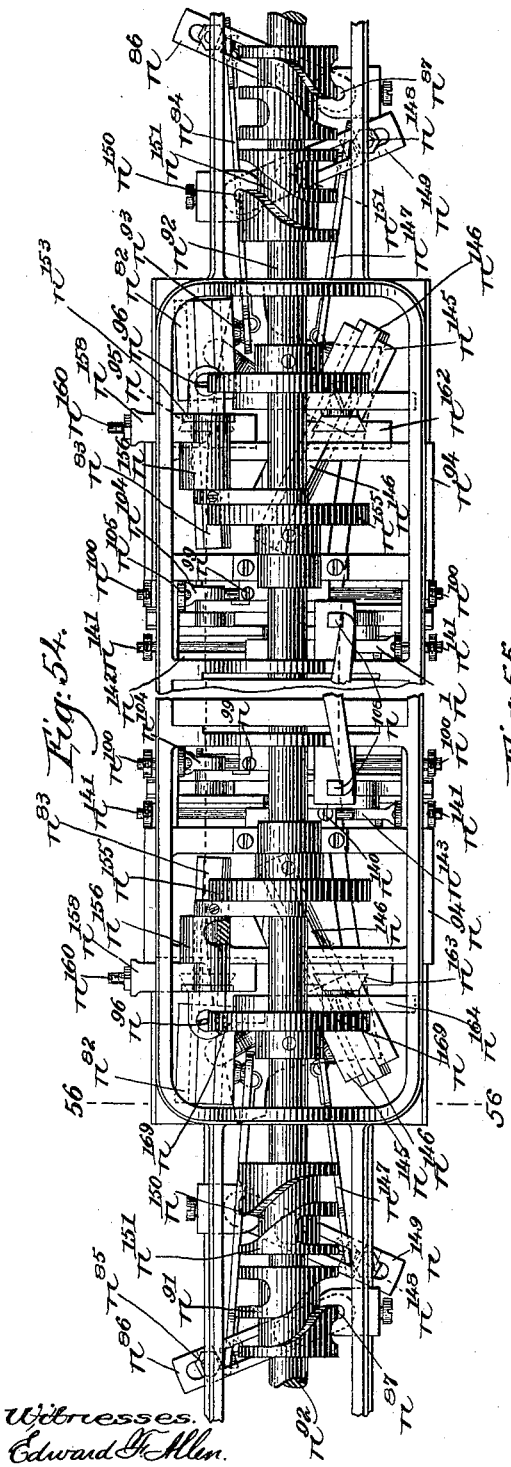
Witnesses.
Edward F. Allen.
A. C. Harmon
Inventor:
Albert D. Fenwick.
by Crosby Gregory Attys.

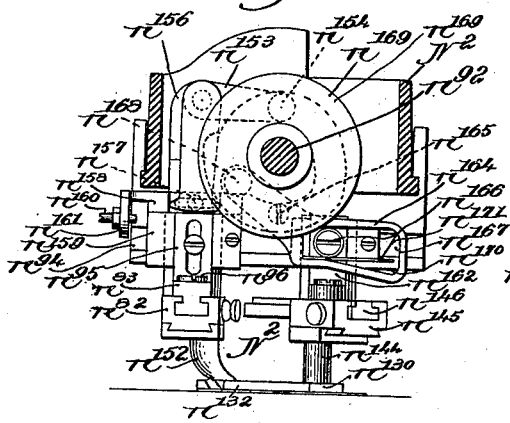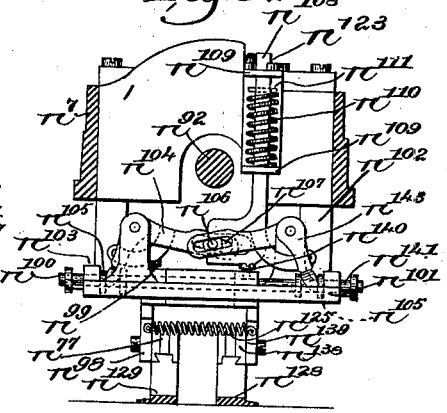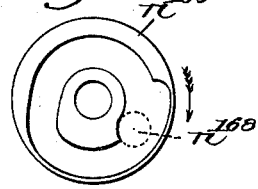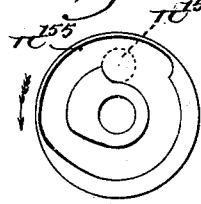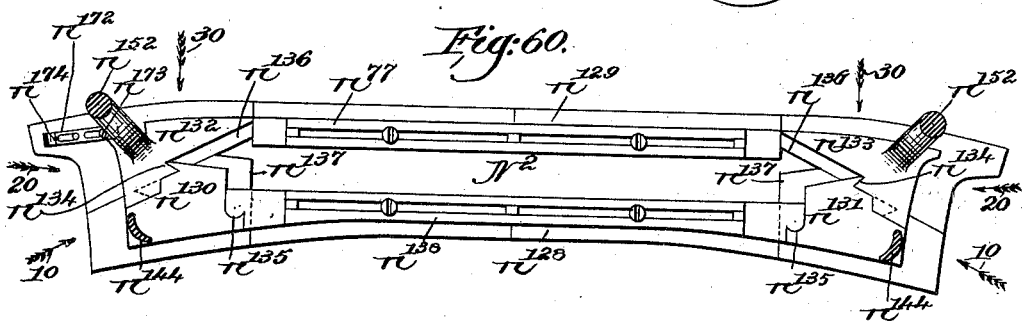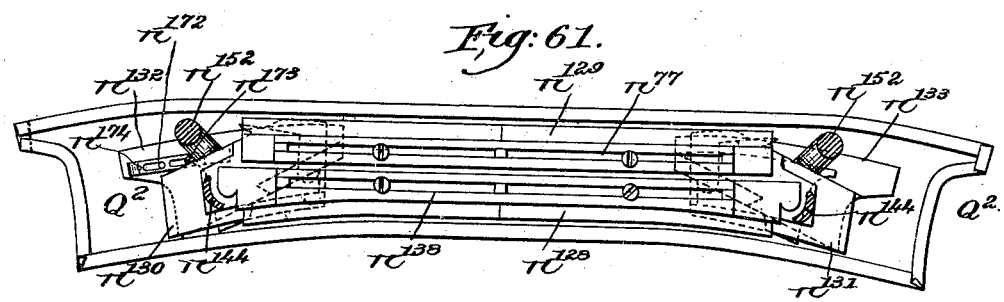

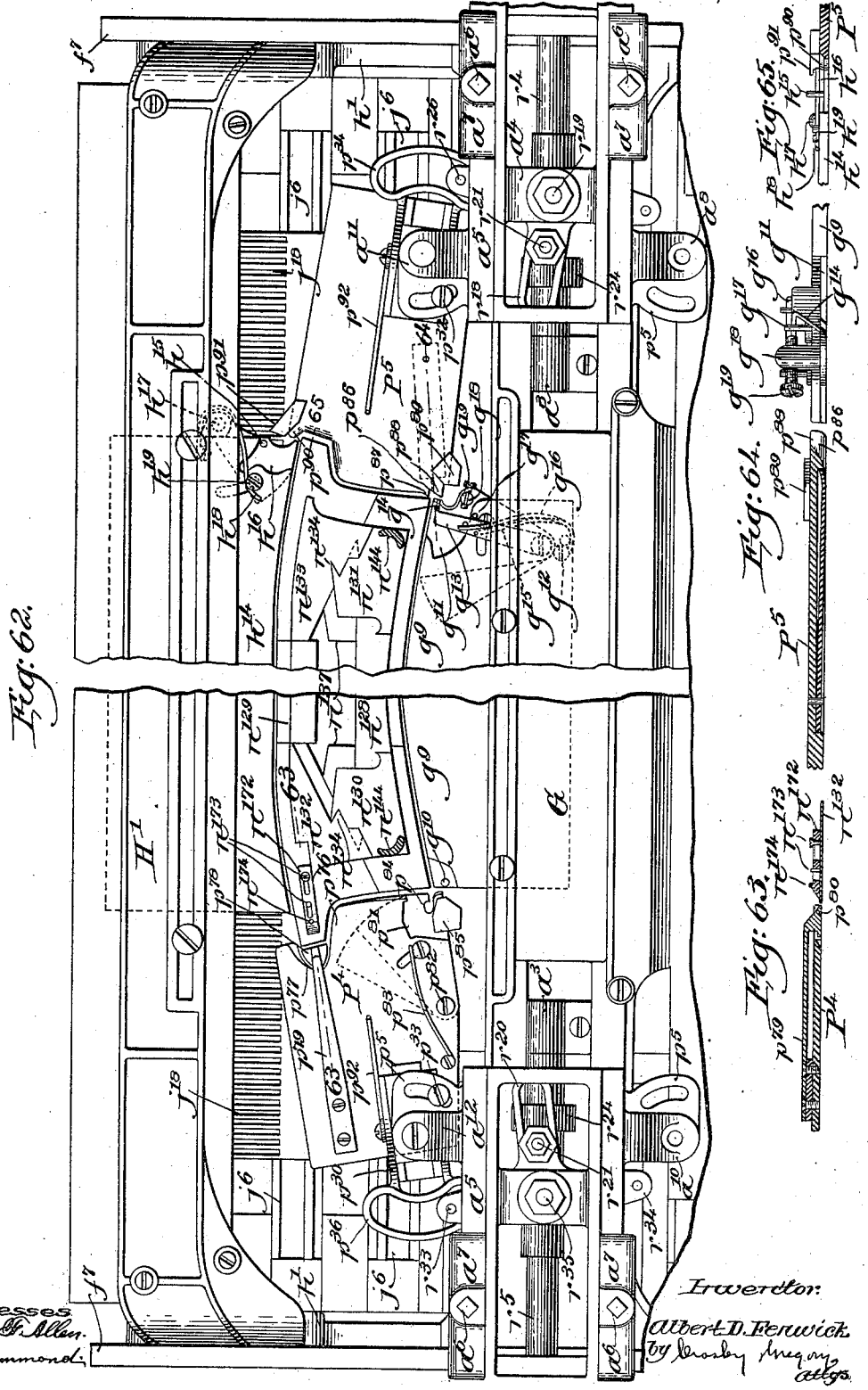

(No Model.) 25 Sheets—Sheet 22.
A. D. FENWICK.
MACHINE FOR FORMING AND FOLDING COLLAR BLANKS OR THE LIKE.
No. 606,528. Patented June 28, 1898.
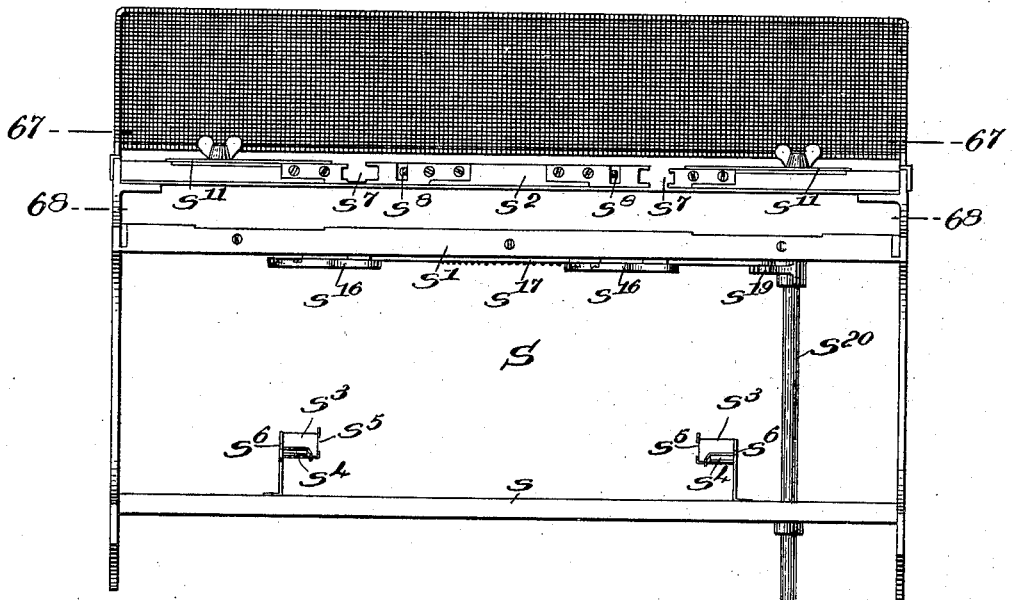
Fig: 66.
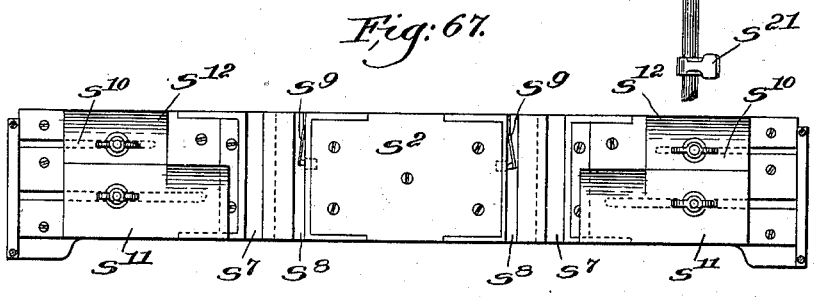
Fig: 67.
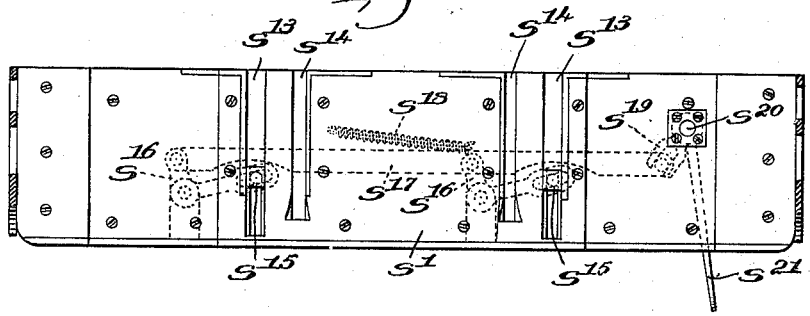
Fig: 68.
Witnesses.
Edward F. Allen.
Thomas J. Drummond.
Inventor:
Albert D. Fenwick.
by Crosby & Gregory,
attys.

(No Model.)　　　　　A. D. FENWICK.　　　25 Sheets—Sheet 23
MACHINE FOR FORMING AND FOLDING COLLAR BLANKS OR THE LIKE.
No. 606,528.　　　　　　　　　　Patented June 28, 1898.

Witnesses.
Edward F. Allen.
Thomas F. Drummond.

Inventor:
Albert D. Fenwick.
by Crosby Gregory
Attys.

THE NORRIS PETERS CO., PHOTO-LITHO., WASHINGTON, D. C.

(No Model.)
25 Sheets—Sheet 24.
A. D. FENWICK.
MACHINE FOR FORMING AND FOLDING COLLAR BLANKS OR THE LIKE.
No. 606,528.  Patented June 28, 1898.
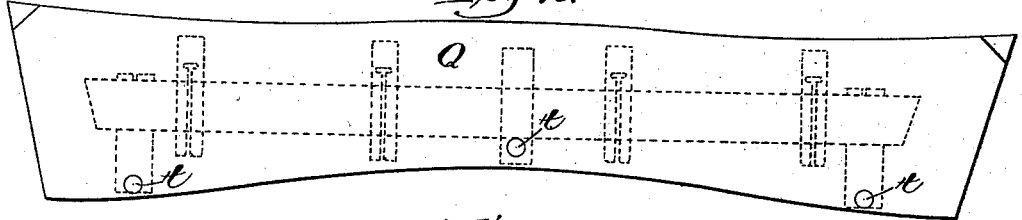
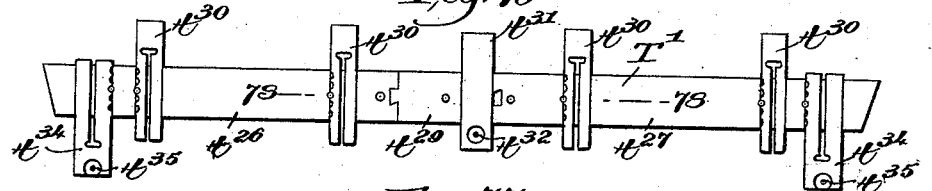
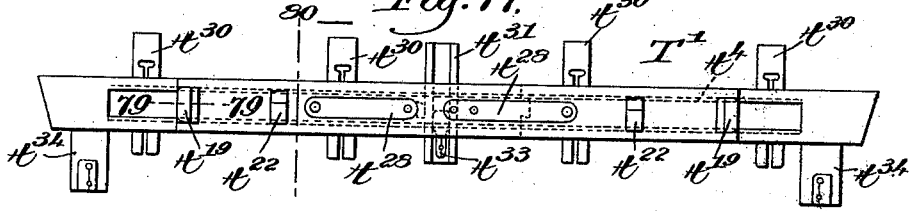
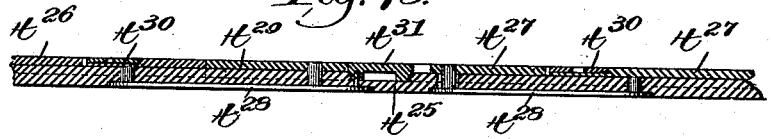
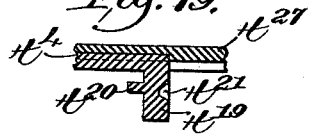
Witnesses.
Edward F. Allen.
Thomas J. Drummond
Inventor:
Albert D. Fenwick.
by Crosby Gregory.
attys.

(No Model.)  25 Sheets—Sheet 25.
A. D. FENWICK.
MACHINE FOR FORMING AND FOLDING COLLAR BLANKS OR THE LIKE.
No. 606,528. Patented June 28, 1898.
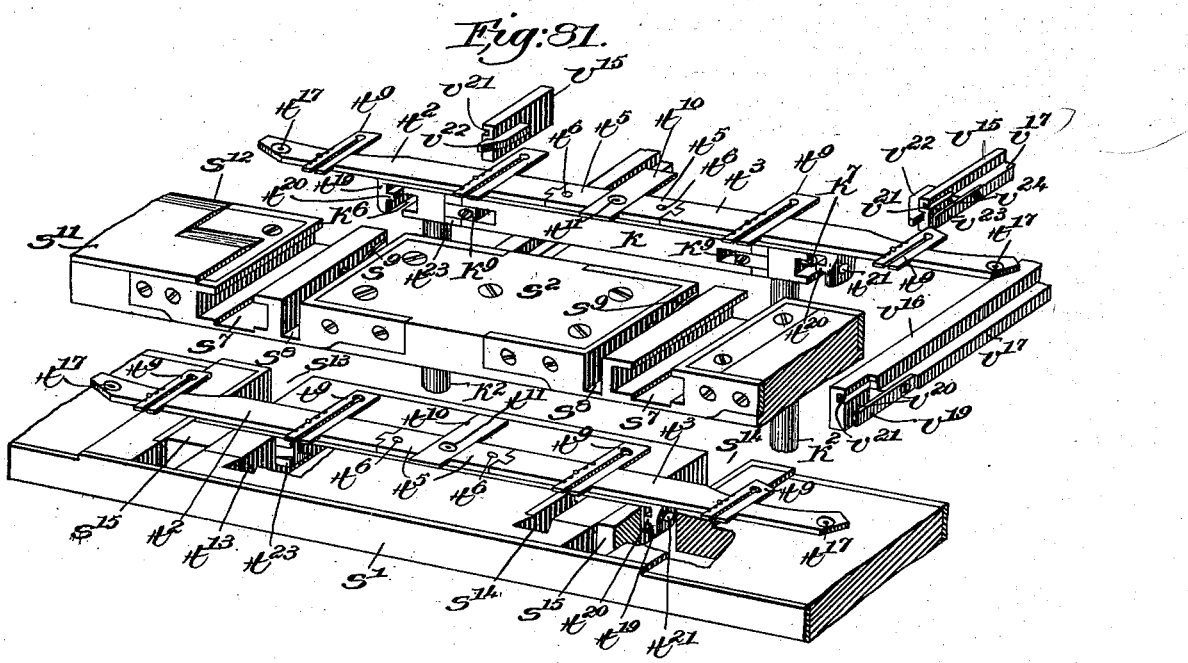
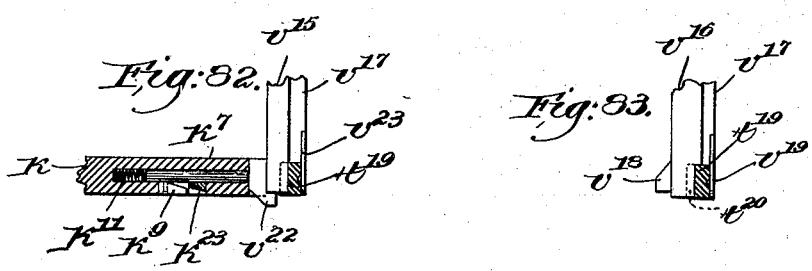
Witnesses.
Edward F. Allen.
A. H. Harrison.
Inventor.
Albert D. Fenwick
by Crosby & Gregory
Attys.

UNITED STATES PATENT OFFICE.

ALBERT D. FENWICK, OF PHILADELPHIA, PENNSYLVANIA, ASSIGNOR TO THE FENWICK COLLAR AND CUFF MACHINE COMPANY, OF PORTLAND, MAINE.

MACHINE FOR FORMING AND FOLDING COLLAR-BLANKS OR THE LIKE.

SPECIFICATION forming part of Letters Patent No. 606,528, dated June 28, 1898.

Application filed October 25, 1897. Serial No. 656,284. (No model.)

*To all whom it may concern:*

Be it known that I, ALBERT D. FENWICK, of Philadelphia, county of Philadelphia, and State of Pennsylvania, have invented an Improvement in Machines for Forming and Folding Collar-Blanks or the Like, of which the following description, in connection with the accompanying drawings, is a specification, like letters and figures on the drawings representing like parts.

The machine made the subject of this invention has been devised to automatically fold or inturn the tops and bands of turn-down collars, and with but slight additions it may be made to infold the edges of stand-up collars, or it may be used, if desired, solely for inturning the tops of collars or the bands one after the other in succession or separately, as may be desired.

The blanks of linen or cotton, or both, to be infolded at their edges in the production of collars, are cut to shape in a suitable die, and when died out they are spotted or cut for the reception of a suitable fastening device or tack by which to correctly affix the blank to the upper side of a feeding-plate, of which there are a series, each provided with a suitable blank. These feeding-plates, having attached blanks and laid in position on a suitable table or support, are engaged by a feeding mechanism and put into position for the blanks on the plates to be infolded. The plates are by the feeding mechanism put on or into an opening of a platen or bed-plate, and in such position a former descends on the blank, leaving the edge or edges and ends of the blank uncovered, so that suitable folding-blades to be described may then act to infold the edges and ends of the blank, laying said edges over the edges or perimeter of the former. This former is preferably composed of a plurality of pieces or parts—viz., a central or body part and end pieces or definers— and said parts are so constructed that the perimeter of the former may be contracted after the edge and ends of the blank have been folded over it in order that the body part and the end pieces or definers may be withdrawn from beneath the infolded edges of the blank.

In the machine herein to be described I prefer to operate the folding-blades in succession—as, for instance, I first move an end-folding blade, and then an edge-folding blade, and then the opposite end-folding blade, three folding-blades being used to infold the top part of a turn-down collar; but for inturning a collar-band or a standing collar an extra edge-folding blade will be used, and it will follow in operation the first edge-folding blade, the infolded edges and ends of the collar being prepared substantially as shown in my applications, Serial Nos. 643,830 and 643,831, filed July 8, 1897, to which reference may be had. The edges and ends of the blank having been infolded for the top part of a turn-down collar, the folding-blades will be lifted slightly to sufficiently release the pressure of the folded parts of the collar-blank from the perimeter of the former in order that the former may be withdrawn from the said folds, but without disturbing said folds. This may be done by starting the central part or body of the former laterally from under the folded edge and then lifting it diagonally upward, and thereafter the end pieces or definers of the former have free space in which to move as they are being withdrawn from the folds at the ends of the blank, said end pieces or definers having imparted to them preferably a diagonal motion at such time. The perimeter of the former having been contracted and removed from the folds of the blank, the folding-blades again descend on and compress and pinch the blank to set and sharply define the folds at the edge and ends. After this the folding-blades are moved to release the edges of the blank, and the feeding-plate with its folded blank is engaged and taken from the machine and delivered on a suitable receiving table or support.

I believe that I am the first in a folding-machine to attach a blank to be folded to a feeding-plate and by feeding mechanism place or position said plate automatically in proper relation to folding-blades to infold the edges of said blank, and I am also the first to deliver said plate and its blank automatically from the machine.

The former herein shown possesses especial advantages, and it coöperates with the folding mechanism to effect the infolding of the blank; but in the use of the terms "former" and "folding mechanism" in the claims this invention is not to be limited in all instances to the exact former and folding mechanism shown, but is intended to include any usual or suitable equivalent devices.

The order of movements of the folding-blades front and rear may be varied from that outlined above; also I do not intend to restrict myself in all cases to a collapsible former, as above explained, inasmuch as it is novel to withdraw the former from the folds one by one as they are formed singly or in pairs, (as I do in the first folding operations, as will readily appear later,) whereby when the blank is finally entirely folded the former is outside of or in position readily to be retracted from the folded blank without necessarily being collapsed or contracted and without any disturbance of the folds.

Another important feature of this invention resides in the peculiar construction of the folding-blades to be described, they being especially devised to infold acute-angled corners neatly and smoothly, thus fully concealing all portions of the cut edges of the blank.

I also believe myself to be the first to use a former so constructed that its perimeter, which defines the line of fold at the sides and ends of the blank, may be contracted so as to readily withdraw the former out from the folds in blank.

Other features of my invention will be hereinafter more particularly referred to and set forth in the claims at the end of this specification.

Figure 2:
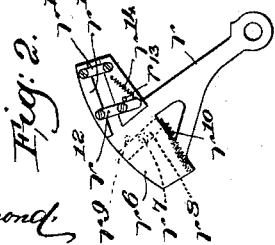
Figure 3:
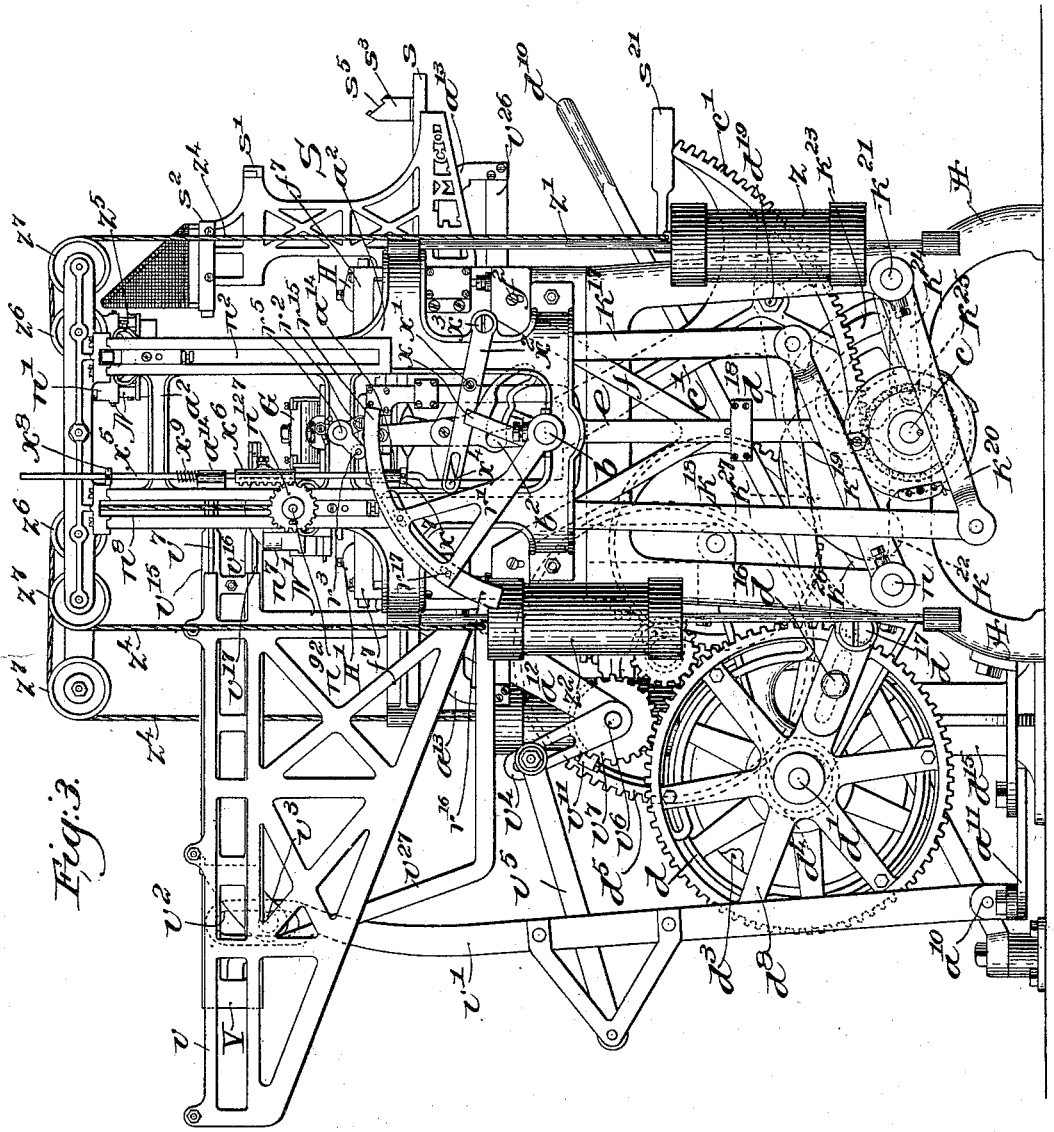
Figure 4:
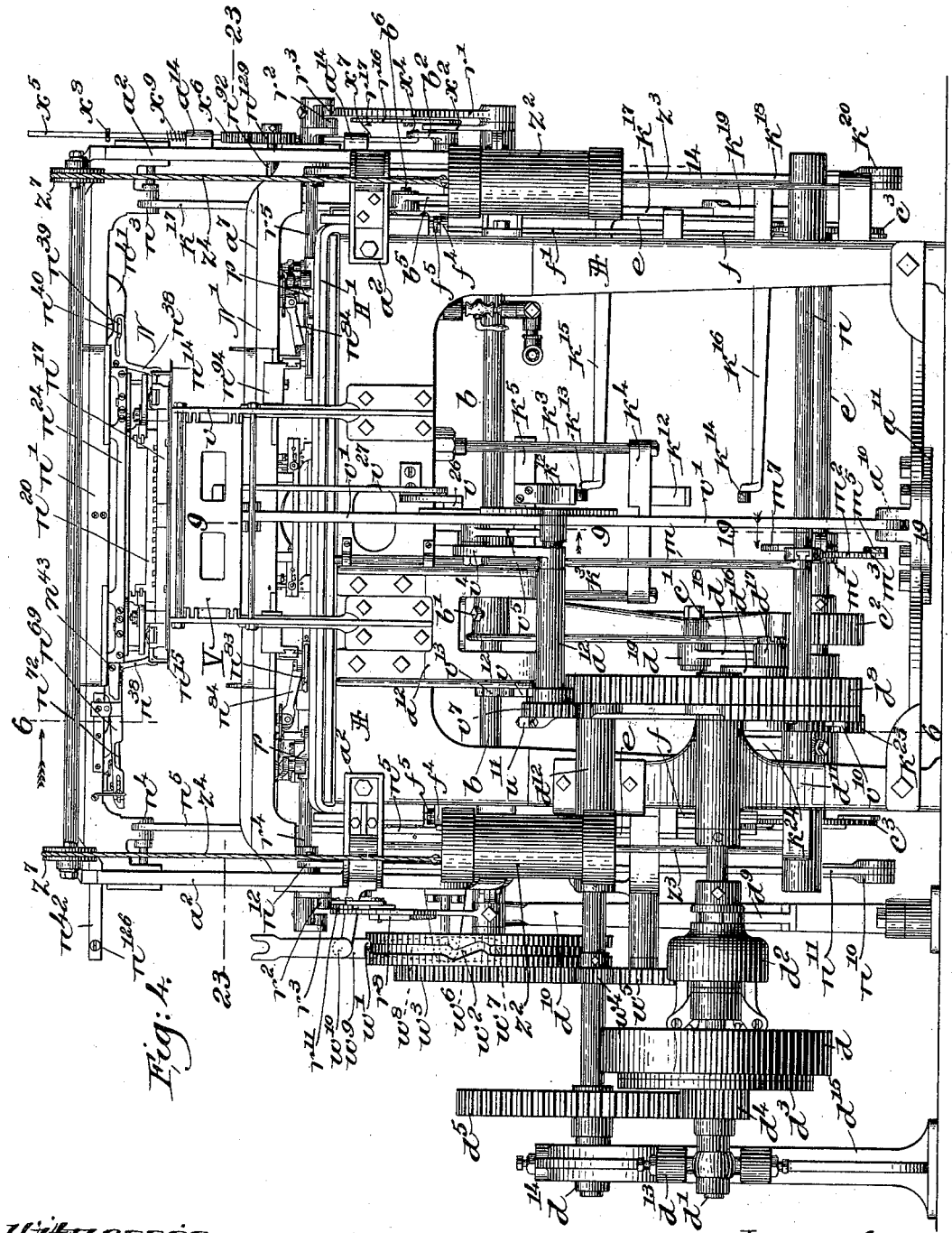
Figure 5:
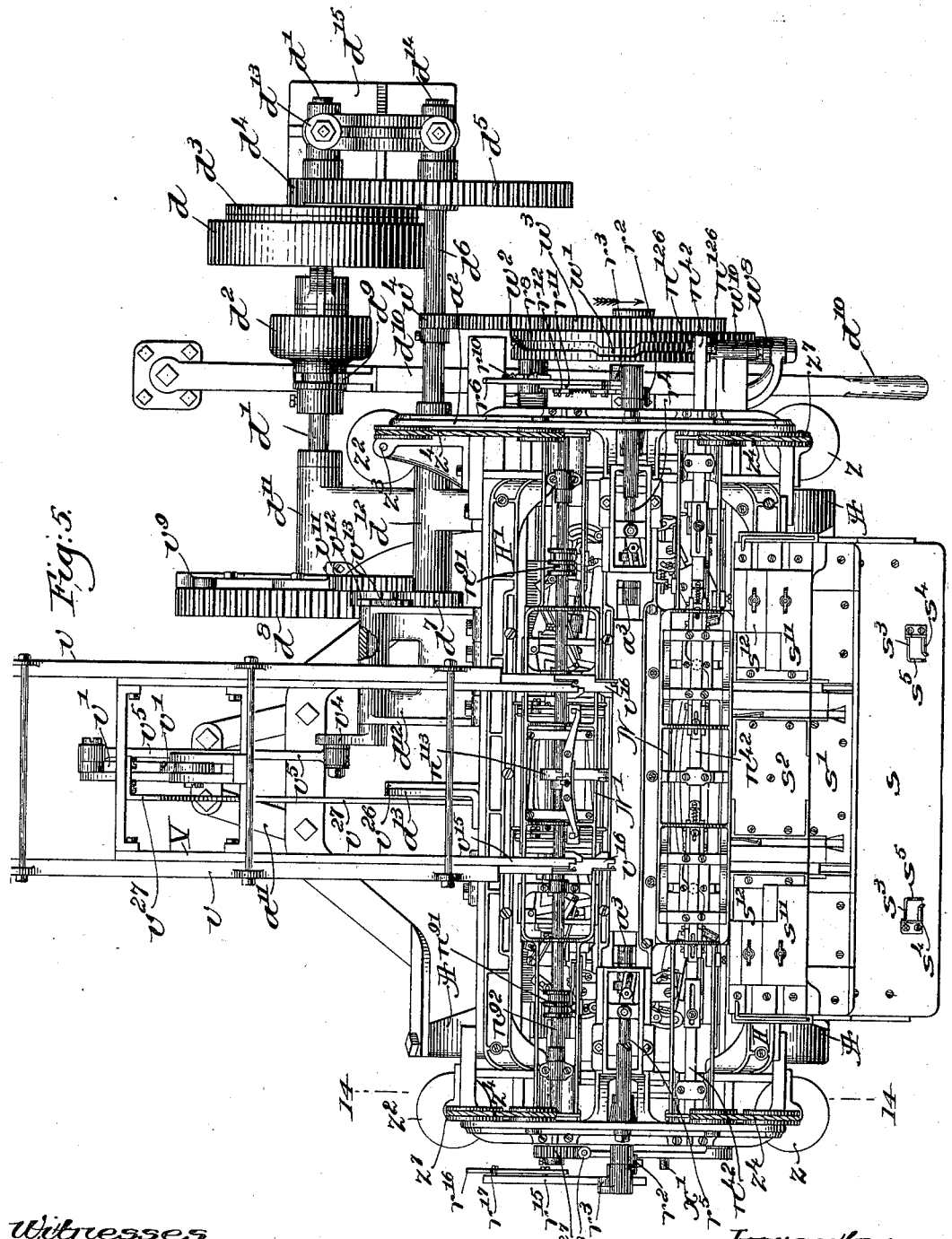
Figure 6:
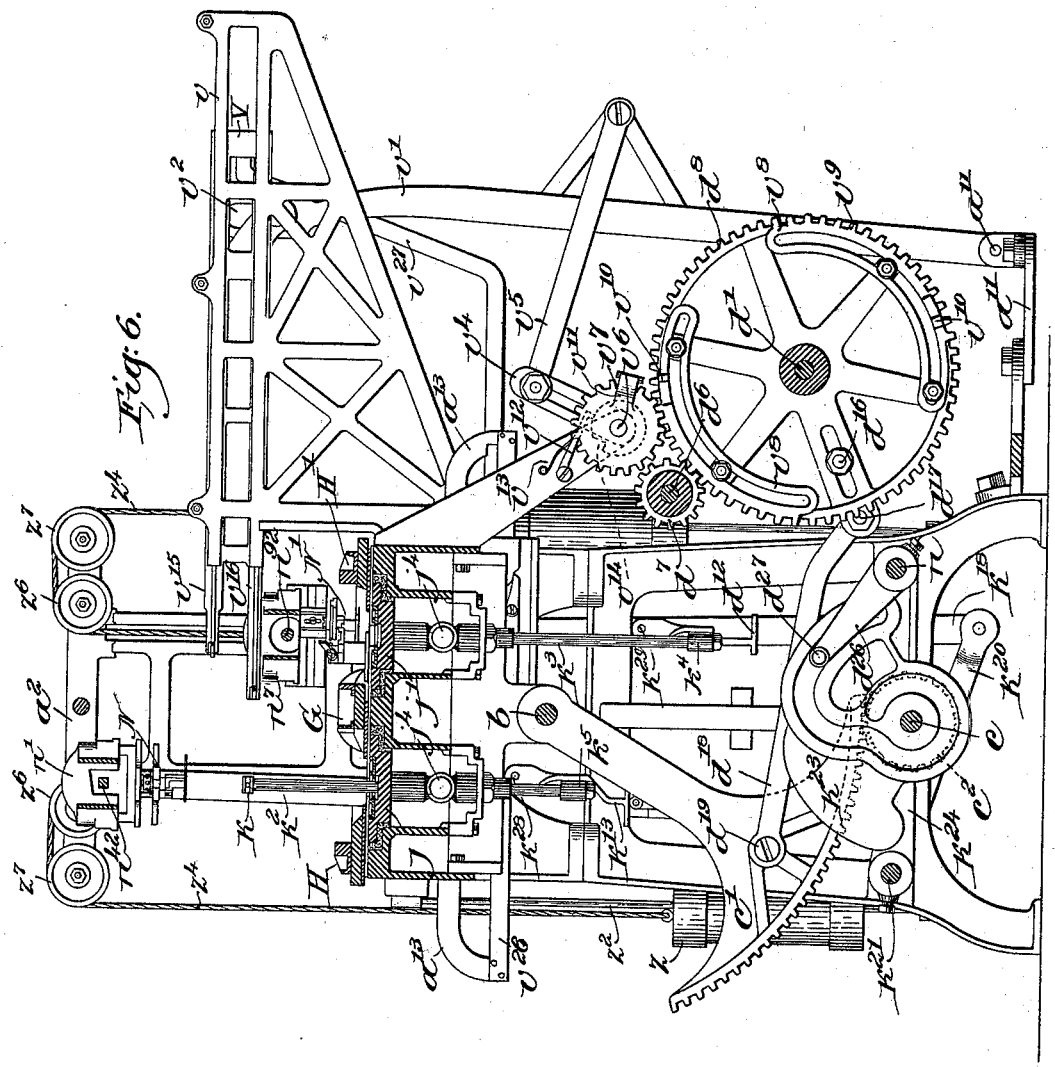
Figure 19:
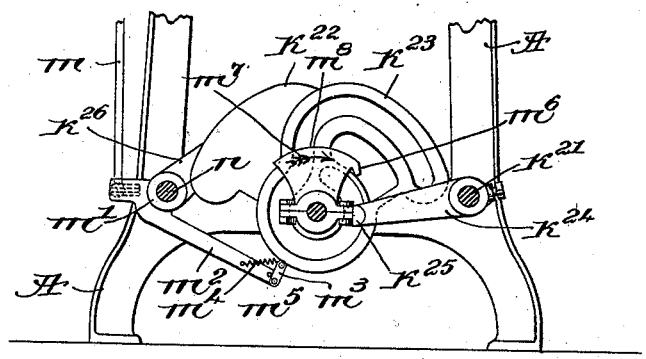
Figure 20:
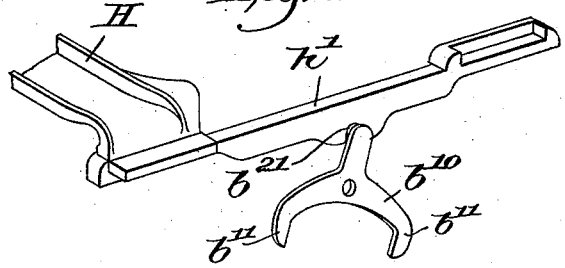
Figure 21:
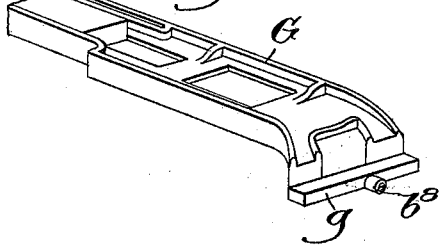
Figure 22:
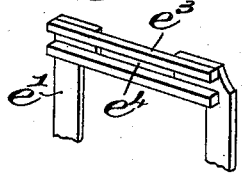
Figure 69:
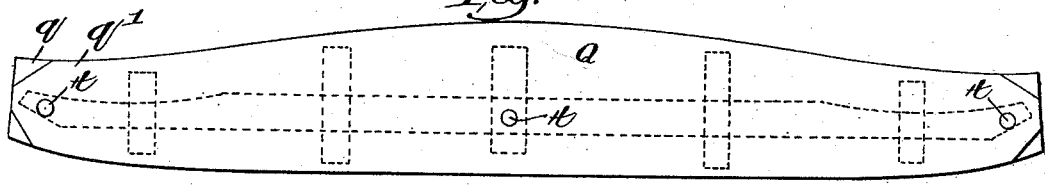
Figure 70:
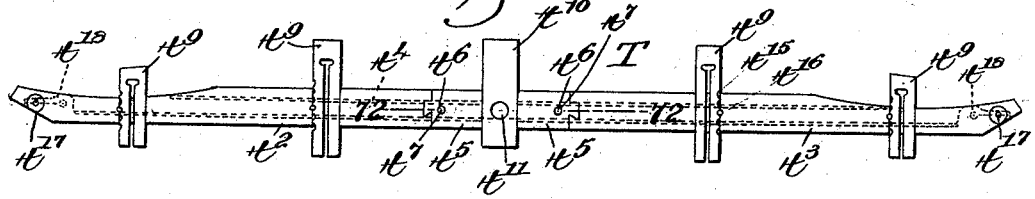
Figure 71:
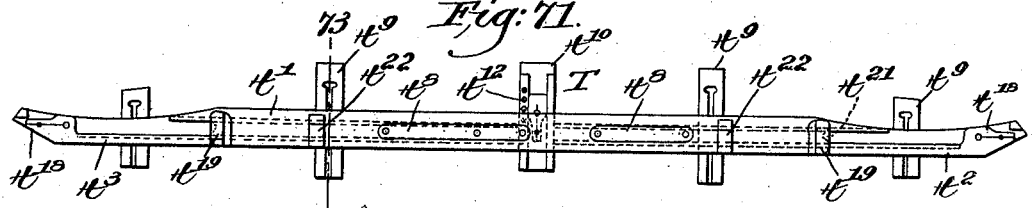
Figure 72:
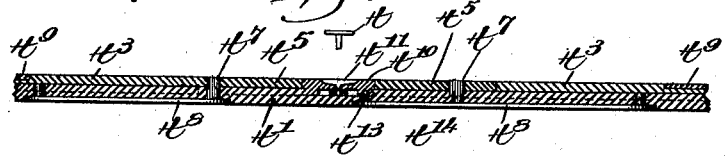
Figure 73:
Figure 74:
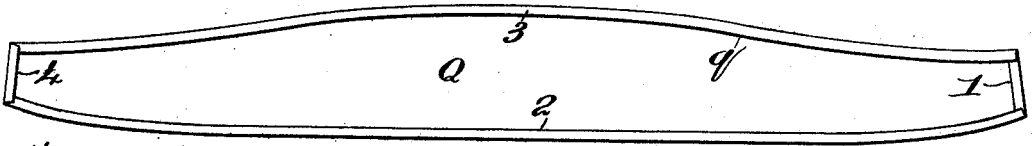

In the drawings which show one embodiment of my invention, Figure 1 is a right-hand side elevation of the complete machine. Fig. 2 is a detail, in side elevation, of a cam-lever to be described. Fig. 3 is a left-hand side elevation. Fig. 4 is a rear elevation thereof, the table being omitted for the sake of clearness. Fig. 5 is a top plan view. Fig. 6 is a vertical transverse section taken on the line 6 6, Fig. 4. Fig. 7 is a similar sectional view showing the position of the parts when the feeding mechanism is in its forward position. Fig. 8 is a vertical longitudinal section taken on the line 8 8, Fig. 1, and showing more particularly the actuating portions of the feeding mechanism and showing the relative positions of the parts. Fig. 9 is a vertical transverse section taken on the line 9 9, Fig. 4. Fig 10 is a perspective view of the forward portion of the feeding mechanism, showing coöperation of the parts thereof. Fig. 11 is a top plan view of part of the feeding mechanism. Figs. 12 and 13 are a front end view and a side elevation of parts of the feeding mechanism and positioning device, they being shown as in the relative positions shown in Fig. 6. Fig. 14 is a vertical transverse section on the line 14 14, Figs. 4 and 5. Figs. 15 and 16 are detail elevations showing, respectively, the opposite sides of the cam which operates the edge-folding blades. Fig. 17 is a detailed front elevation or edge view of the lower end portions of the lifting-bars for the folding-blades, the same portions being shown in side elevation at the upper parts of the adjacent Figs. 15 and 16. Fig. 18 is a detail in side elevation of a bell-crank shown in Fig. 14. Fig. 19 is a fragmentary cross-section on the line 19 19, Fig. 4. Fig. 20 is an enlarged fragmentary detail in perspective of one end of the carriage, showing the connecting-yoke and operating T-lever. Fig. 21 is a similar perspective view of the adjacent end of the central carriage. Fig. 22 is a perspective view, looking from the inside, of the slide-plate and upper end of its lifting-bars. Fig. 23 is an enlarged horizontal section, partly broken away, taken on the line 23 23, Fig. 4, the die or former carrying cross-heads being omitted in order clearly to show the operating mechanism for the end-folding blades and the parts coöperating therewith to fold the corners of the blank, said figure also showing various other details to be described. Fig. 24 is an end elevation of the left-hand end-folding blades and their operating mechanism, looking from the inside of the machine in the direction of arrow 24, Fig. 23. Fig. 25 is a similar elevation of the right-hand end-folding blades and their operating mechanism, looking in the direction of arrow 25, Fig. 23. Fig. 26 is a detail in side elevation of one of the end-folding blades, looking at Fig. 24 in the direction of arrow 26. Fig. 27 is a similar elevation of the other end-folding blade of Fig. 24, looking in the direction of arrow 27. Figs. 28 and 29 are respectively similar elevations of the remaining end-folding blades, looking in the directions, respectively, of arrows 28 and 29, Fig. 25. Fig. 30 is a fragmentary view, in rear elevation, showing a trip mechanism on the right-hand end of the front cross-head for releasing the cam mechanism in connection with the front right-hand end-folding blade; and Fig. 30ª is a broken perspective detail of the latter. Fig. 31 is a perspective detail showing the rear inner corner of the back left-hand end-folder, Figs. 23, 24, and 27. Fig. 32 is a front elevation, parts being broken away and in section, showing a central portion of the front cross-head and the die or former carried thereby. Fig. 33 is a top plan view thereof. Fig. 34 is a plan view of a detail showing the end-shifting cams carried by the front cross-head. Fig. 35 is a top plan view of the front former. Fig. 36 is a transverse vertical section taken on the line 36 36, Fig. 33. Fig. 37 is an enlarged detail in perspective of the right-hand part of the front former, showing particularly the movable end piece. Fig. 38 is a front elevation of the central portion of the rear cross-head, showing also the former carried thereby. Fig. 39 is a top plan view thereof. Fig. 40 is a top plan detail of the supporting-frame, on which are mounted the adjusting devices for the rear former, Fig. 38. Fig. 41 is a sectional detail on line 41 41, Fig. 38, it showing the rear former and a folded collar-blank beneath it. Fig. 42 is a perspective detail of one of the spacing-blocks used in connection with the former. Fig. 43 is a vertical cross-section taken on the line 43 43, Fig. 38, showing a detail of the adjusting mechanism of the left-hand rear end-folding blade. Fig. 44 is a similar section taken on the line 44 44, Fig. 39. Fig. 45 is a transverse section taken on the line 45 45, Fig. 38. Fig. 46 is a view similar to Fig. 41, showing the rear former in position immediately after the collar-blank has been folded and before the former or die has collapsed so as to move therefrom, Fig. 41 showing it in its collapsed and removed position. Figs. 47 and 48 are fragmentary plan views showing the manner in which corners are folded. Figs. 49, 50, and 51 are transverse sectional views, supposed to be taken about the middle of the rear folder, showing the successive positions which the former assumes. Fig. 52 is a top plan view of the bed of the machine having the side-folding blades in position and all the other parts above the bed being removed. Fig. 53 is a top plan view of the bed of the machine, showing the means for adjusting it to suit different lengths of blanks. Figs. 54 and 55 are enlarged plan and front elevation views, respectively, similar to Figs. 39 and 38, showing further details of construction provided for folding stand-up collars. Fig. 56 is a vertical transverse section on the line 56 56, Fig. 54. Fig. 57 is a similar section on the line 57 57, Fig. 55. Figs. 58 and 59 are detailed elevations of the operating-cams shown in Figs. 54 to 56. Fig. 60 is a transverse horizontal section, Fig. 55, showing in top plan the former for stand-up collars in operative forming position. Fig. 61 is a similar view to Fig. 60, but showing the former in collapsed position withdrawn from the folds of a collar, the latter being shown beneath the same. Fig. 62 is an enlarged detailed plan view of the folding-blades of this modification. Figs. 63, 64, and 65 are sectional details taken, respectively, on the lines 63 63, 64 64, and 65 65, Fig. 62, the latter two views showing in elevation also the adjacent parts of the front and rear edge-folders, respectively. Fig. 66 is a front elevation of the table at the front of the machine. Fig. 67 is a top plan of the uppermost ledge or shelf thereof. Fig. 68 is a horizontal section on the line 68 68, Fig. 66, indicating in dotted lines the operating mechanism beneath the shelf. Fig. 69 shows in top plan a blank and lining for a collar-band secured on a feeding-plate for the front of the machine. Fig. 70 is a top plan view of the feeding-plate. Fig. 71 is a bottom plan view thereof. Fig. 72 is an enlarged vertical longitudinal section on the line 72 72, Fig. 70. Fig. 73 is an enlarged vertical transverse section on the line 73 73, Fig. 71. Fig. 74 is a plan view of a blank folded by the front folding mechanism. Figs. 75 to 78 are views similar to Figs. 69 to 72, showing the feeding-plates for the rear bed of the machine. Fig. 79 is an enlarged vertical longitudinal section on the line 79 79, Fig. 77, looking toward the top of the figure. Fig. 80 is an enlarged vertical transverse section on the line 80 80, Fig. 77. Fig. 81 is an enlarged perspective, in broken detail, showing a carrier-plate in position on the front positioning device about to be engaged and removed by the outcarrier and showing another carrier-plate in place on the table ready to be carried into the machine by the incarrier. Fig. 82 is a horizontal sectional detail showing the upper or out carrier in the position of unlocking and removing the plate from the positioning device. Fig. 83 is a horizontal sectional detail showing the engagement of the incarrier with a carrier-plate.

In the present embodiment of my invention I have mounted in a suitable frame A two main rock-shafts $b$ $c$, extending across the machine from end to end. Motion is communicated to these rock-shafts by the following mechanism: Power is derived from a loose pulley $d$ at the rear of the machine (see Fig. 5) on a shaft $d'$, provided with a usual clutch $d^2$, adapted to force said loose pulley into driving contact with a face-plate $d^3$, having a cog-pinion $d^4$ fast thereto at one side and loose on the shaft $d'$, said pinion meshing with a gear $d^5$ on a parallel shaft $d^6$, to the opposite end of which is keyed a pinion $d^7$ in mesh with a large gear-wheel $d^8$ on the shaft $d'$. The clutch $d^2$ is operated in usual manner by a jaw-arm $d^9$, projecting upwardly from a shifting lever $d^{10}$, extending to the front of the machine, and the shafts $d'$ and $d^6$ are suitably journaled in brackets $d^{11}$ $d^{12}$ on the rear part of the frame, and bearings $d^{13}$ $d^{14}$ in a stand $d^{15}$ properly bolted to the floor adjacent the machine proper.

The gear-wheel $d^8$ (see Fig. 3) is provided at one side with an adjustable plate $d^{16}$, to which is pivoted at $d^{17}$ a pitman $d^{18}$, pivotally connected at $d^{19}$ to a segmental gear or rocker-arm $c'$, secured at its upper end by a bolt $b'$ to the shaft $b$ (see Fig. 4) and in mesh at its lower segmental portion with a pinion $c^2$, keyed or otherwise fastened on the shaft $c$.

By the mechanism already described it will be evident that the shaft $b$ is rocked back and forth by the crank action of the swinging sector $c'$ for every revolution of the driving-gear $d^8$, and at the same time the shaft $c$ is rocked in an opposite direction by the engagement with its pinion of said rocker-arm or swinging sector $c'$. At its opposite ends the shaft $c$ is provided with similar cams $c^3$ of peculiar construction and shown in enlarged detail in Figs. 15 and 16. These cams serve to raise at proper intervals the side or longitudinal folding blades by means of lifting-bars $e$, $f$, the former being bifurcated or yoke-shaped at its upper end $e'$ and rigidly secured at $e^2$ to a bracket or plate $e^3$, horizontally slotted at $e^4$ to receive the slide ends $g$ (see Fig. 52) of a central carriage G, for the inner side-folders, one only of the latter being shown at $g'$, secured thereto by means of screws $g^2$. The other pair of lifting-bars $f$ are Y-shaped at their upper ends $f'$ and held against the ends of the frame A by means of bolts $f^2$, working freely in slots $f^3$, provided therefor in the ends of the Y-bars, said bars having shoulders or brackets $f^4$ to bear against capstan-screws $f^5$, adjustable in the lower ends of depending legs $f^6$ of a main bracket or guide-plate $f^7$. The plate $f^7$ has slots or ways $f^8$, in which are mounted to slide the ends $h$ of a front carriage H and rear carriage H', respectively, one in each of said slots $f^8$, for the outer longitudinal or edge folding blades, said front and rear carriages being immovably held together by yokes $h'$, one at each end thereof, (shown in dotted lines in Fig. 14,) the front folding-blade $h^2$ being shown secured to its carriage H by means of screws $h^3$, adjustable in slots $h^4$, and the rear folding-blade $h^5$ being shown as secured to its carriage H' by means of screws $h^6$ in slots $h^7$. The main guide-plate $f^7$ has a large recess $f^9$ to receive the bracket or plate $e^3$ which holds the central carriage G, in order to permit said plate $e^3$ and plate $f^7$ to be raised independently of each other.

The folding-blades just described operate above the beds J J', the details thereof being shown in Figs. 6, 9, 23, 52, and 53, where it will be seen that bed-pieces $j\,j'$ of non-conducting material, such as soapstone, are mounted above ledges $j^2$ of the frame A, asbestos packing $j^3$ being interposed therebetween in order to retain the heat in the soapstone pieces $j\,j'$, said heat being provided from any source, gas-pipes $j^4$ being herein shown for the purpose and the heat being retained within the downturned partitions $a$ of the frame A at each side and end of the gas-jets.

The bed-pieces $j\,j'$ are centrally and longitudinally grooved at $j^5$ in order to receive the positioning devices $k\,k'$, in this instance of my invention shown as bars supported on lifting-rods $k^2$ and $k^3$, respectively, said rods being connected in pairs at their lower ends by head-bars $k^4\,k^5$, said positioning devices forming part of the feeding mechanism which I have chosen to illustrate in this present embodiment of my invention, it being operated by a mechanism to be described.

Adjacent the recesses or grooves $j^5$ is a guide-frame $j^6$, having dovetailed ways in its upper side, said frame being herein shown as made in one piece of metal provided with connecting-ribs $j^7$ (see Fig. 53) and ribs or tongues $j^8$ at its outer portions, said ribs or tongues being let into the main frame and bed pieces and secured thereto by screws $j^9\,j^{10}$. (See also Fig. 9.) On this guide-frame and operating in its dovetailed ways are platens or bed-plates on which the parts of the collar-blanks, extending beyond the feeding-plates, rest, said platens being herein shown as formed of two end pieces $j^{11}\,j^{12}$ for the rear bed and $j^{13}\,j^{14}$ for the front bed. Suitable means is provided in order to shift these end portions in the ways of the frame $j^6$, the platens being provided with dovetailed projections to enter said dovetailed grooves, said means being shown herein as pinions $j^{15}$, journaled in the frame of the machine at $j^{16}$ and having squared ends $j^{17}$ to receive a wrench or spanner, each pinion entering a rack $j^{18}$ in its respective plate, so that by applying a wrench to the squared end $j^{17}$ and turning the pinion one way or the other the plate may be correspondingly shifted longitudinally in order to adjust it for different lengths of blanks.

Spacing-blocks $j^{19}$ are provided to enter between the adjacent ends of the receiving-plates to fill the gap as the latter are moved apart and maintain an even receiving-surface for the collar-blanks to rest upon. Said blocks $j^{19}$ are shown in plan view, Fig. 53, and elevation, Fig. 9, from which it will be seen that each block has a dovetailed groove $j^{20}$ in its under side which fits and is longitudinally movable on a corresponding tongue of frame $j^6$, the middle block $j^{21}$ being slotted at $j^{22}$ to receive a tightening-screw, and each of the other blocks being provided with a shoulder $j^{23}$ to engage a shoulder $j^{24}$ on the receiving-plate when applied in working position in said plate, said shoulders interlocking so as to prevent the blocks from working outwardly when once the gap between the end portions of the receiving-plates has been filled and the latter have been secured in place. These blocks will have a width corresponding to the different sizes of collars, so that it will be evident that the receiving-plates may be very quickly and readily adjusted to suit any size of blank which is to be folded. The receiving-plates are recessed longitudinally, as shown at $j^{25}\,j^{26}$, respectively, to receive the feeding-plates to be described.

From the description before given it will be understood that the shaft $c$ rocks first one way and then back-again, said movement in the present instance being a one-and-one-fifth rotation, (although it will be understood that in this respect, and indeed in all other matters of detail, I am not limited in any way to the definite construction herein shown and described,) this rotation effecting the desired lifting movements of the folding-blades by means of the cams $c^3$ at either end of the shaft $c$, the construction of which will be clearly understood by viewing Figs. 15 and 16.

On a disk or circular plate $c^4$ are secured a number of cam projections, some on one side and some on the other side thereof, certain of which are always unyielding and others of which yield at times in order to lift the bars $e$ and $f$, respectively, said bars being respectively engaged by the cam projections on the corresponding side of the disk $c^4$.

Viewing Fig. 15, it will be seen that the cam projections $c^5$ and $c^6$ are the only ones on one side of the disk $c^4$, the remaining projections (shown in full lines in Fig. 16) being on the opposite side of the disk $c^4$. The projection $c^6$ is rigid on the disk, and the projection $c^5$ is pivotally mounted thereon, being held against a stop $c^7$ by means of a spring $c^8$. The projection $c^9$ is immovably secured on the disk $c^4$, and the projection $c^{10}$ is precisely like the projection $c^5$ on the opposite side, being held by a spring $c^{11}$ against a stop $c^{12}$, free to swing in one direction and unyielding in the opposite direction. The cam $c^{13}$, pivoted at $c^0$, is likewise unyielding in one direction and yielding in the opposite, the mechanism, however, being considerably different from that last described and comprising a thick outer portion $c^{14}$ and an undercut thinner depending wall $c^{15}$, held against a stop $c^{16}$ by a spring $c^{17}$, and having a plate $c^{18}$, bifurcated at $c^{19}$ at its rear end to ride over the pivot-pin $c^0$ of the projection and having a pin $c^{20}$ to slide in a slot formed in the wall $c^{15}$, this plate $c^{18}$ being held forward by a spring $c^{21}$ and carrying a lug $c^{22}$ at its inner edge to bear against a curved rib or flange $c^{23}$. A trigger $c^{24}$ is pivoted at $c^{25}$ and held normally in engagement with a finger or pin $c^{26}$ of the sliding plate $c^{18}$ by a spring $c^{27}$, so that the projection $c^{13}$ remains unyielding when said cam is rotating in the direction of the arrow, Fig. 16, the lug $c^{22}$ then being against the end of the rib or flange $c^{23}$, so that the cam projection $c^{13}$ cannot turn inward on its pivot and is yielding when the cam $c^3$ is rotated in an opposite direction, and then when the bevel-edged block $f^{10}$, fastened on the end of the lifting-bar $f$, (see Fig. 17,) contacts with the trigger $c^{24}$ it slides the plate $c^{18}$ rearward until the lug $c^{22}$ is beyond the rib $c^{23}$, whereupon the forward wedge end of the portion $c^{14}$ causes the projection $c^{13}$ to swing inwardly on its pivot, so as not to raise the bar $f$. When the cam has carried the projection $c^{13}$ beyond the block, the spring $c^{17}$ at once returns it against the stop $c^{16}$ to its elevated position, and the spring $c^{21}$ restores the plate $c^{18}$ and trigger $c^{24}$ to their positions. (Shown in full lines in Fig. 16.)

The last cam projection $c^{28}$ on the disk $c^4$ is precisely similar to the projection $c^{13}$ just described, being shown in Fig. 15 as held inwardly in its inoperative position by the block $f^{10}$ of the lifting-bar $f$. Between these two projections is a yielding projection $c^{29}$, having a notched end to engage the pointed foot of the block $f^{10}$, and thereby lift the latter and the folding-blades as the disk $c^4$ rotates beneath said bar, said cam projection $c^{29}$ being normally held by a spring $c^{30}$ against a spring $c^{31}$, the latter serving to maintain the projection $c^{29}$ raised sufficiently, as shown in full lines, to engage the foot $f^{10}$ when the cam is rotating in the direction opposite to the arrow, Fig. 16, and yet permit the projection $c^{29}$ to be depressed by said foot when the cam is rotating in the opposite direction.

Referring to Fig. 17, it will be observed that the lifting-bar $e$ is provided with a bevel-edged block $e^5$, similar to the block $f^{10}$, the block $e^5$, however, being provided with a plate $e^6$, normally projecting slightly below and so as to cover the extreme point of the block $e^5$ and being then bent around said block and pivoted at $e^7$ like a latch, a spring $e^8$ maintaining said plate normally, as stated, but permitting it to move away from said block when the cam is moved in the direction of the arrow, Fig. 16.

It will be understood that the lifting-bar $f$, which lifts the front and rear edge folding blades on the carriages H H', respectively, is engaged by the projections on that face of the disk $c^4$ shown in full lines, Fig. 16, and that the bar $e$, which lifts the central folding-blades on the carriage G, is operated by the projections on the opposite face of said disk, (shown in full lines, Fig. 15,) the various movements occasioned by this mechanism being more fully explained hereinafter.

In order that the blanks may be folded by the longitudinal or edge folding blades $h^2 h^5$, already described, the respective blades must be moved inwardly toward the adjacent recess $j^{25}$ or $j^{26}$, as the case may be, and to accomplish this movement I have provided the mechanism shown in elevation in Fig. 14, it being understood that precisely similar mechanism as therein shown is provided at each end of the machine, as shown in Figs. 4 and 8. I have already explained that the crank-sector $c^2$, being keyed to shaft $b$, serves to rock said shaft. Adjacent each end of the shaft is fixed thereon a crank-arm $b^2$, having a roll $b^3$ at its free end to ride in a cam-path $b^4$ of a lever $b^5$, pivoted at $b^6$ and having an elongated slot $b^7$ at its upper end to receive a roll $b^8$ on a stud projecting from the central carriage G at $g^3$, (see Figs. 14 and 52,) the cam-path $b^4$ having an offset $b^9$ intermediate two idle portions, whereby as the shaft $b$ is rocked the lever $b^5$ will be oppositely rocked on its pivot $b^6$, causing its upper end at $b^7$ to move in the same direction as the crank $b^2$ and shift the central carriage G correspondingly in the ways $e^4$ of the central guide plate or bracket $e^3$.

In order properly to shift the front and rear carriages H H', I have mounted also on the pivots $b^6$ T-levers $b^{10}$, having downturned portions $b^{11}$ at each end of the lower arms to be engaged by an automatic bell-crank or a spring-dog crank $b^{12}$, fixed on shaft $b$ adjacent the crank-arm $b^2$ and shown in detail in Fig. 18 as consisting of a segmental plate, at each side of which is mounted a radial arm $b^{13}$, having a dog $b^{14}$ pivoted thereto at $b^{15}$ and held by a spring $b^{16}$ normally against a projecting lip $b^{17}$, whereby the dog is rigid as it engages the arm $b^{11}$ from the inside and may thereby shift said arm and is yielding when it engages the arm on its return movement from the outside inward. Slots $b^{18}$ are provided in the bell-crank in order to permit one arm $b^{13}$ to be adjusted relatively to the other, so as to vary the throw of the folding-blade carriages H H'; also the engaging ends of the dogs $b^{14}$ are preferably provided with friction-rolls $b^{19}$. At its upper or stem end $b^{20}$ the T-lever $b^{10}$ engages a notch $b^{21}$ in the under side of the yoke $h'$. By this construction it will be evident that as the bell-crank $b^{12}$ moves to the right, Fig. 14, its forward pawl $b^{14}$ will engage the right-hand portion $b^{11}$ of the T-lever $b^{10}$, swinging the upper end $b^{20}$ to the left, and thereby correspondingly shifting the carriages H H' and their edge or side folding blades, their ends $h$ being free to slide in the ways $f^8$, provided therefor, as already described. The rear or following dog $b^{14}$ offers no obstruction to this movement for the reason that when it strikes the outer side of the depending portion $b^{11}$ it simply swings over out of the way on its pivot $b^{15}$, and immediately upon having passed said depending portion $b^{11}$ its spring $b^{16}$ brings it back against the stop $b^{17}$ into operative position to positively engage the inner side of said depending portion upon being rocked in the opposite direction.

From the above description it will be seen that as the lever $b^5$ slides the central carriage G in one direction the T-lever $b^{10}$ slides the outer carriages H H' in an opposite direction. The timing of these movements will be explained later on.

Besides the vertical movements already described for the folding-blades I have provided a lifting-rod $m$, (see Figs. 4, 14, and 19,) which rests in loose contact against the under edge of the rear carriage H', this rod being loosely mounted by a collar $m'$, Fig. 19, on a shaft $n$, journaled in the lower rear part of the frame A, said collar having an arm $m^2$ projecting forward and provided at its forward end with a pivoted finger $m^3$, held by a spring $m^4$ against a stud $m^5$ to be engaged by the sloping face $m^6$ of a cam $m^7$, said cam having a concentric surface $m^8$ for the rest of its length from the rear of said sloping face $m^6$, whereby when the said cam is moved in the direction of the arrow, Fig. 19, it will depress the arm $m^2$, and thereby slightly raise the rear carriage H' for a purpose to be explained later on in connection with the former.

The end blades or knives are shown in detailed elevation in Figs. 24 to 29 and in similarly-enlarged plan view in Fig. 23, the latter figure being considerably broken out at its middle portion, as will be seen by comparison with Figs. 52 and 53, and showing the parts about one-half their actual size. These end-folding blades or folders or end-folding mechanism are four in number, two folders P P' to fold the ends of the blank Q, Fig. 69, lying on the front bed J, and two folders $P^2 P^3$ to fold the ends of the blank Q', Fig. 75, lying on the rear bed J', the corners folded thereby being respectively shown in Figs. 74 and 46 to 48. These end blades individually have motions peculiar to themselves, derived from the shaft $b$, said shaft being provided at its right-hand end with an arm $r$, Fig. 1, and at its left-hand end with a similarly-arranged arm $r'$, Fig. 3, provided, respectively, with surfaces to engage rolls $r^2 r^3$ on the ends of short cranks, similarly arranged adjacent thereto at the opposite outer ends of short shafts $r^4 r^5$, Fig. 23, centrally located above but independent of the central carriage G and each journaled at its outer end in a bearing $a'$ of an auxiliary frame $a^2$, Fig. 4, at each end of the main frame and at its inner end in a bearing $a^3$, secured to the bed of the main frame A.

The cam-surface of the crank $r$ is shown in Figs. 1 and 2, the former figure showing the outer side thereof and the latter figure showing the inner side thereof, where it will be seen that the crank has a segment $r^6$, on one side of which is pivoted at $r^7$ a latch-like projection $r^8$, held against a stop $r^9$ by a spring $r^{10}$, and is provided on its other side with a bearing-surface $r^{11}$, supported by links $r^{12}$ in parallel-ruler fashion and held against a stop $r^{13}$ by a spring $r^{14}$. The short cranks have their rolls $r^2 r^3$ placed so as to contact only with the cam projections $r^8 r^{11}$, being separated from each other the width of the segment $r^6$, (see Fig. 5,) and accordingly when the shaft $b$ rocks to the right, Fig. 1, the projection $r^8$ contacts unyieldingly with the roll $r^3$, thereby rocking the shaft $r^4$ to the left, and at the same time the projection $r^{11}$ yields as the roll $r^2$ comes in contact therewith, whereas on a reverse movement the projection $r^{11}$ is unyielding and raises the roll $r^2$, rocking the shaft $r^4$ to the right or toward the rear of the machine, and the projection $r^8$ yields out of the path of the roll $r^3$, so as not to interfere with the swinging movement of the arm $r$ and roll $r^2$. The arm $r'$ at the opposite end of the shaft $b$ acts in a similar manner to rock the shaft $r^5$ by means of its rolls $r^2 r^3$, the latter roll, however, being so placed as to ride on the segment $r^{15}$ of the arm $r'$, (see Fig. 5,) and the roll $r^2$ being so placed as to be out of contact with the segment $r^{15}$ and ride on the cam-plate $r^{16}$, which is adjustably bolted to the back side of the plate $r^{15}$ and provided with a shoulder $r^{17}$ to raise the roll $r^2$ in order to rock the shaft $r^5$; said shaft being rocked in one direction by the riding of the roll $r^3$ upon the segment $r^{15}$ and in the other direction by the riding of the roll $r^2$ upon the raised portion beyond the shoulder $r^{17}$ of the cam-plate $r^{16}$. The rocking of the shaft $r^4$ serves to shift the adjacent end blades or knives both front and rear by means of a T-lever $r^{18}$, pivoted at $r^{19}$ in a bridge $a^4$ of a slide $a^5$, adjustable by bolts $a^6$ in a bracket $a^7$, projecting from the auxiliary frame $a^2$, as clearly seen in Fig. 23. The adjustment by means of the slide $a^5$ is to provide for different lengths of blanks. Said T-lever, Fig. 23, has a slot $r^{20}$ in its stem, in which is adjustably bolted at $r^{21}$ a fork $r^{22}$, (see Fig. 25,) which straddles a roll $r^{23}$, projecting from a collar $r^{24}$ on the shaft $r^4$.

The arms of the T-lever $r^{18}$ are provided at their extremities with depending rolls $r^{25} r^{26}$, the former having its arm $r^{27}$ pivoted at $r^{28}$ to the body of the T-lever and normally held down by a spring $r^{29}$, (see Figs. 23 and 25,) the free end of the arm $r^{27}$ being intermittingly lifted by the mechanism shown in Fig. 30, as and for a purpose explained later on, at which time a plunger $r^{30}$, (see Fig. 23,) mounted in an ear $a^8$ of the slide $a^5$, is projected by a spring $r^{31}$ beneath the roll $r^{25}$, so as to sustain it out of its previous engagement, the spring $r^{31}$ bearing at its rear end against an angle-iron $a^9$ at one side of the ear $a^8$.

The folder P' is provided at its rear end with a slide-block $p$, containing a slideway (see Fig. 25) to fit on a track $p'$, secured to the ear $a^6$ by a screw-bolt $p^2$ and adjustable thereon by means of a screw $p^3$ in a slot $p^4$, provided in a flange $p^5$, projecting forward from the lower edge of the ear $a^8$, as is clearly shown in Figs. 23 and 25, said slide-block $p$ extending upwardly and rearwardly and provided with a slot $p^6$ to receive the roll $r^{25}$, Fig. 23, so that as the T-lever is swung to carry its roll $r^{25}$ inwardly toward the left, Fig. 23, said roll thereby slides the folder P' forward in its folding operation, and immediately upon the roll being disengaged from the slot $p^6$ by the means before alluded to and yet to be explained the folder P' is immediately drawn back by a spring $p^7$, secured at one end to the slide $p$ and at its opposite end to the end of a prong $p^8$, fixed in the stationary track $p'$. The bottom part of the folder mechanism P' comprises a plate $p^9$, pivoted at $p^{10}$ to a block $p^{11}$, adjustably secured to the slide $p$ by any suitable means, the latter being herein shown as provided with a dovetail $p^{12}$, entering a groove in the block $p^{11}$, (see Fig. 25,) and provided with a set-screw $p^{13}$, (see Fig. 29,) projecting in a recess $p^{14}$ in the block $p^{11}$ to clamp the latter in any desired adjustment to suit particular folding-blades.

The plate $p^9$ is offset at $p^{15}$ in order to raise its projecting portion to receive beneath it a blade-carrier $p^{16}$, pivoted thereto at $p^{17}$ and carrying at its forward end a folding-blade $p^{18}$, said blade-carrier being normally held back by a spring $p^{19}$, secured to the plate $p^9$ and to a pin $p^{20}$, projecting from the carrier through a slot $p^{21}$ in the plate $p^9$, said blade-carrier being moved against the action of spring $p^{19}$ by the contact of a pin $p^{22}$, adjustably secured thereto, when it comes in contact with the edge of the carriage H at $p^{23}$. The blade-carrier $p^{16}$ is also provided opposite to the pin $p^{22}$ with an adjustable finger $p^{24}$, adapted to contact with the upwardly-projecting end of a bolt or pin $g^4$ and thereby move rearwardly a movable corner $g^5$ of the edge blade $g'$, said corner being normally held forward by a spring $g^6$, bearing on a pin $g^7$, movable with said bolt $g^4$, the latter projecting from said corner portion through a slot $g^8$ in the body portion of the blade $g'$.

In practice I have found it convenient to omit the finger $p^{24}$ and occasion the desired movement of the corner portion simply by the contact therewith of the corner of the blade-carrier $p^{16}$. Any suitable means for accomplishing the movement described may be used.

The plate $p^9$ and all the parts carried thereby, including the blade $p^{18}$, are normally held firmly down toward the bed by a spring $p^{25}$, being raised therefrom at the required time by an arm $p^{26}$, having an adjustable bearing-screw $p^{27}$ in its forward end to be engaged by a raised portion $h^8$ on the adjacent end of the front side blade $h^2$, said screw $p^{27}$ being at that time in its forward position, overhanging the blade $h^2$, so that when the latter is raised by the mechanism already described it engages the screw $p^{27}$ and correspondingly raises the folder P' on its pivot $p^{10}$ to permit the latter to be drawn back by its spring $p^7$ away from the folded blank without dragging over the latter, which would tend to disarrange the fold.

The extreme adjacent corner $h^9$ of the blade $h^2$ is thin and somewhat yielding in order to permit it to yield to the several thicknesses of the cloth as the blank is folded at the corner beneath the same, this yielding corner thereby preventing the entire blade $h^2$ from being raised by said thicker corner of the folded blank and permitting the blade to bring an even pressure on the folded blank throughout the whole extent of its front edge fold.

The remaining folders P P² P³ (shown in plan in Fig. 23 and in elevation in Figs. 24 to 28) are provided with slide-blocks $p^{28}$ $p^{29}$ $p^{30}$, respectively, containing slideways to fit on tracks, precisely the same as already described in connection with the folder P', secured in the same manner to ears $a^{10}$ $a^{11}$ $a^{12}$ and adjusted therein by set-screws $p^{31}$ $p^{32}$ $p^{33}$, the same as already described for folder P', the folder P³ having a slot $p^{34}$ to receive the depending roll $r^{26}$ of the T-lever $r^{18}$ and the folders P P² having similar slots $p^{35}$ $p^{36}$ in the outer ends of their slide-blocks to receive, respectively, depending rolls $r^{32}$ $r^{33}$ of a T-lever $r^{34}$, pivoted at $r^{35}$ to the bridge of a slide $a^5$, identical with the opposite slide $a^5$ and movable in a similar bracket $a^7$, projecting from the auxiliary frame $a^2$ at that side of the machine, said T-lever being actuated by a similar mechanism to that already described for the T-lever $r^{18}$, the parts of which I have lettered correspondingly with those already described.

The folders P P² P³ have their bottom plates respectively hinged at $p^{10}$ to a block $p^{11}$, similar in construction and adjustable in a similar manner to the same parts already described in connection with the folder P', said corresponding parts being similarly lettered in connection with all the folders. The lower portions, however, of the various folders differ from each other.

Referring to the front left-hand folder P, it will be seen to comprise a bottom plate $p^{37}$, normally held down by a spring $p^{38}$, carrying a folding-blade $p^{39}$ at its front edge and provided adjacent thereto at its front side edge with a lug or lifter $p^{40}$, adjustably secured at $p^{41}$ to lift the adjacent corner $h^{10}$ of the front edge-folding blade $h^2$ by the engagement with said lug $p^{40}$ of a beveled lip $h^{11}$, fastened to said corner portion $h^{10}$, both said corner portions and lip being carried at the outer end of a leaf-spring $h^{12}$, secured at its inner end to the blade $h^2$, this provision being made in order to lift the corner $h^{10}$ of the edge blade out of the way and permit the end-folding blade $p^{39}$ thereby to enter and make a neat and accurate corner and end fold, the adjacent corner of the rear folding-blade $g'$ being thinned down at $g^9$ to permit the blade $p^{39}$ to pass over it.

The folder P³ has its plate $p^{42}$ offset or raised at its forward end $p^{43}$ to receive a blade-carrier $p^{44}$ to slide beneath it, said carrier being guided in slots $p^{45}$, Fig. 23, and having a roll $p^{46}$ projecting vertically through a slot $p^{47}$ in the plate $p^{42}$ to engage an obliquely-arranged shifting-plate $p^{48}$, which depends above the said roll $p^{46}$ and plate $p^{42}$ from a hanger $p^{49}$, secured to a spindle $p^{50}$, projecting from the front end of the stationary track $p'$, so that when the slide-block, and consequently the plate $p^{42}$ and carrier $p^{44}$, is moved forward by the roll $r^{26}$ of the T-lever $r^{18}$ the roll $p^{46}$, carried by the blade-carrier $p^{44}$, is brought into forcible contact with the oblique shifting-plate $p^{48}$ and rolls along the inclined surface thereof, thereby shifting the blade-carrier $p^{44}$ forward, the latter being retracted at the proper time by a spring $p^{51}$. The carrier $p^{44}$ has a folding-blade $p^{52}$, secured thereto at its front edge, said blade being provided with a finger $p^{53}$ at its extreme rear end, projecting forward at an acute angle, as shown in Fig. 23, in order by means of the diagonally-forward movement just explained, due to the roll $p^{46}$ and plate $p^{48}$, to wipe forward the corner of the lapped-over blank when the latter is folded at the end, and thereby prevent any ragged edge, as will appear more clearly in the course of further description. The plate $p^{42}$ has secured on its upper side a spring $p^{54}$, slantingly bent upwardly at its rear end to engage a roll $p^{55}$, journaled in a bearing $p^{56}$, fixed on the shaft $p^{50}$, as clearly shown in Figs. 23 and 28, this spring serving to hold the folding-blade down firmly on the blank as it is folding the latter, but passing from under the roll $p^{55}$ as the blade is being moved back from the folded blank, and thereby taking the pressure of the blade off from the blank in its said backward movement.

Referring to the folder P² it will be seen that its plate $p^{57}$ is depressed and made thin at its forward portion $p^{58}$ and turned upward at its extreme edge in order to ride up on the blank and former, (to be described,) the forward edge of said end portion constituting the folding-blade. A top plate $p^{59}$ is secured to the rear part thereof by a pivot-screw $p^{60}$, around which said top plate may be adjusted by means of a slot $p^{61}$ and set-screw $p^{62}$ (shown in dotted lines, Fig. 23) in order to change the angle which said plate will make at the corner of the blank, as will presently appear. Said top plate carries between it and the thin portion $p^{58}$ of the main plate a sliding piece $p^{63}$, guided in slots $p^{64}$ in the top plate, being moved forward by a lever $p^{65}$, engaging at its forward end a pin $p^{66}$ and at its rear end pivoted at $p^{67}$ to the main plate $p^{57}$, said lever being provided with an adjustable lug $p^{68}$ to come in contact with the rear carriage H', to be thereby moved, and correspondingly move the plate $p^{63}$ forward against the action of a spring $p^{69}$, tending to hold it back, said plate $p^{59}$ being slightly broken away, Fig. 23, to show the engagement of lever $p^{65}$ and plate $p^{63}$. The sliding plate $p^{63}$ is provided with a hooked end $p^{70}$, which coöperates with a cut-away portion $p^{71}$ of the thin lower plate to haul in as it is moved forward and hold down the projecting end of the corner previously folded by the rear edge plate $h^5$. Said sliding plate $p^{63}$ is provided with a finger $p^{72}$ to ride under a cam-lug or incline $p^{73}$ on the top plate as the slide-plate moves forward, thereby causing the lip or hook $p^{70}$ to press firmly on the block as it moves forward, said finger $p^{72}$ riding up on the inclined top surface of the lug $p^{73}$ as it moves back, and thereby lifting the said hook $p^{70}$ clear of the corner which it has just finished folding, so as not to disturb the folds thereof in its backward movement. The rear edge blade $h^5$ is provided with a shoulder $h^{13}$ to prevent interference with the hook $p^{70}$. A spring $p^{74}$ and a roll $p^{75}$, engaged thereby, are provided substantially the same and for the same purpose as already described in connection with the spring $p^{54}$ and roll $p^{55}$ of the folder P³.

Having described all the mechanism on and moving directly over the frame and bed of the machine, I will now describe the mechanism provided for receiving and feeding the blanks into position to be folded.

Referring to Figs. 1 and 3, it will be seen that I provide at the front of the machine a table G for delivering the unfolded blanks and receiving them after they have been folded, said table in practice being immovably secured to the rest of the machine and being shown in detail in Figs. 66 to 68, where it will be seen to comprise three shelves $s$ $s'$ $s^2$, the first of which is provided with two stands $s^3$, having ledges $s^4$ at their lower ends and notches $s^5$ $s^6$ cut in their upturned side flanges to receive and hold the ends of the feeding-plates T T', yet to be described. The top shelf $s^2$ is the receiving-shelf and is provided with grooves $s^7$ $s^8$ in opposite pairs, the grooves $s^8$ having spring-stops $s^9$ therein (see Fig. 67) to permit movement from the inside outward and prevent movement toward the rear and is provided also with adjustable plates $s^{10}$ $s^{11}$, also in opposite pairs and having beveled forward edges $s^{12}$ to automatically remove the holding tacks or buttons $t$ from the feeding-plates, the former for the plate T and the latter for the plate T', as will presently be explained. The intermediate shelf $s'$ is the delivery-shelf, from which the carriers, which may form part of the feeding mechanism, take the feeding-plates and, as herein shown, deliver them to a positioning device, also forming part of the feeding mechanism, said feeding mechanism in the embodiment of my invention hereinafter to be explained comprising the carriers and the positioning device. The carriers take the feeding-plates automatically and present them automatically to the positioning device, the latter placing said plates in position for their blanks to be folded, and while I prefer to use the feed mechanism herein represented my invention includes under the term "feeding mechanism" anything which will take and deliver a feeding-plate with a blank in position to be folded, whether from a table or support or from any intermediate or other device.

The shelf $s'$ is provided with slots or ways $s^{13}$ $s^{14}$ in opposite pairs, in the former of which are movable metal cushioning-blocks $s^{15}$, carried by the free ends of bell-crank levers $s^{16}$, (clearly shown in dotted lines in Fig. 68,) said bell-cranks being pivoted to the shelf and mounted at their opposite ends on a bar $s^{17}$, held to the left by a spring $s^{18}$ and movable in an opposite direction by a fork $s^{19}$ on a rod $s^{20}$ and operated by a knee-lever $s^{21}$, so that as the latter is swung to the right it will instantly move the blocks $s^{15}$ forward toward the closed ends of the slots $s^{13}$.

Referring to Figs. 69 to 73, the feeding-plate T for the neckband of a turn-down collar will be seen to consist, as herein shown, of three main pieces $t'$ $t^2$ $t^3$, the former having a dovetail $t^4$, on which the latter two may slide in order to be extended or contracted to accommodate them to different lengths of blanks, removable sections $t^5$ being interlocked therewith at their inner ends, as shown in Fig. 70, said sections being perforated at $t^6$ to receive locking-pins $t^7$, carried by springs $t^8$ on the under side of the body-piece $t'$. Secured on the upper sides of the extension-pieces $t^2$ $t^3$ are transverse supports $t^9$, projecting at each side of the plate in order to support the blank in proper position when it is secured in place. Between the sections $t^5$ at the middle of the plate I secure a transverse support $t^{10}$, having a countersunk depression $t^{11}$ therein to receive a holding-tack or fastening $t$, Fig. 72.

Each of the supports mentioned has beveled edges or grooves to slide in dovetailed ways provided therefor in the adjacent part, and each support is provided with adjusting means, whereby it may be secured in any position to suit the different styles and sizes of collars, the middle support $t^{10}$ being provided with perforations $t^{12}$ to receive a spur $t^{13}$ on the extended end $t^{14}$ of the spring $t^8$, and the supports $t^9$ being notched at one edge $t^{15}$ to engage a slide projection $t^{16}$ in the adjacent extension-piece.

At the extreme ends of the extension-pieces I have provided countersunk depressions $t^{17}$, beneath which are spring-jaws $t^{18}$, Fig. 71, to receive the holding-tacks $t$, said jaws gripping the tacks and holding them firmly during the operation and readily permitting their removal thereafter.

At the ends of the bottom piece $t'$ I have provided lugs $t^{19}$, similar to that shown in Fig. 79, each lug having a rib $t^{20}$ extending across its inner side to guide it into the carrier, as presently described, and a recess $t^{21}$ in its outer side to receive spring holding-clamps on the carrier. Slightly in from the guide-lugs $t^{19}$ are locking-lugs $t^{22}$. (Shown in detail in Fig. 73, where it will be seen that they have a slightly-cut-away portion $t^{23}$ on one side and are considerably recessed at $t^{24}$ on their opposite side, the latter side being the forward side as they are carried inwardly toward the machine by the feeding mechanism, said recess $t^{23}$ being slightly beveled toward its inner side in order to permit the locking device, presently to be explained, to enter freely.)

Fig. 69 illustrates how a blank is placed on the feeding-plate T, already described, said blank being in the present instance for the band of a turn-down collar, being held thereon by the holding-tacks or fastenings $t$, as already described, said figure showing a blank composed of a facing $q$ and a lining $q'$, the latter having its corners cut away, as is usual.

Figs. 75 to 80 illustrate the form of feeding-plate for the blanks to form the top of a turn-down collar, said plate comprising three main pieces $t^{50}$ $t^{26}$ $t^{27}$, corresponding, respectively, to the parts $t'$ $t^2$ $t^3$ of plate T, dovetailed together and secured in place by springs $t^{28}$, an extension-section $t^{29}$, similar to the section $t^5$, being interlocked with the extension-piece $t^{26}$, and transverse supports $t^{30}$ and $t^{31}$ being provided in the same manner and for the same purpose as the supports $t^9$ $t^{10}$, before described, the support $t^{31}$ having a depression and tack-aperture $t^{32}$ in its top side to coöperate with spring holding-jaws $t^{33}$ in the under side. The plate T' is also provided at its ends with supports and securing-bars $t^{34}$, provided with places $t^{35}$ to receive the holding-tacks, as already explained, and at its under side with the guide-lugs $t^{19}$ and locking-lugs $t^{22}$, before described in connection with the feeding-plate T.

Fig. 75 shows a blank Q' secured in place on the feeding-plate by means of securing-tacks or fastenings $t$.

The above-described feeding-plates have been found in practice to be very serviceable; but it will be understood that the main idea of this part of my invention is to provide a frame or support which shall require as little metal as possible and yet be rigid and of sufficient extent to maintain a blank extended thereon while being fed into its ultimate position to be folded, the feeding-plate at the same time being preferably capable of variation in shape and extent in order to accommodate it to the various patterns and sizes of collars, cuffs, or whatever particular article it is intended to carry.

In Fig. 70 I have shown the feeding-plate as provided with two extension-sections, one on each side of the securing-support $t^{10}$, whereas in Fig. 76 I have shown one such section $t^{29}$ on one side of the securing-support $t^{31}$ and have shown on the other side thereof the extension-piece $t^{27}$, moved against the support $t^{31}$ without any extension-section between them, this arrangement having been desirable with the particular collar-blank for which the feeding-plate T' had been used, and it serves to illustrate the manner of use of the feeding-plates, it being understood that if a longer blank is to be supported additional extension-sections $t^{29}$ will be inserted on one or both sides of the securing-support $t^{31}$, as may be required.

The blank having been fastened on its feeding-plate, said plate is taken automatically from the table S by a carrier V, (shown best in Figs. 1 to 8 and 10) it comprising a carriage reciprocated in a frame $v$ by a lever $v'$, having a slot $v^2$ in its upper end, riding over a pin or roller $v^3$ on the rear end of the carriage and pivoted at its lower end between ears $a^{10}$ on a bracket $a^{11}$, projecting from the frame A, said lever $v'$ being operated by a crank $v^4$, connected thereto by a link $v^5$ and secured on the end of a shaft $v^6$, mounted in a journal-bracket $a^{12}$, projecting from the rear of the frame A, said shaft having at its opposite end a pinion $v^7$, meshing with an interrupted gear $v^8$, herein shown in the form of toothed segments $v^9$, (see Fig. 1,) adjustably secured to the side of the gear $d^8$, already described. Each of said segments is provided at its forward end with a projection $v^{10}$, (see Fig. 6,) which engages an arm $v^{11}$, carried by the gear $v^7$, in order to start the gear without producing any shock on the teeth, said pinion being normally held by a locking device $v^{12}$ in the form of a dog held down by a spring $v^{13}$ to engage a notch $v^{14}$ in the hub of the gear $v^7$, said dog acting to lock said gear when the carrier V has been removed to its extreme rear position. The carrier V has at its upper side two arms or carrying members $v^{15}$ and at its lower side two arms or members $v^{16}$, each provided at one side with a rib or spline $v^{17}$ to travel in tracks provided therefor in the frame $v$. The arms or members $v^{16}$ project forward for convenience slightly ahead of the arms or members $v^{15}$, the latter constituting the means for delivering a folded blank and its feeding-plate from the machine, the arms or members $v^{16}$ constituting the receiving means to take a blank on its feeding-plate and start it into the machine. The arms or members $v^{16}$ are provided at one side with wedges $v^{18}$ (see Fig. 10) and on their other sides with springs $v^{19}$, having conical enlargements $v^{20}$ at their outer end, the members $v^{16}$ being cut away at $v^{21}$ opposite said enlargements, and the members $v^{15}$ are provided with similar wedges $v^{22}$, turned in the opposite direction, however, and with similar enlargements $v^{20}$ on springs $v^{23}$ and cut-away portions.

The wedges and springs last mentioned are provided to coöperate with the positioning devices $k$ $k'$ already mentioned, said devices, together with the carriers, constituting, as stated, one form of feeding mechanism, being seen to best advantage in Figs. 6, 8, 9, 11, and to 13, where it will be seen that each positioning device is provided with horizontal slots $k^6$ across its ends and with vertical slots $k^7$ adjacent thereto in its front edge, the latter slots having divergently-sloping portions $k^8$ extending therefrom at top and bottom, said positioning device also having a locking-bolt $k^9$ on a pin $k^{10}$, held forward by a spring $k^{11}$, said bolt extending across the front entrance of the slot $k^7$ and the forward end of the pin $k^{10}$ extending into the slot $k^6$. This arrangement, in connection with the wedge and springs of the carrier, coöperates to receive and release the feeding-plates T T', the slots $k^7$ $k^8$ receiving the locking-lugs $t^{22}$ and being locked therein by the bolts $k^9$ and being held therein, said feeding-plates having been carried by the receiving member or feeding-in carrier $v^{16}$ to said positioning devices, said feeding-plates having been held in the carrier $v^{16}$ by guide-lugs $t^{19}$, retained in notches $v^{21}$ by the spring enlargements $v^{20}$ entering their sockets $t^{21}$, and the feeding-plate being shifted from its carrier to the positioning device by having come in contact with the front side of the positioning device $k$ or $k'$, its wedges $v^{18}$, bearing against the ends of the pins $k^{10}$, having at once moved back the bolts $k^9$ and permitted the locking-lugs $t^{22}$ to enter the slots $k^7$ $k^8$, the enlargements $v^{20}$ at the same time yielding and allowing the feeding-plate to leave the carrier and be locked in the positioning device by the bolts $k^9$ when released by the passage of the wedges $v^{18}$ to the rear.

Referring to Figs. 4 and 8, it will be seen that the head-bars $k^4$ $k^5$ are provided with depending T's $k^{12}$, which serve to lift the positioning devices by the contact therewith of rolls $k^{13}$ $k^{14}$, carried by lifters $k^{15}$ $k^{16}$, (see Fig. 4,) projecting, respectively, inwardly from lifting-bars $k^{17}$ $k^{18}$, the latter being raised and lowered by cranks $k^{19}$ $k^{20}$, (see Fig. 3,) fast on the left-hand ends of the shafts $n$ and $k^{21}$. The last-mentioned shafts are rocked by means of two similar path-cams $k^{22}$ $k^{23}$, (Figs. 3 and 7,) fast on the shaft $c$ and therefore rocked thereby by the sector $c'$ and gear $c^2$, already described. The shaft $k^{21}$ has an arm $k^{24}$, provided with a roll $k^{25}$ to enter the path-cam $k^{23}$, and the shaft $n$ has a similar arm $k^{26}$, whose roll $k^{27}$ runs in the path-cam $k^{22}$. The path-cams $k^{22}$ $k^{23}$ are formed and set relatively to each other so as to give the positioning device a peculiar intermittent motion, to be more fully described farther on, lifting them at proper intervals and then lowering them respectively into rigid position in the recesses $j^5$, as shown in Fig. 9.

It is understood that each positioning device $k$ or $k'$ is raised in line with the carrier member $v^{16}$ to receive a feeding-plate therefrom and is raised into the higher plane of the carrier member $v^{15}$ to deliver a feeding-plate thereto after the blank has been folded. In order to accomplish this additional raising of the positioning devices, I have provided a cam-plate $v^{25}$, Fig. 9, mounted to slide on a bar or track $v^{26}$, secured at its ends to brackets $a^{13}$ at the front and rear of the frame, said cam-plate $v^{25}$ being reciprocated on said track by a link $v^{27}$, secured to the carrier V to move therewith.

The plate $v^{25}$ has a straight path $v^{28}$, provided with a switch or gate $v^{29}$ at its front end, normally closing said path and extending in line with an oblique path $v^{30}$, which continues to the rear in a horizontal and downward path $v^{31}$, having at its rear end a switch $v^{32}$, held upwardly by a spring $v^{33}$. These cam-paths in the plate $v^{25}$ are provided to receive rolls $k^{28}$ $k^{29}$, carried by the positioning devices and herein shown as secured, respectively, to the head-bars $k^5$ $k^4$. Thus when either positioning device is lifted by the rolls $k^{13}$ or $k^{14}$ the roll $k^{28}$ or $k^{29}$, as the case may be, comes into contact with the switch $v^{29}$ of the forwardly-moving plate $v^{25}$ and is lifted by means of said switch and the incline $v^{30}$ away from the lifting-roll $k^{13}$ or $k^{14}$, so as to bring the positioning device into the plane of the upper carrier member $v^{15}$, and having delivered the folded blank and its feeding-plate to said member $v^{15}$ the positioning device is at once dropped by the downward portion of the path $v^{31}$ into the path $v^{28}$, the switch $v^{32}$ permitting this movement and at once again closing the path $v^{31}$. The positioning device drops against its lifting-roll $k^{13}$ or $k^{14}$ and is held thereby in line with the carrier member $v^{16}$ to receive another feeding-plate and blank therefrom, the path-cam $v^{25}$ passing to the rear of the machine in the backward movement of the carriage V without affecting the position of the raised positioning device, the roll $k^{28}$ or $k^{29}$ of the latter simply passing through the horizontal path $v^{28}$.

The front and rear formers N N' (shown in Figs. 32 to 37 and 38 to 42, respectively) are raised and lowered by the mechanism last described, the former N being supported from a cross-head $n'$, movable vertically in ways $n^2$ at each end of the machine and connected at its left-hand end at $n^3$ with the lifting-bar $k^{17}$, Fig. 8, and at its right-hand end at $n^4$ with a similar lifting-bar $n^5$, operated by a crank $n^6$, similar to the crank $k^{19}$, and secured to the same shaft $n$ at the right-hand end of the machine. (See Figs. 1 and 3.) The former N' is supported from a similar cross-head $n^7$, vertically movable in ways $n^8$ at each end of the machine by means of the crank $k^{20}$, and lifting-bar $k^{18}$, secured thereto at $n^9$ at the left-hand end of the machine, and a similar crank $n^{10}$ and lifting-bar $n^{11}$, secured thereto at $n^{12}$ at the right-hand end of the machine, said two lifting-bars being operated by the shaft $k^{21}$, to the ends of which their cranks are fast.

Referring to Figs. 32 to 37, which show the front former and its operating mechanism, it will be seen that the former N, as shown, comprises three portions, a middle piece $n^{13}$ and similar end pieces or end definers $n^{14}$ $n^{15}$, said end definers being movable independently of said middle piece, as will be explained. The middle $n^{13}$ is shown in Fig. 32 as made in two parts $n^{16}$ $n^{17}$, each provided with dovetails $n^{18}$ in its upper edge to enter corresponding grooves $n^{19}$ in a bridge $n^{20}$, adjustable in ways $n^{21}$, provided in hangers $n^{22}$, fixed to the under side of a shifting plate $n^{23}$, carried by a frame $n^{24}$, vertically movable in the cross-head $n'$, screws $n^{25}$ being provided to insure accuracy of said vertical movement. The bridge $n^{20}$ is adjustable on the ways $n^{21}$ in order to accommodate it to the position of variously-curved formers, and the dovetail connection $n^{18}$ $n^{19}$ is provided to permit the former to be lengthened for the different sizes of blanks, the outer ends of the middle pieces $n^{16}$ $n^{17}$ having threaded studs $n^{26}$, Fig. 37, and nuts $n^{27}$, Fig. 32, for endwise adjustment in a slotted bracket $n^{28}$, and interlocking extension-sections $n^{29}$ (see Fig. 42) being provided, each preferably having a width corresponding to a size and each provided at its lower end with a portion $n^{30}$ of the former to fit between the end pieces $n^{16}$ $n^{17}$ and having dovetails $n^{31}$ to enter the grooves $n^{19}$, and pins $n^{32}$ to enter the adjacent ends of the end pieces.

In Fig. 32 I have shown the former as provided with one extension-piece, while I have shown the former in Fig. 38 without any extension-piece, it being understood that as many as desired may be used. The end pieces $n^{14}$ $n^{15}$ of the former are each carried by an arm $n^{33}$, Fig. 37, and held to slide in ways $n^{34}$ $n^{35}$ by a spring $n^{36}$ and provided with a stop-pin $n^{37}$ to limit their outward movement, being moved by a bell-crank $n^{38}$, having a cam-groove $n^{39}$ in its upper end, in which travels a pin $n^{40}$ on the end of an arm $n^{41}$, adjustably secured to an actuating slide-bar $n^{42}$, reciprocating in the cross-head $n'$. The bell-crank $n^{38}$ is pivoted at $n^{43}$ on an arm adjustably mounted on a way $n^{44}$, in order to permit the end piece $n^{14}$ or $n^{15}$ to be moved outwardly and inwardly, according to the length of the blank and the number of extension-pieces $n^{29}$ which are used.

In addition to the mechanism mentioned the end piece $n^{15}$ is provided with a quick return movement by means of a spring $n^{45}$, which instantly returns the end piece $n^{15}$ to its forward position as soon as the pin $n^{40}$ has moved it to its retracted position, the cam-slot of the bell-crank $n^{38}$ being provided for this purpose with a latch or switch $n^{46}$, pivoted on a pivot $n^{48}$ of the bell-crank and held down by a spring $n^{47}$, so that as soon as the pin $n^{40}$ has ridden over the switch $n^{46}$ it is free to drop behind said switch and permit the spring $n^{45}$ to restore the end piece $n^{15}$, and the switch will yield thereafter to allow the pin $n^{40}$ to move back again to the right-hand end of the bell-crank. The cross-head $n'$ is provided with transverse bars $n^{48}$ $n^{49}$ $n^{50}$ $n^{51}$, V-shaped on their under side to coöperate with slide-blocks $n^{52}$ $n^{53}$ $n^{54}$ $n^{55}$, each mounted to slide freely on the top side of the slide-bar $n^{42}$. The slide-blocks $n^{52}$ $n^{54}$ are normally held toward the left by springs $n^{56}$ $n^{57}$, while the other slide-blocks are free to remain in whatever position they may be left.

The various slide-blocks are substantially alike, excepting that the spring-pressed ones $n^{52}$ $n^{54}$ are level on their upper sides, and the blocks $n^{53}$ $n^{55}$ are provided with notches $n^{58}$ at their extreme forward ends to coöperate with the V cross-bars $n^{49}$ $n^{51}$, as will presently appear.

Each of the slide-blocks is mounted between inclines $n^{59}$, provided at its forward ends, these inclines coöperating with the various transverse bars of the cross-head $n'$ to raise and lower the frame $n^{24}$ and thereby the former in its operation.

The former, as before stated, is mounted on a shifting plate $n^{23}$, (shown in detail in Figs. 34 and 36,) said shifting plate being carried by the frame $n^{24}$ by means of a shoe $n^{60}$, secured between the slotted bracket $n^{28}$ and a cam-piece $n^{61}$ and movable in a runway $n^{62}$ in the base $n^{63}$ of the frame $n^{24}$.

The cam-piece $n^{61}$ has a cam-slot $n^{64}$, engaged by a roll $n^{65}$ on the under side of the slide-bar $n^{42}$, one for each end of the shifting plate. This construction, in connection with the coöperating inclines $n^{59}$ and transverse V-bars $n^{48}$ $n^{51}$, serves to give the former a compound oblique movement to the front or rear as it is raised and lowered.

At its right-hand end the slide-bar $n^{42}$ carries an incline $n^{66}$, (see Fig. 30,) yieldingly held down by a spring $n^{67}$ to coöperate with a pin $n^{68}$ of a lifter $n^{69}$, pivotally connected at $n^{70}$ adjustably to a way $n^{71}$ on the cross-head $n'$, said lifter having a ledge $n^{72}$ projecting at its rear to engage and lift the hinged arm $r^{27}$ of the T-lever $r^{18}$, as before described, and being normally supported at its forward end by a hook $n^{73}$. This provision is to lift the roll $r^{25}$ from the slot $p^6$ and allow it to be supported on the rod $r^{30}$, in order to permit the end-folder P' to be quickly retracted by the spring $p^7$ at the proper moment, as will more fully appear in the description of the operation of the machine.

Referring now to Figs. 38 to 41, I will describe the rear former N'. As shown, the rear former comprises three portions—a middle piece composed of two parts $n^{74}$ $n^{75}$, having dovetails $n^{76}$, mounted in a bridge $n^{77}$, the same as in the front former, and end pieces or definers $n^{78}$ $n^{79}$. The latter are carried by brackets $n^{80}$ on adjustable blocks $n^{81}$, secured to slides $n^{82}$, reciprocated on tracks $n^{83}$ by links $n^{84}$, adjustably secured at $n^{85}$ to levers $n^{86}$, pivotally mounted at $n^{87}$ on pieces $n^{88}$, adjustable on ways $n^{89}$ on the rear cross-head $n^7$, said levers being provided with rolls $n^{90}$, traveling in a peripheral cam-groove $n^{91}$ on an operating rock-shaft $n^{92}$, journaled in the cross-head $n^7$. The links $n^{84}$ have at each end a ball-and-socket joint or other suitable connection $n^{93}$ in order to permit the free movement and adjustment of the tracks $n^{83}$ in horizontal ways provided in hangers $n^{94}$, or vertically in the ways $n^{95}$, or to be swung on their pivots $n^{96}$, or to permit the hangers $n^{94}$ to be adjusted on the ways $n^{97}$, all as clearly shown in Figs. 38, 39, and 43. These various adjustments are provided in order to accommodate the end-folders to various styles of blanks and to various thicknesses, &c., thereof. The bridge $n^{77}$ is carried by a hanger or bracket $n^{98}$, held by a set-screw $n^{99}$ on a pin $n^{100}$, mounted to reciprocate in bearings at the ends of the bottom plate $n^{101}$, Fig. 40, of the frame $n^{102}$, carrying the former N'. The plate $n^{101}$ is provided with ways $n^{103}$ at each end to guide the heads of the brackets $n^{98}$ as the latter are reciprocated by means of bell-cranks $n^{104}$, Fig. 44, which engage at each end the pins $n^{100}$ between collars $n^{105}$ on the pins, and at the other end each receives a stud $n^{106}$ in a slot $n^{107}$, said stud projecting into said slot from the lower end of a plunger $n^{108}$, sliding in the opposite end of a bracket $n^{109}$, secured to the cross-head, said plunger being held under a tendency to move upward by means of a spring $n^{110}$, engaging the lower end of said bracket $n^{109}$, and a pin $n^{111}$ in the plunger. It will thus be evident that by reason of the vertical movement of the frame $n^{102}$ in the cross-head and the horizontal movement of the former N' in the ways $n^{103}$ the middle portion of said former is provided with a compound movement somewhat similar to that already described in connection with the front former N, being moved forward every time the plunger is moved upward by its spring, and being moved rearwardly every time the triggers $n^{121}$, having engaged the notches $n^{123}$, are carried downward by the frame, it being understood that said triggers at the same time carry downward said plungers.

The frame $n^{102}$ carries springs $n^{112}$, one at its front side and another at its rear side, bearing against the cross-head $n^7$ and tending to maintain it in its lowered position, said frame being raised by a cam $n^{113}$, Fig. 45, which bears against a friction-roll $n^{114}$ between it and a bridge-piece $n^{115}$ of the frame, said roll being carried by a fork $n^{116}$, pivoted at $n^{117}$ to the cross-head. The cam $n^{113}$ has a pin $n^{118}$, beveled at its outer end and held forward by a spring $n^{119}$ to operate a tripping mechanism, engaging upon its return movement a lip $n^{120}$, depending from the interlocked triggers $n^{121}$, pivoted at $n^{122}$ to the bridge-piece $n^{115}$ of the frame and adapted to engage at their outer ends notches $n^{123}$ in the upper ends of the plungers $n^{108}$, being held against the plungers by a spring $n^{124}$, so that as the cam lifts the frame the triggers $n^{121}$ are permitted to engage the notches $n^{123}$, the latter being held against further upward movement by the engagement of the pins $n^{111}$ with the upper end of the bracket $n^{109}$, and thereby cause all the parts carried by the frame to subsequently drop together without relatively changed position until the pin $n^{118}$ engages the lip $n^{120}$, whereupon the triggers are thereby moved out of engagement with the notches $n^{123}$, whereupon the plungers $n^{108}$ at once spring upwardly under the influence of their springs $n^{110}$ and springs $n^{125}$, secured to the bracket $n^{98}$, and this movement, through the bell-crank $n^{104}$, moves forward the middle portion of the former N'.

The movements of the formers N N' are performed by means of mechanism located for convenience at the opposite ends of the machine.

Viewing Figs. 1, 4, and 5, the shifting mechanism for the front former, Figs. 32 to 36, will be seen to consist of a cam-wheel $w$, having a peripheral path-cam provided with two deflecting places $w'$ $w^2$ in its course and driven by a gear $w^3$, connected to a pinion $w^4$ by means of an intermediate gear $w^5$, the cam $w$ and gear $w^3$ being secured together and loosely mounted on the shaft $b$. A rocker-arm $w^6$ has a pin $w^7$ running in the groove of the cam-wheel $w$ and connected by its arm $w^8$ with an arm $w^9$ of an upper rock-shaft $w^{10}$, provided with a double-forked lever $w^{11}$. The forks of this lever are adapted to receive the extreme right end of the slide-rod $n^{42}$, which is provided with opposite friction-rolls $n^{126}$ to rest in the forks to reciprocate the slide-rod $n^{42}$. The cooperation of the parts is such that the front cross-head has just been lowered as the deflecting-path $w'$ has come to the pin $w^7$, so that it results that the slide-bar $n^{42}$ is first shifted to the left with a slight dwell and is then shifted back to the right, and then, as the cam-wheel $w$ continues its rotation, bringing the deflection $w^2$ into operation, the slide-rod $n^{42}$ is shifted quickly to the right and back to the extreme left and again returned, thereby accomplishing all the various movements which will presently be more fully set forth.

The shifting mechanism operating the rear former N', Figs. 38 to 46, is shown in Figs. 3, 4, and 5. Fast on the shaft $b$ is a lifting-arm $x$ to engage a roll $x'$ on a lever $x^2$, pivoted at $x^3$ on the frame of the machine. This lever has a slotted engagement at its free end with a roll $x^4$ on a rod $x^5$, guided in brackets $a^{14}$ on the auxiliary frame $a^2$. On the rod $x^5$ is a rack-bar $x^6$ to engage a pinion $n^{127}$ on the end of the rock-shaft $n^{92}$, so that as the rack $x^6$ is lifted by the lever $x^2$ the rock-shaft $n^{92}$ is rotated over to the rear into the position shown in full lines in Fig. 3, the rack being held in its elevated position, as shown, by its engagement with the pinion $n^{127}$, and then when subsequently the rear cross-head $n^7$ rises its shaft $n^{92}$ is again rotated, but in an opposite direction, by the engagement of its pinion $n^{127}$ with the said rack $x^6$, the rack being prevented from rising by a stop-collar $x^7$, engaging the lower bracket $a^{14}$. The cross-head $n^7$ and its pinion $n^{127}$ are then raised above engagement with the rack $x^6$, whereupon the latter falls, being stopped by a collar $x^8$, which engages a buffer $x^9$ on the top of the upper bracket $a^{14}$, said falling movement restoring the lever $x^2$ to its original position, the lifting-arm $x$, having in the meantime been also restored, having also moved over to the right into its lowermost position ready again to lift said lever. The rocking of the shaft $n^{92}$, Figs. 5 and 39, operates the cams $n^{91}$, carried thereby, which serve to retract and otherwise move the end pieces or definers $n^{78}$ $n^{79}$ of the rear former N', and the cam $n^{113}$, which accomplishes the various movements required by the middle portion of the rear former N', as already explained. Counterbalance-weights $z$, (see Figs. 1 and 3 to 5,) sliding on rods $z'$, and weights $z^2$, sliding on rods $z^3$, are provided for the front and rear cross-heads, respectively, in order to equalize their operations, said weights being supported by chains or cables $z^4$, connected to the cross-heads by stirrups $z^5$ and passing over direction-pulleys $z^6$ $z^7$, secured at the top of the frame A.

I have herein shown the front part of my machine as arranged for the neckband of a turn-down collar and the rear part of the machine as arranged for the top portion of such a collar, this arrangement being chosen for convenience in explaining the machine. My machine, however, is in no wise restricted in these particulars, inasmuch as the front former and the adjacent parts may be varied to form and fold various-shaped articles and patterns, and so likewise may the rear former and adjacent parts, and either one may be used independently of the other; also, it will be understood that any one of the folding-blades may be omitted, and, furthermore, that the rear former and folding mechanism are constructed so as to fold a stand-up collar or any similar article by the addition thereto of a front edge-folding blade on the central carriage and the proper change in the arrangement and form of the collapsible former and folding-blades. This latter construction is shown in detail in Figs. 54 to 65.

For convenience of understanding I have shown a conventional form of stand-up collar in the blank $Q^2$, folded in Fig. 61, and while the mechanism will be described for forming the particular shape of collar therein shown it will be understood that this shape may be varied, being herein used for convenience of illustrating the capabilities of my invention. The former $N^2$ is shown as comprising front and rear middle portions $n^{128}$ $n^{129}$ and two end pieces or definers at each end, which I have lettered, respectively, $n^{130}$ $n^{131}$ $n^{132}$ $n^{133}$, these eight parts being shown extended in Figs. 55, 60, and 62 and collapsed in Fig. 61, where it will be seen that the end pieces are interlocked at $n^{134}$ $n^{135}$, in order to maintain them more rigid and accurate in forming operation, and are provided with inclined edges $n^{136}$ $n^{137}$ to facilitate the collapsing movement, as presently to be explained, these end pieces serving, as in the formers already described, to define with absolute precision the correct form of the collar at its ends and corners. The rear middle portion $n^{129}$ of the former $N^2$ is carried in the same manner as already described in connection with the former $N'$, being adjustably mounted on the bridge $n^{77}$, supported by the hangers $n^{98}$, movable in the ways $n^{103}$ of the bottom plate $n^{101}$, as and by the means already described. The front middle part $n^{128}$ of the former is similarly mounted in a bridge $n^{138}$, carried by hangers or brackets $n^{139}$, secured by set-screws $n^{140}$ to two pins $n^{141}$, similar to the pins $n^{100}$, mounted to reciprocate in ways $n^{142}$ (see Fig. 40) at the ends of the bottom plate $n^{101}$ of the frame $n^{102}$. The pins $n^{141}$ are reciprocated by bell-cranks $n^{143}$, Fig. 57, operated in the same manner as the bell-cranks $n^{104}$, already described, the front and rear middle parts of the former being normally held toward each other by the before-mentioned spring $n^{125}$, secured as shown in Fig. 57, so that it will be understood that the rear part $n^{129}$ has precisely the same movements which have already been fully described in connection with the middle portion of the former $N'$ and that the front middle part $n^{128}$ has precisely the same movements, but in an opposite direction, the bell-cranks moving them apart or toward each other, as the case may be, in order to position them for forming a blank or to remove them from beneath the folds of a blank.

The end pieces of the former $N^2$ being described have a peculiar movement, the pieces $n^{130}$ being moved from the position in Fig. 60 to that in Fig. 61 in the direction of the arrows 10, Fig. 60, and the pieces $n^{132}$ $n^{133}$ being moved first in the direction of the arrows 20 and then in the direction of the arrows 30, Fig. 60. These movements are accomplished by the construction shown in Figs. 54 to 56, where it will be seen that the end pieces $n^{130}$ $n^{131}$ have their stems or legs $n^{144}$ provided with adjustable head-blocks $n^{145}$, mounted to slide on tracks $n^{146}$, similar to the tracks $n^{83}$ already described, being reciprocated thereon by links $n^{147}$, secured at $n^{148}$ to levers $n^{149}$, pivotally mounted at $n^{150}$ in the same manner already described in connection with the levers $n^{86}$ and operated by means of cams $n^{151}$, similar to the cams $n^{91}$ already described, and secured adjacent thereto on the rock-shaft $n^{92}$. The rear end corner-pieces $n^{132}$ $n^{133}$ have their stems or legs $n^{152}$ mounted adjustably on the slide-blocks $n^{82}$, reciprocable on the tracks $n^{83}$ already described.

The tracks $n^{83}$ are moved back and forth on the horizontal ways of the hangers $n^{94}$ by means of bell-cranks $n^{153}$, Fig. 56, connected therewith at their lower ends and having rolls $n^{154}$ at their upper ends traveling in cams $n^{155}$, Fig. 59, secured to the rock-shaft $n^{92}$, Fig. 54.

The bell-cranks $n^{153}$ are pivotally mounted on posts $n^{156}$, carried by the frame $n^{102}$, Figs. 54 to 56, and are adjustably secured by a set-screw $n^{157}$ to a stop-plate $n^{158}$, provided on the upper side of the slide $n^{159}$, which reciprocates on the ways of the hanger $n^{94}$, this stop-plate being provided with a screw $n^{160}$ in a depending arm $n^{161}$ thereof, in order delicately to adjust the throw or movement of the rear middle part $n^{129}$ of the former to suit different sizes and styles of collars. These cams $n^{155}$ give the corner-pieces $n^{132}$ $n^{133}$ the desired movement in the direction of the arrows 30, Fig. 60, and the cams $n^{91}$ give movement in the direction of the arrows 20, the other corner-pieces of the former being given their movement in the direction of the arrows 10 by means of the cams $n^{151}$, the several tracks $n^{146}$ $n^{83}$ being adjusted on their pivots in the proper directions, as shown in Fig. 54, in order to permit of these various movements without interference with each other or with the folds of the collar-blank. The corner-pieces $n^{130}$ $n^{131}$ are retracted before the other corner-pieces in the collapsing of the former, the middle portions $n^{128}$ $n^{129}$ having been previously collapsed and raised by the means and into the position shown for the former $N'$, Fig. 38, and in order that these corner-pieces $n^{130}$ $n^{131}$ may move without interference with the other corner-pieces and may be out of the way of the latter when the latter are to be moved I have mounted the tracks $n^{146}$ on hangers $n^{162}$ in vertical ways $n^{163}$, Figs. 54 to 56, and have provided a lever $n^{164}$, pivoted at $n^{165}$ and engaging a pin or roll $n^{166}$ of the hanger $n^{162}$ in a slot $n^{167}$ of said lever at the lower end thereof, the upper end of the lever having a roll $n^{168}$, traveling in a path-cam $n^{169}$, so that thereby the track $n^{146}$ and end portions $n^{130}$ $n^{131}$ of the former, after they have been retracted, are raised at the proper moment in order to permit the other end portions of the former to be retracted along the lines of the arrows 20 and 30, Fig. 60, without interference with adjacent parts.

The slots $n^{167}$ of the levers $n^{164}$ are of peculiar shape, as seen in Fig. 56, having depressions $n^{170}$, above which are secured springs $n^{171}$, in order to maintain proper vertical movement, notwithstanding the longer leverage of the lever $n^{164}$, due to the shifting of the tracks $n^{146}$ and front middle portion $n^{128}$ of the former, for a higher or deeper style of stand-up collar than that shown in Fig. 61.

It will be understood that the various actuating parts above described are provided in duplicate, one at each end of the rear crosshead, as is clearly apparent, viewing Figs. 54 and 55.

Coöperating with the collapsible or contractile former just described are end-folders $P^4$ $P^5$ and a rear edge-folding blade $h^{14}$, Fig. 62, actuated, respectively, by the same mechanisms already described for actuating the folders $P^2$ $P^3$ and folding-blade $h^5$, and therefore needing no further description.

A front edge-folding blade $g^9$ is secured to the central carriage G and moved thereby with the same movements already described for the folding-blade $g'$.

Each of the folding-blades is shaped to correspond to the pattern of collar to be folded, and the end-folders are held by their set-screws $p^{32}$ $p^{33}$ at a slightly-different angle from the folders $P^2$ $P^3$.

The blank $Q^2$ is folded, viewing Fig. 61, first at the left end, then at the rear edge, (bottom of collar,) then at the front edge, (top of collar,) and finally at the right-hand end, and accordingly I will describe the successive folding-blades and parts in the same order.

The folder $P^4$ is shaped at its front edge to constitute a folding-blade $p^{76}$, and has preferably near its rear corner a recess $p^{77}$, in which is loosely mounted a folding-piece $p^{78}$, held down by a spring $p^{79}$, carried by the folder and arranged to ride upon the inclined front end of a slide-block $n^{172}$, loosely guided on the corner-piece $n^{132}$ of the former by screw-pins $n^{173}$. The folding-piece $p^{78}$ has a cavity $p^{80}$ in its under side (see Fig. 63) that engages a spur $n^{174}$ on the forward end of the slide-block $n^{172}$ as it slides thereon, so that in operation as the folder moves forward and completes the end fold of the blank $Q^2$ the folding-piece $p^{78}$ thereof is lifted by the block $n^{172}$ entirely free from the fold just made, and as the folder is moved back off from the folded end of the blank the block $n^{172}$ slides along the former corner portion $n^{132}$, holding the folding-piece $p^{78}$ raised, so that the latter as the folder moves back cannot pull back with it the fold just made. The spur $n^{174}$ holds into the folding-piece until the pins $n^{173}$ prevent further forward movement of the sliding block, whereupon the folding-piece is drawn away from the slide-block, having been carried, however, a sufficient distance to do no harm to the end fold previously made. At its opposite corner the folder $P^4$ is provided with a swinging corner-plate $p^{81}$, pivoted at $p^{82}$ and held forward by a spring $p^{83}$ in the position shown in full lines, Fig. 62, this plate being free to swing in an undercut recess formed in the body of the folder $P^4$. At its front edge the plate $p^{81}$ is provided with a gatherer, (shown as a curved recess $p^{84}$.)

The blank $Q^2$ as originally carried down and put in position on the bed of the machine by the rear positioning device had its edges lapped over slightly on top of the four folding-blades around it, so that when the former $N^2$ subsequently came down upon it in close proximity to these folding-blades, as clearly shown in Fig. 62, the edges of the blank were thereby deflected upwardly and slightly crimped at their various bends or corners, as will be readily understood, the result being that when the end-folder $P^4$ begins to move forward, as above described, the material at the edge of the blank stands up in front of it, there being a crimp or fold of the material directly in front of the gatherer $p^{84}$ for the latter to gather in and turn over slightly as the folder completes the rest of the end fold. The folding-blade $h^{14}$ then moves forward and makes the next fold of the blank, this blade being made shorter at its left-hand end than the blade $h^5$, in order not to interfere with the projecting portion of the folder $P^4$. This having been done, the front folding-blade $g^9$ is moved rearwardly by the carriage G to make the third fold of the blank, and at the same time that it makes this fold a stud $g^{10}$ thereon engages an overhanging part $p^{85}$ of the plate $p^{81}$ and simultaneously shifts it rearwardly, causing its gatherer $p^{84}$ to fold over and iron down the corner of the blank, as shown in Fig. 61.

The blade $g^9$ is provided with a plate $g^{11}$, pivoted thereto at $g^{12}$ and moving in an undercut recess therein in substantially the same manner as the plate $p^{81}$ described. On this plate is an arm $g^{13}$, having an upturned knife-edge $g^{14}$, adapted to enter a slightly-undercut notch $p^{86}$, Fig. 64, on the folder $P^5$, this arm being held forward by a spring $g^{15}$, and the plate $g^{11}$ being held forward by another spring $g^{16}$, a stop $g^{17}$ serving to limit their forward movement. The plate $g^{11}$ carries a post $g^{18}$, in the upper end of which is a screw $g^{19}$, adjustable transversely thereof so as to strike against the arm $g^{13}$ as the plate is moved backward and push the arm ahead of it. The blade $g^9$ having been moved forward, as stated, in order to fold the front or top edge fold of the blank the folder $P^5$ is then moved forward, carrying the upwardly-projecting end of the blank ahead of it and as it moves creasing down the material by the fingers $p^{87}$ $p^{88}$ at each side of the notch $p^{86}$ as the latter rides against the knife-edge $g^{14}$, these fingers crowding the material of the blank down at each side of said knife-edge, the latter being moved back ahead of said folder by the engagement with its arm $g^{13}$ of the screw $g^{19}$ as the plate $g^{11}$ is moved ahead of the folder by the contact of an arm $p^{89}$ on the latter with the post $g^{18}$ of the former. The A-shaped crease thus formed is ironed down, as it were, into a plait by the folder as the latter moves forward, thereby making a neat corner-fold and preventing any projecting ragged edge.

At its rear corner the folder $P^5$ is provided with a lip $p^{90}$, which gathers in and folds down the corners neatly, as shown in Fig. 61, in the forward movement of the folder, as already described. An arm $p^{91}$, adjacent thereto, engages a stud $h^{15}$ on a plate $h^{16}$, pivoted at $h^{17}$ at the corner of the rear edge blade $h^{14}$, so as to move the corner of the latter folding-blade ahead of it out of the way, said plate normally being held forward by a spring $h^{18}$ engaging a button $h^{19}$ on the plate. This corner-plate $h^{16}$ rests on and holds down that end of the rear edge fold as the end-folder moves forward to make the adjacent end fold and moves away from said end-folder just sufficiently to permit the latter to fold, but without releasing or disturbing the rear edge fold. The end-folders are normally held down by springs $p^{92}$.

The operation of the machine is as follows: The operator takes a blank Q from the stack in front of him or her on the bottom shelf $s$, said blank comprising a lining $q'$ and facing $q$, and, inserting the end tacks $t$ in the holes already provided in the blank for the purpose, then places the blank on the feeding-plate T, which is already in place on the stands $s^3$, she adding the middle tack $t$. The operator then lifts the feeding-plate T with its blank to the delivery-shelf $s'$, in the meantime having moved the knee-lever $s^{21}$ to the right, so as to bring the cushioning-blocks $s^{15}$ to the front out of the way, and drops the feeding-plate into position, its guide-lugs $t^{19}$ entering the ways $s^{13}$ and the locking-lugs $t^{22}$ entering the ways $s^{14}$. Upon releasing the knee-lever $s^{21}$ the feeding-plate T and its blank are moved forward on the shelf $s'$, ready to be delivered to the machine. The machine being supposed to be stopped in the position shown in the drawings, it is started by moving the hand-lever $d^{10}$ to the right, and immediately the carrier V is moved forward by the crank $v^4$ and its connections $v^5$ $v'v^2v^3$. The forward end of the carrier member $v^{16}$ enters the ways $s^{13}$, the blocks $s^{15}$ yielding to take the shock as the forward ends of the member $v^{16}$ strike the guide-lugs $t^{19}$, the latter being instantly grasped by the enlargements $v^{20}$ of the springs $v^{19}$, which snap into the recesses $t^{21}$ of the feeding-plate. The carrier retreats with the plate and blank, the positioning device $k$ being in the raised position shown in Fig. 9. The carrier member $v^{16}$ brings the locking-lugs $t^{22}$ against the front of the positioning device $k$, and the wedges $v^{18}$ of the carrier having at the same instant moved the bolts $k^9$ back the locking-lugs $t^{22}$ enter the recesses $k^7$, the member $v^{16}$, however, continuing its backward movement and pulling its springs $v^{19}$ out of engagement with the guide-lugs $t^{19}$ just as the wedges $v^{18}$ release the pins $k^{10}$, and thereby permit the bolts $k^9$ to spring forward into locking engagement over the lugs $t^{22}$, the feeding-plate T and its blank having been thereby transferred from the member $v^{16}$ to the positioning device and rigidly locked therein. The positioning device, having received the plate T and blank Q, is immediately lowered by the cam $k^{22}$ through the arm $k^{26}$, shaft $n$, crank $k^{19}$, bar $k^{17}$, and lifter $k^{15}$, projecting from said bar, (see Figs. 3, 4, and 7,) the feeding-plate being thereby lowered into the bed in the recess $j^{25}$, provided therefor. By this means the blank which is to be folded is placed precisely as it should be without any possibility of being shifted or misplaced. The same bar $k^{17}$ which lowers the positioning device into the bed of the machine and its companion bar $n^5$ at the opposite end of the machine also correspondingly lower the front former N, bringing it down in holding position on top of the blank Q. Thereupon the end-folder P' and end-folding blade $p^{18}$ are moved forward by the roll $r^{25}$ of the T-lever $r^{18}$, the latter being turned on its pivot by the rock-shaft $r^4$, whose roll $r^2$ is engaged by the bearing-surface $r^{11}$, carried by the arm $r$, rigid on the shaft $b$, the latter being rocked by the gear-sector $c'$, which actuated the cam $k^{22}$, just mentioned, and is itself swung back and forth by the pitman $d^{18}$, connecting it with the gear $d^8$, Figs. 1, 3, 5, 6, and 7. The end fold No. 1, Fig. 74, of the blank having been folded by this inward movement of the end-folder P', the front edge-folding blade $h^2$ is slightly raised by the cam projections $c^9$ of the cams $c^3$ and the Y's $f'$ at each end of the machine and is simultaneously moved rearward by the engagement of the forward roll $b^{19}$ of the bell-crank $b^{12}$ with the right-hand depending end $b^{11}$, Fig. 14, of the T-lever $b^{10}$, said bell-crank being rocked by the shaft $b$ and sector $c'$, and the T-lever $b^{10}$ shifting the folding-blade by means of its engagement with the yoke $h'$ of the carriages H H'. As the folding-blade $h^2$ is moved back to make the fold No. 2, Fig. 74, its carriage engages the pin $p^{22}$, Fig. 23, of the end-folder P' and pushes the folding-blade $p^{18}$ endwise out of the way of the side-folding blade $h^2$, the right-hand corner of the rear edge-folding blade $g'$ being moved back out of the way by the finger $p^{24}$, which engages the bolt $g^4$, or the adjacent parts of the two blades may be made heavy enough to permit the blade $p^{18}$ to move the other as the folder P' is moved back. The blank having received its folds 1 and 2, as described, the front carriage H is raised by the cam projections $c^{10}$ of the opposite cams $c^3$, at the same time raising the folder P' by the engagement of the raised portion $h^8$ with the screw $p^{27}$ of the arm $p^{26}$, Fig. 23, to relieve the pressure on the former N, Fig. 32. Immediately the slide-bar $n^{42}$, Fig. 33, is shifted to the left by the cam $w'$, Figs. 5, 4, and 8, of the cam-wheel $w$, whose first movement is to slide the pin $n^{40}$, Fig. 32, up the incline $n^{46}$ and thereby turn the bell-crank $n^{38}$ at the right of the former to retract the end piece $n^{15}$ of the former in the process of collapsing the former, said end piece sliding up over the adjacent middle portion $n^{13}$ of the former. The further inward movement of the slide-bar $n^{42}$ brings the inclines $n^{59}$ of the blocks $n^{52} n^{44}$ beneath the V-bars $n^{48} n^{50}$ and thereby raises the former N, the latter being given an oblique movement toward the rear as it rises, by the movement of the rolls $n^{65}$ forward in the cams $n^{64}$, from the positions shown in Fig. 33. Also simultaneously with the movement last described, the pin $n^{40}$ having dropped behind the incline $n^{46}$, the spring $n^{45}$ instantly restores the end piece $n^{15}$ of the former to its position in the same plane with the rest of the multi-part former N'. The former having had its edges removed from the folds 1 and 2 by the movements just described, immediately the front folding-blade $h^2$ and the end-folding blade $p^{18}$ are brought down with a forcible creasing pressure upon the folds 1 and 2, this action being caused by the dropping down of the lower beveled ends $f^{10}$ of the Y's $f'$ from the radial forward end of the cam projections $c^{10}$ of the cams $c^3$. The front folding-blade $h^2$ and the end-folder P' are then raised by the next cam projection $c^{13}$ of the cam $c^3$, the slide-bar $n^{42}$ being drawn back by the path-cam $w'$ of the cam-wheel $w$, Figs. 1 and 5, thereby withdrawing it from under the bars $n^{48}$ $n^{50}$, Fig. 32, to permit the former N to descend beneath the raised front folding-blade, the end-folder P' having been drawn back away from the blank by its spring $p^7$ as the slide-bar $n^{42}$ was moving back to disengage its inclines $n^{59}$ from the bars $n^{48}$ $n^{50}$, thereby also lifting the roll $r^{25}$ out of engagement with the slot $p^6$ of said end-folder by the engagement of the ledge $n^{72}$ of the lifter $n^{69}$, Figs. 30 to 33, on a slide-rod moving beneath the arm $r^{27}$, Figs. 5 and 23, and lifting it, the roll being subsequently dropped by said ledge $n^{72}$ and resting on the pin $r^{30}$, which moved back with the folder. As the former drops into position its front and right-hand edges rest directly on top of the creases in the partly-folded blank, and thereupon the front carriage H drops and brings its heavy weight on top of the former, giving the folds of the blank the second pressure. As soon as the front carriage and its folding-blade have dropped, the rear folding-blade $g'$ is raised slightly by the cam $c^6$, Figs. 1, 3, and 15, engaging the bar $e$, and at the same time is moved forward to bend over the rear edge fold No. 3, Fig. 74, by the engagement of the cranks $b^2$ with the offsets $b^9$ of the levers $b^5$, said levers sliding the ends of the central carriage G in the ways $e^4$. Next the roll $r^2$ of the short shaft $r^5$ is engaged by the shoulder $r^{17}$ of the arm $r'$, thereby swinging the roll $r^{32}$ of the T-lever $r^{34}$ to the right and moving forward the folder P, its blade $p^{39}$ as it makes the fold No. 4, Fig. 74, riding over the thin corner portion $g^9$ of the rear folding-blade and riding under the end $h^{10}$ of the front folding-blade, said end being lifted by the engagement of its lip $h^{11}$ with the lifter $p^{40}$ on the end-folder P, the material of the blank being held down for accurate folding by the end piece $n^{14}$ at the front corner and by the rear folding-blade $g'$ at the back corner. The front blank Q having thus been folded, the cam projection $c^{28}$, said projection being at the time in raised position, the same as the projection $c^{13}$, is shown in Fig. 16, comes into contact with the end of the Y-bar $f$ and raises the front folding-blade $h^2$, the rear folding-blade being raised immediately thereafter by the cam projection $c^5$ engaging the bar $e$, and as soon as the said front and rear folding-blades are raised the second acting cam $w^2$ of the cam-wheel $w$ gives a quick movement to the slide-bar $n^{42}$, thereby first collapsing the left-hand end piece $n^{14}$ of the folder N, Fig. 32, to get it out from under the fold No. 4, and then moving the entire folder obliquely forward and upward, thereby leaving the completely-folded blank with only the end-folding blade $p^{39}$ resting upon it. Said oblique movement takes place thus: The first movement of the slide-bar $n^{42}$ by the cam $w^2$ causes the pin $n^{40}$ to swing the bell-crank $n^{38}$ at the left end of the former, so as to retract the end piece $n^{14}$, and then raises the former by the engagement of the inclines $n^{59}$ with the V-bars $n^{49}$ $n^{51}$, this same movement also shifting the former forward by the simultaneous engagement of the rolls $n^{65}$ with the cams $n^{64}$. The rear folding-blade $g'$ is then dropped on the folded blank, giving the rear fold No. 3 a third pressure. Then the slide-bar $n^{42}$ is reversed in its movement by the further movement of the cam $w^2$ and moves to the left, the notches $n^{58}$, however, of the slide-blocks $n^{53}$ $n^{55}$ holding said blocks beneath the V-bars and maintaining the former raised, the blocks $n^{52}$ $n^{54}$ meantime coming beneath the cross-bars $n^{48}$ $n^{50}$, the movement to the left continuing until it withdraws the blocks $n^{53}$ $n^{55}$ from beneath their bars, the former N, however, being still held up by the other blocks and at the same time being held entirely back by the rolls $n^{65}$ and cams $n^{64}$ in order to withdraw the former from beneath the front raised folding-blade $h^2$, so that the latter may drop down for the third pressure on the blank as the cam $c^{28}$ passes from beneath its lifting-bar $f$, this same movement of the slide-bar $n^{42}$ also restoring the end piece $n^{14}$ to its outward position. The quick movement of the path-cam $w^2$ is now completed by restoring the slide-bar $n^{42}$ to its original position, thereby removing all the blocks from beneath the V-bars of the former and permitting the latter to drop, said former having been restored to its middle position by the rolls $n^{65}$ and cams $n^{64}$ as the slide-bar was moved back. The former is now on top of all the blades, and it rests there until the back cross-head $n^7$ is lowered and until the sector $c'$ has finished its backward stroke and begins to return, the latter movement serving to withdraw all the folding-blades from on top of the blank Q, said blades being raised slightly by the cam projections $c^{29}$ and $c^6$ of the cam $c^3$, which, it will be understood, was reversed in its movement by the reversing of the sector $c'$, the projection $c^6$ lifting the central carriage higher on this movement than it did previously by reason of the fact that on this movement it engages the depending latch-plate $e^6$. This extra lifting movement of the blades before they are withdrawn permits them to be withdrawn from the folds without any liability of disturbing the latter, as they might if they were simply dragged back in bearing contact with the folds. The cranks $k^{19}$ $n^6$ are now operated by the reverse movement of the cam $k^{22}$, above mentioned, on the shaft $c$, Figs. 1 and 3, and raise the bars $k^{17}$ $n^5$, which lift the cross-head $n'$ and front former, and also by the engagement of the rolls $k^{13}$ of the lifter $k^{16}$, Figs. 4 and 9, with the T's $k^{12}$ lifts the positioning device $k$ from the bed of the machine, raising the previously-positioned feeding-plate T until the roll $k^{28}$ is engaged by the tongue or switch $v^{29}$ of the cam-plate $v^{25}$, thereby raising the positioning device $k$ up in line with the top carrier member $v^{15}$, Figs. 10 and 8, whereupon the wedges $v^{22}$ thereof retract the bolts $k^9$, unlocking the feeding-plate T from the positioning device and permitting it to be carried forward by the member $v^{15}$, the latter having locked it in its recesses $v^{24}$ by the engagement of its spring projections $v^{23}$ with the guide-lugs $t^{19}$ thereof. The member $v^{15}$ carries the feeding-plate and folded blank forward and delivers it on the receiving-shelf $s^2$, Figs. 5 and 67, where it is locked by the engagement of the springs $s^9$ behind the lugs $t^{22}$, preventing the withdrawal of the feeding-plate as the carrier V moves back again. As the feeding-plate enters the grooves $s^7 s^8$ in the receiving-shelf $s^2$ the projecting points of the end tacks $t$ ride up on the inclined edges $s^{12}$ at each end of the shelf and are thereby loosened from their engagement with the plate. At the same time that the folded blank is delivered on the shelf $s^2$ by the member $v^{15}$ the member $v^{16}$ receives another blank Q on the second feeding-plate T, to be again delivered to the positioning device and deposited in place to be folded by the front folding mechanism, as described.

It will be understood that the various movements of the machine are going on at the same time as the operations progress, and inasmuch as the carriages H H′ are rigidly connected to move together I have chosen to raise and lower the rear cross-head $n^7$ while the front and rear folding-blades are quiescent so far as their folding movements are concerned. Accordingly when the sector $c'$ is on its backward swing it raises the rear cross-head $n^7$ and former N′ by means of lifting-bars $k^{18}$ $n^{11}$ through the agency of the cranks $k^{20}$ $n^{10}$ and the arm $k^{24}$, running in the cam $k^{23}$, which is driven by the said sector $c'$. As the lifting-bar $k^{18}$ rises its lifter $k^{16}$, Figs. 4 and 8, lifts the rear positioning device $k'$ to bring its roll $k^{29}$, Fig. 9, into lifting engagement with the cam-plate $v^{25}$, which raises it into line with the upper carrier member $v^{15}$. The latter receives the folded blank Q′ from the table to deliver it into the machine in the same manner as just described in connection with the blank Q, and as the carrier moves forward with its load the roll $k^{29}$ escapes from the path-cam $v^{31}$ of the cam-plate $v^{25}$, thereby lowering the positioning device $k'$ in line with the lower member $v^{16}$ to receive the feeding-plate T′ and its blank, which the latter has just received from the delivering-shelf $s'$. Having received said plate and blank, the positioning device is lowered so as to place the blank Q′ in absolutely correct position to be folded, and as it moves down into place the rear cross-head follows down precisely the same as the front cross-head did in connection with the front positioning device. Immediately as the rear former N′ presses on top of the positioned blank Q′ the shaft $r^5$, Figs. 5 and 23, is rocked over forward by the engagement of its roll $r^3$, Figs. 3 and 5, with the cam-surface $r^{15}$, thereby swinging the roll $r^{33}$ of the T-lever $r^{34}$ to the right and moving forward the folder P$^2$, so as to fold the left-hand end of the blank Q′, as shown in Fig. 46. As the folder P$^2$ is completing its movement the rear edge-folding blade $h^5$ is slightly lifted by the cam projection $c^{29}$ of the cam $c^3$, Figs. 16, 1, and 3, looking in a direction opposite to the arrow, Fig. 16, and is also moved forward by the engagement of the bell-crank $b^{12}$ with the left-hand end $b^{11}$, Fig. 14, of the T-lever $b^{10}$, thereby inturning the rear fold of the blank Q′. As the rear edge-folder $h^5$ and its carriage H′ move forward the lug $p^{68}$ of the end-folder P$^2$ is engaged by said carriage, thereby simultaneously swinging obliquely forward the hooked portion $p^{70}$, so as to lay over with extreme neatness the corner of the blank in the peculiar manner shown in Fig. 47. Just as the rear folding-blade $h^5$ stops the right-hand folder P$^3$ is moved forward to fold the right-hand end of the blank, being so moved by the engagement of its roll $r^3$, Fig. 1, with the latch-like projection $r^8$ of the arm $r$, said arm moving from the left toward the position shown in Fig. 1. As the folding-blade $p^{52}$, Figs. 23 and 5 of the folder P$^3$ moves forward the roll $p^{46}$ engages the shifting plate $p^{48}$ and gives a resulting compound movement to the folding-blade, so that its finger $p^{53}$ is thereby drawn forward with substantially the same motion as the hooked end $p^{71}$ last referred to, so as to lay over the corner, as shown in Fig. 48, with the same neatness and form as the preceding corner, Fig. 47. The folders P$^2$ P$^3$ move forward in the beginning of their folding movement with freedom to raise slightly as the fold is made; but as soon as the material is folded over they complete their folding movement under the pressure of the springs $p^{74}$ $p^{54}$, which are then engaged beneath the rolls $p^{75}$ $p^{55}$. The blank Q′ having been folded, the carriage H′ is slightly lifted to permit the withdrawal of the edge of the folder from beneath the folding-blade $h^5$, the latter being lifted by the rod $m$, Fig. 19, through the engagement of the cam $m^6$, and thereupon as the sector $c'$, which actuated the cam last mentioned, continues its swing from the rear toward the position shown in Fig. 3 it lifts the lever $x^2$ by the engagement of the arm $x$ with the roll $x'$, and thereby rotates the gear $n^{127}$, Fig. 3, by the passage thereover of the rack $x^6$. The first action of the gear $n^{127}$ as it rotates the shaft $n^{92}$, Figs. 39 and 5, is to engage the pin $n^{118}$ of the cam $n^{113}$, Fig. 45, with the lip $n^{120}$, said pin being immediately in front of said lip at the moment the shaft $n^{92}$ begins to rotate and the roll $n^{114}$ bearing on the lowest part of the cam, the latter being rotated in a direction opposite the arrow, Fig. 45. The engagement of the pin $n^{118}$ with the lip $n^{120}$ releases the triggers $n^{121}$ from the plungers $n^{108}$ and permits the latter to fly upward, moving the bell-cranks $n^{104}$, Fig. 44, so as to shift the brackets $n^{98}$ forward in their ways $n^{103}$, and thereby to draw the rear edge of the middle portion of the former from beneath the rear fold of the blank. As the cam $n^{113}$ continues to rotate, it raises the frame $n^{102}$ by the bearing of the roll $n^{114}$ on said cam, and its arm $n^{116}$ bearing on the bridge-piece $n^{115}$, this provision being made in order to prevent any tendency to binding lateral movement of the frame by the transverse movement of the cam-surface adjacent said bridge-piece. As the frame $n^{102}$ rises it restores the bell-cranks $n^{104}$ to their original position, because the plungers $n^{108}$ being prevented from moving upward with the frame $n^{102}$ by the contact of their pins $n^{111}$ with the upper end of the bracket $n^{109}$ the movement of said frame causes the bell-cranks to swing, and thereby restore the middle portion of the former to its previous rear position relatively to the frame. The successive positions of the former are indicated in Figs. 49 to 51. At the same time the triggers $n^{121}$ having been raised sufficiently lock into the notches $n^{123}$. Further rotation of the shaft $n^{92}$ causes the end pieces or definers $n^{78}$ $n^{79}$ of the former, by means of the cams $n^{91}$ and levers $n^{86}$, to move along tracks $n^{83}$ into the position shown in Fig. 38 somewhat beneath the middle portion of the former. The entire former is now wholly removed from the blank and the folding-blades. Then the rod $m$ drops and permits the rear folding-blade to fall and crease the rear fold of the blank. The end-folder $P^3$ is then removed from the blank by the same movement of the rock-shaft $r^4$ which moves forward the folder $P'$ to fold the front blank, as already described, and the following movement which, as before described, moved the side-folder $h^2$ and its carriage H toward the rear into folding position now acts and moves the rear side-folder $h^5$ and its carriage H' back off from the rear folded blank, the carriage being raised slightly therefor, as before described, the backward movement of the blade $h^5$ and its carriage H' releasing the lug $p^{68}$ and permitting the hooked end $p^{70}$ of the folder $P^2$ to be drawn back toward the rear by the spring $p^{69}$, the incline $p^{73}$, however, preventing said hooked end from dragging the previously-folded corner back with it, said incline causing the finger $p^{72}$ to ride up on it and drop the hooked end entirely free from said corner after it has moved back, and, finally, the opposite end-folder $P^2$ is moved back from the folded blank by the same movement of the rock-shaft $r^5$ which moves forward the front left-hand folder P. As the folders $P^2$ $P^3$ move back their pressure on the blank is removed by the disengagement of their springs $p^{74}$ $p^{54}$ from the rolls $p^{75}$ $p^{55}$. Then the cross-head $n^7$ is raised by the further rotation of the shaft $k^{21}$, and as it rises the shaft $n^{92}$ is rocked in an opposite direction by the engagement of its pinion $n^{127}$ with the rack $x^6$, Fig. 3, thereby turning the cams $n^{91}$ so as to restore the end pieces $n^{78}$ $n^{79}$ to their orignal position and also turning the cam $n^{113}$ in the direction of the arrow, Fig. 45, so as to lower the middle portion of the former into interlocked alinement with the end pieces ready for another forming and folding operation. The cross-head and former having been raised out of engagement with the rack $x^6$, the latter drops into its original lowermost position, and the carriage V comes forward, takes the folded blank Q' from the positioning device $k'$, and delivers it to the shelf $s^3$, as already described, takes another blank Q', carries it back, and leaves it locked on the positioning device $k'$, which lowers it into place to be folded. The folding-blades are then removed from the front folded blank. The final pressure is given to said blank, and the front cross-head rises to repeat the operation already described.

From the above description it will be understood that the operation in general consists of feeding a blank beneath the front cross-head, lowering the former into forming position on the blank, folding over the edges successively around the former, collapsing and retracting or shortening the perimeter of the former, pressing or creasing the folds and also preferably creasing each fold as it is made, removing and automatically delivering the folded blank, receiving at the same time and movement another to be folded, and then raising the rear cross-head and former and the rear blank Q', which in the meantime has been in the process of folding, and automatically delivering said folded blank, and feeding another for the rear forming and folding mechanism, which likewise successively folds the edges of the blank, and then the former is collapsed and withdrawn from underneath the folds of the blank, the folds are creased, and the folded blank is delivered and another fed in.

In addition to the movements above described for folding the blank Q', which is to form the top of a turn-down collar, other and further movements take place in folding a stand-up collar, Fig. 61, the mechanism therefor being shown in Figs. 54 to 65. A blank $Q^2$ having been secured to a feeding-plate T', as already described, it is carried into the machine and properly positioned on the bed thereof, its edges overlapping the front edges of the four folding-blades. The rear cross-head $n^7$ then brings down the former $N^2$, which presses upon the blank $Q^2$ in the position shown in Fig. 62, thereby deflecting the free edges of the blank all around slightly upwardly and holding the blank in properly-defined position ready for forming. Thereupon the shaft $r^5$ rocks over forward, as before, and moves the folder $P^4$ forward, folding the left-hand end of the blank, and as the latter moves forward the folding-piece $p^{78}$ thereof, just as the fold is completed, strikes the inclined front edge of the block $n^{172}$ and rides up into engagement with the spur $n^{174}$ thereof, being thereby lifted entirely off from the fold just made. Immediately upon the completion of this end fold the rear side blade $h^{14}$ is slightly raised, as before, and then moved forward by the bell-crank $b^{12}$, T-lever $b^{10}$, yoke $h'$, and carriage H', thereby making the rear edge fold of the blank. Following this movement the crank $b^2$ in the further rocking of the shaft $b$ engages the offsets $b^9$ and through the levers $b^5$ shifts the front folding-blade $g^9$ rearwardly to make the front or top fold of the collar-blank. As the blade $g^9$ moves forward its pin $g^{10}$ engages the plate $p^{81}$ at $p^{85}$ and swings it laterally, so as to iron down the gather of the material held in the gathering-recess $p^{84}$, thereby completing the folding of that corner. Next, the opposite short shaft $r^4$ rocks over front and moves forward the right-hand end-folder $P^5$, whose ear $p^{90}$ lays over the adjacent corner, being enabled to do so with extreme neatness by reason of the projecting end of the corner-plate $h^{16}$, which holds the fold down on top of the former and is moved back out of the way just ahead of the folder by the engagement of the latter's arm $p^{91}$ with the stud $h^{15}$, and simultaneously at the opposite corner of the blank the fingers $p^{87}\ p^{88}$ crease down the fold of the blank on each side of the knife-edge $g^{14}$ as the latter is pushed out from beneath the fold by the arm $p^{89}$ against the post $g^{18}$. The folder follows after this gathered-in and creased portion of the fold, so as to iron it down into a neat plait, the shape and relations of the fingers and parts causing it to be laid over approximately as shown in Fig. 61. The blank is now entirely folded, the combined weights of the blades and their operating mechanisms holding the folds tightly down on the heated bed of the machine. Thereupon the front and rear edge blades are slightly raised, and simultaneously therewith the shaft $n^{92}$ is rocked over back by the rack $x^6$, as already described, which, through the cam $n^{113}$, as before explained, releases the triggers $n^{121}$, permitting the springs $n^{111}$ to raise the bell-cranks $n^{104}\ n^{143}$ and withdraw the middle portions $n^{128}\ n^{129}$ of the former from beneath the front and rear edge folds into their collapsed position close to each other. Further rotation of the shaft $n^{92}$ causes the cam $n^{113}$ to raise the frame $n^{102}$, thereby raising the middle portion of the former and restoring its parts $n^{128}\ n^{129}$ to their original separated position, but raised above the edge-folding blades, as already described in connection with the movements of the folder. While the movements last described are going on the cams $n^{91}\ n^{151}$ on the shaft $n^{92}$ slide the corner-pieces or definers of the former inwardly, removing them from beneath the folds of the blank without in the slightest disturbing said folds, these cams being preferably timed so as to move the end pieces $n^{130}\ n^{131}$ prior to the movement of the pieces $n^{132}\ n^{133}$.

When the pieces $n^{130}\ n^{131}$ of the former have moved inward sufficiently to clear the folds of the blank and also completely to unlock them from their interlocked position with the other end pieces, then the cams $n^{169}$ depress the rolls $n^{168}$, thereby raising the hangers $n^{162}$ in the ways $n^{163}$, so as to lift the end pieces $n^{130}\ n^{131}$ beneath and substantially against the raised middle portions of the former. The end corner-pieces $n^{130}\ n^{131}$ having thus been withdrawn from the folds of the blank and moved out of the way, the other end corner-pieces $n^{132}\ n^{133}$ are similarly withdrawn from beneath the folds of the blank, the movement thereof being first in the direction of the arrows 20, due to the position of the tracks $n^{83}$, along which the corner-pieces must slide, and then in the direction of the arrows 30, due to the operation of the path-cams $n^{155}$ on the bell-cranks $n^{153}$, which shift the slides $n^{159}$ along the hangers $n^{94}$, the ball-and-socket joint $n^{93}$ of the link $n^{84}$ permitting this lateral movement. The four parts of the end pieces of the former are now in their most contracted position, being one beneath the other, and thereupon the cross-head and all its connectd parts are moved up by the lifting-bars $k^{18}\ n^{11}$, as before described, to be succeeded by the various movements which I have already sufficiently described in connection with the removal of the blank Q'.

It will be understood from the above description that my machine is capable of forming and folding collars and the like with extreme rapidity and that they are folded with absolute uniformity. The folds are in fact much neater and more satisfactory for the manufacturer than could be done by hand. Besides this, the operations are entirely automatic and merely require that an attendant should properly place the feeding-plates and blanks to be fed to the machine.

It will be borne in mind that my machine as herein described and shown is capable of almost infinite adjustments in order to change the parts to suit different patterns and articles and timing of movements, and in view of the full description and showing I do not deem it necessary at this point to further explain the various relations of said adjustments.

I have herein described all the details both of construction and operation of my machine for a clear understanding thereof; but I wish it distinctly understood that I am in no wise limited thereto and that various changes, modifications, and substitutions may be resorted to in all parts of the machine without in any wise departing from the broad spirit and scope of my invention.

I regard myself as a pioneer in providing means for automatically feeding the collar-blanks and the like to a folding mechanism, and accordingly this patent is meant to cover, broadly, the use of any feeding mechanism suitable for the purpose.

Heretofore it has been the custom to either lay the blanks on the bed of the machine by hand or to place them likewise by hand on a former, and in either case the blanks would be sometimes improperly placed and at other times would shift around so as to be improperly folded or entirely destroyed. Accordingly not only do I regard myself as entitled, broadly, to claim an automatic feeding mechanism, as mentioned, but also equally to claim either as a part of the feeding mechanism or independent thereof a positioning device which insures that the blanks shall be placed and maintained with absolute precision.

Another leading feature of my invention resides in providing a collapsible or contractile former, the perimeter of which may be shortened or varied to be withdrawn from the folds of the folded blank, so that it is unnecessary to disturb any fold of the blank in any degree whatever in order that the blank should be entirely free from the former after it has been folded, whereas heretofore it has always been necessary to unfold one or more of the folded edges of the blank in order to take it off of the former.

The formers in my construction have their perimeters expanded or spread out in order to engage and form the blank on the very lines where it is to be creased, and then said perimeter is collapsed or drawn into less compass, so as to be readily withdrawn from beneath the folds of the blank.

I am aware that various folding-blades have been suggested heretofore which have conformed in shape to the corners which were to be folded, so that when said blades were moved directly forward over the blank they would gather in and crimp in a more or less irregular manner the material being folded at the corner, and also in a previous invention of mine I have provided coöperating blades which while not exactly conforming to the shape of the corner, as before, yet produced a substantially similar ingathered or crimped corner fold; but my present invention proceeds on an entirely different idea and does not attempt in any way to crowd or crimp the material in a gathered or puckered series of self-arranged folds or crimps, but folds the corner in a certain definite way as near as possible to the best manner in which it might be folded by the hand of a careful operator, and therefore I consider it also broadly new to provide means for folding the peculiarly neat corners shown and described and also equally new to fold in the gather substantially as herein set forth.

My invention is also broadly new in providing folding-blades having compound or obliquely-resultant movements, also in giving the peculiar creasing effects, as stated, and, finally, a most important feature of my invention is the provision of a "carrier-plate," by which term as used in the claims and elsewhere I mean any frame, plate, or device which supports or retains a blank in a certain fixed position on it as the blank is carried into position to be folded and is folded.

Having described my invention, what I claim as new, and desire to secure by Letters Patent, is—

1. In a machine for folding collars and cuffs, mechanism for automatically feeding and putting in precise position the blanks to be folded, a former for holding and defining the blank, means to move said former to hold the blank after the blank has been put in place, folding devices for infolding the blank, and means to move said folding devices, substantially as described.

2. In a machine for folding collars and cuffs, mechanism for automatically feeding and putting in precise position the blanks to be folded, a former for holding and defining the blank, means to move said former to hold the blank after the blank has been put in place, folding devices for infolding the blank, means to move said folding devices, and means to deliver the folded blanks from the machine, substantially as described.

3. The combination with a machine for folding blanks and the like, and having mechanism to form and fold a blank, of feeding and positioning mechanism, said mechanism comprising means to receive and automatically carry a blank into the machine, and means to position said blank accurately, to be operated upon by said forming and folding mechanism, substantially as described.

4. In a machine for folding collars and the like, the combination with forming mechanism and folding mechanism, of automatic means for feeding the blank thereto, and a positioning device to receive and place said blank in accurate position to be folded, substantially as described.

5. In a machine for folding collars and the like, mechanism to inturn the edge and ends of the blank, combined with feeding mechanism automatically to present the said blank accurately in position to have its edge and ends infolded, a feeding-plate to which said blank is secured, substantially as described.

6. In a machine for folding collars and the like, the following instrumentalities, viz: a feeding-plate to which is attached the blank to be folded, folding mechanism, feeding mechanism composed of a carrier and a positioning device, the carrier supplying the plate to said positioning device, said feeding mechanism presenting said plate and blank automatically in position to be acted upon by said folding mechanism, substantially as described.

7. In a machine for folding collars and the like, a feeding plate to which the blank to be folded is attached, a platen or bed having formed in it a recess to receive in it said feeding-plate leaving the edges of the blank extended beyond said feeding-plate with the top of said feeding-plate flush with the said bed, combined with mechanism to infold the edge and ends of said blank while held on said feeding-plate, substantially as described.

8. In a machine for folding collars and the like, a feeding-plate to which the blank to be folded is attached, a platen or bed having a recess to receive in it said feeding-plate leaving the edge of the blank extended beyond said feeding-plate, combined with mechanism to infold the edge and ends of said blank while on said feeding-plate, and with a positioning device to put said feeding-plate in position in the open space of said platen, substantially as described.

9. In a machine for folding collars and the like, a feeding-plate to which the collar-blank to be folded is attached, and a platen or bed on which said plate rests while the blank is being folded, combined with a cross-head, and a former having movable end pieces or definers coöperating therewith, and means to move said cross-head, substantially as described.

10. In a machine for folding collars and the like, a cross-head and its attached multipart former, having a middle portion and independent end pieces or definers to descend on a blank to be folded, substantially as described.

11. In a machine for folding collars and the like, a cross-head, its attached multipart former, having end pieces or definers to descend in extended position on a blank to be folded, and means to move said end pieces or definers in a straight line one toward the other from said original extended position, substantially as described.

12. The cross-head, its attached multipart former, having end pieces or definers, means to contract the perimeter of said former and to withdraw its central part or body from within the folded edge of the collar-blank, leaving the end definers in place, substantially as described.

13. The cross-head, its attached multipart former, having end pieces or definers, means to contract the perimeter of said former and to withdraw its central or body part from within the folded edge of the collar-blank leaving the end definers in place, and means to thereafter move said end definers one toward the other, to withdraw them from within the infolded ends of the blank, substantially as described.

14. A series of folding-blades, the cross-head, its attached multipart former having end pieces or definers, means to contract the perimeter of said former and withdraw its central or body part from the edge-fold and to lift said body part from the folded blank, leaving the definers in place, substantially as described.

15. A series of folding-blades, the cross-head, its attached multipart former having end pieces or definers, means to contract the perimeter of said former to withdraw its central part from the folded edge of the blanks and then lift it from the folded blank, leaving the end definers in place, and means to thereafter move said end definers one toward the other to withdraw them from the infolded ends of the blank, substantially as described.

16. In a machine for folding collars and the like, a former, automatic means to cause it to descend on the blank to be infolded, and folding-blades one for each end and for the edge of said blank, combined with automatic means to actuate first one of the end blades, then the edge blade, and afterward the blade for the second end, substantially as described.

17. In a machine for folding collars and the like, the following instrumentalities, viz: a multipart former having two end pieces or definers normally in extended position, means to cause the former to descend in extended position on the blank to be folded, a series of folding-blades, one for each end and one for the edge of the blank, automatic means to actuate first one of said end blades, then the edge blade, and then the opposite end blade of the folding mechanism, means to contract said multipart former and withdraw its perimeter from within the infolded edge and ends of the blanks, substantially as described.

18. In a machine for folding collars and the like, the following instrumentalities, viz: a multipart former having two end pieces or definers, means to cause said former to descend on the blank to be folded, a folding mechanism presenting a series of folding-blades, one blade for each end and one for the edge of the blank, means to actuate first one of said end blades, then the edge blade, and then the opposite end blade, means to contract the perimeter of said multipart former and withdraw it from within the infolded edge and ends, and means thereafter to cause the said folding-blades to descend, pinch, crease, and set the infolded ends and edge of the blank, substantially as described.

19. In a machine for folding collars and the like, the following instrumentalities, viz: a feeding-plate to support the blank to be folded, means to removably fasten the blank thereto; carriers having means to removably engage said plate and carry it into the machine, substantially as described.

20. In a machine for folding collars and the like, the following instrumentalities, viz: a feeding-plate to support the blank to be folded, means to removably fasten the blank thereto; carriers having means to engage said plate and carry it into the machine, and a positioning device to which said carriers deliver said plate, substantially as described.

21. In a machine for folding collars and the like, the following instrumentalities, viz: a table, a plate-holding device, a feeding-plate provided with a suitable guide coöperating with said holding device, and a carrier having holding means to engage and carry said plate into the machine, substantially as described.

22. In a machine for folding collars and the like, the following instrumentalities, viz: a table having devices to hold and receive a feeding-plate; a feeding-plate having guides to coöperate with said devices; a carrier provided with means to engage said plate and take it into the machine and leave it there, and means thereafter to reëngage said plate and deliver it from said machine to said devices mounted on said table, substantially as described.

23. In a folding-machine; a feeding-plate; feeding mechanism, and automatically-operating locking devices between said plate and said feeding mechanism to enable said mechanism and plate to be automatically locked together to take said plate into the machine, and to thereafter enable said feeding mechanism and plate to be unlocked to be delivered from the machine, substantially as described.

24. The carrier, the feeding-plate to which is attached the blank to be folded, means between said carrier and said plate to couple the same together, a positioning device, and automatic means between said carrier and said positioning device to cause said feeding-plate to be given up to said positioning device, substantially as described.

25. In a machine for folding collars, a feeding-plate, folding mechanism to fold the blank on said plate, positioning devices to put said plate and blank in position to be folded, and to remove said plate with its folded blank from the folding mechanism; a carrier having a member to deliver said feeding-plate to said positioning device, and a second member actuated by said carrier to take said plate with its folded blank from said positioning device and feed it out of the machine, substantially as described.

26. In a machine for folding collars and the like, the following instrumentalities, viz: a feeding-plate to which is secured the blank to be folded, mechanism to infold the edge and ends of the blank held on said plate; a feeding-in carrier, a feeding-out carrier; and a positioning device whereby the feeding-in carrier takes said plate and delivers it automatically to said positioning device, and said positioning device, the blank having been folded automatically, delivers said plate and blank to the feeding-out carrier, substantially as described.

27. A feeding-plate for a folding-machine of the class described, said plate comprising longitudinally-adjustable portions, and means to extend them, whereby the plate may be accommodated to different lengths of collar-blanks and the like, and means removable to secure said blanks thereto, substantially as described.

28. A feeding-plate for a folding-machine of the class described, said plate being provided with movable transverse supports, means to adjust said supports as desired in order to accommodate different styles of blanks, and means removable to secure a blank to said plate, substantially as described.

29. A feeding-plate for a folding-machine of the class described, said feeding-plate comprising a body-piece, and extension-pieces longitudinally movable thereon, and removable sections provided with interlocking means to be secured between said sections as the latter are adjusted in order to accommodate different lengths of blanks, substantially as described.

30. In a machine for folding collars and the like, the combination with mechanism for infolding the edge and ends of a blank, of a feeding-plate provided with means for removably securing said blank to it, and feeding mechanism including a positioning device provided with means to hold and retain said plate and its blank immovably thereon during the folding operation, substantially as described.

31. In a machine for folding collars and the like, the combination with a feeding-plate adapted to receive and retain a blank to be folded, and provided with devices to retain said blank, of means to positively release said retaining devices from holding engagement with the blank after the latter has been folded, substantially as described.

32. In a machine for folding collars and the like, the combination with a former to rest on and hold the blank in place, of folding mechanism to fold one fold over transversely to and on another at a corner of the blank, and means to fold back from said corner the free end of said top fold at the corner, substantially as described.

33. In a machine for folding collars and the like, the combination with a former or means to hold the blank in place, of a folding-blade to fold one edge of a blank, and a second folding-blade to fold an adjacent edge of the blank, and means to move said former-blade from beneath said second fold as the latter blade is moving over in folding it, substantially as described.

34. In a machine for folding collars and the like, the combination with a former to hold the blank in place to be folded, of independent folding-blades to fold the adjacent end and edge of the blank, one of said blades having its corner yieldingly movable to permit it to move out of the way of the other blade, substantially as described.

35. In a machine for folding collars and the like, the combination with a former to rest on the blank to be folded, of folding-blades to fold the adjacent end and edge of the blank, means to raise said folding-blades from the folds formed thereby to permit the withdrawal of the former, and means to retract said former from beneath said folds, substantially as described.

36. In a machine for folding collars and the like, the combination with a former to rest on the blank to be folded, of folding-blades to fold the adjacent end and edge of the blank, means to raise said folding-blades from the folds formed thereby for the withdrawal of the former, means to retract said former from beneath said folds, and means to crease said folds after the withdrawal of said former, substantially as described.

37. In a machine for folding collars and the like, the combination with a collapsible former to rest on the blank to be folded, of folding-blades to infold the adjacent end and edge of the blank, and means to move inwardly from beneath the end fold the end of said former adjacent the end-folding blade, and thereafter to move the former from beneath said edge fold, substantially as described.

38. In a machine for folding collars and the like, a collapsible former comprising a middle portion and an end movable inwardly over said middle portion, the edge of the latter adjacent said end being beveled to permit said end to slide upwardly thereon, and means to move said end inwardly on said middle portion, substantially as described.

39. In a machine for folding collars and the like, the combination with a collapsible former to rest on the blank to be folded, said former when extended presenting a continuous edge without gaps, of folding-blades to fold the two ends and edge of the blank, and means to collapse said former by moving the ends of said former one toward the other from the end folds of the blank, and to move the longer edge of the former from beneath the edge fold of the blank, substantially as described.

40. In a machine for folding collars and the like, the combination with a former to rest on the blank to be folded, of folding-blades to fold the blank, and means to collapse or move inwardly the end pieces of the former, and means to move rearwardly the main body of the former from beneath the edge or front fold of the blank before the opposite back fold is made, and means to move the former from beneath said back fold when it is made, substantially as described.

41. In a machine for folding collars and the like, the combination with a former to rest on the blank to be folded, a folding-blade and means to move it to fold one edge of the blank, means to shift said former from beneath said fold and to place it for an opposite fold, a second folding-blade opposite said first blade to fold the edge of the blank opposite said first fold, and means to move it for said second fold, substantially as described.

42. In a machine for folding collars and the like, the combination with a former to rest on the blank to be folded, a folding-blade and means to move it to fold one edge of the blank, means to shift said former from beneath said fold and to place it for an opposite fold, a second folding-blade opposite said first blade to fold the edge of the blank opposite said first fold, means to move it for said second fold, and means to shift said former from beneath said second fold, substantially as described.

43. In a machine for folding collars and the like, the combination with a former to rest on a blank to be folded, of a folding-blade to fold one edge of the blank, means to raise said folding-blade from the fold, means to shift said former from beneath said fold while said blade is raised and to move it back again on top of the fold, and a second folding-blade to fold an edge opposite said first fold, substantially as described.

44. In a machine for folding collars and the like, the combination with means to hold a blank to be folded, and folding mechanism including folding-blades to fold the blank, of automatic means to lift said blades after said folding and bring them forcibly down on the folds to crease them, substantially as described.

45. In a machine for folding collars and the like, the combination with means to hold a blank to be folded, of two adjacent independent folding-blades to fold said blank at a corner, and means to move said blades for folding, one of said blades having an independently-movable corner, and means to lift said corner from the path of and as the other blade moves forward, substantially as described.

46. In a machine for folding collars and the like, the combination with a collapsible former having an end definer to rest upon a blank to be folded, means to move inwardly said end definer without moving the middle portion of the former, means to raise the former, and means to restore it to its original length, of an end-folding blade next to said end definer, and an adjacent side-folding blade, means to move them to fold the end and side edges of the blank over said former, means to move back said end-folding blade from beneath said raised former, and means to lower the latter, substantially as described.

47. In a machine for folding collars and the like, the combination with a former to hold a blank to be folded, of adjacent independent folding-blades to fold said blank at a corner, and means to move said blades for said folding, one of said blades having a thin edge portion at its end adjacent said corner to permit the adjacent end of said other folding-blade to ride over it in making its fold, substantially as described.

48. In a machine for folding collars and the like, the combination with a bed to receive a blank, a cross-head over said bed, and a former carried by said cross-head and adapted to rest on said blank as the latter is being folded, of mechanism to shift said former obliquely to and from said bed without moving the blank, substantially as described.

49. In a machine for folding collars and the like, the combination with a bed to receive a blank, a cross-head over said bed, and a former carried by said cross-head and adapted to rest on said blank as the latter is being folded, of mechanism to shift said former obliquely to and from said bed, and means to restore said former in approximately the same oblique path of movement, substantially as described.

50. In a machine for folding collars and the like, the combination with a bed to receive a blank, a cross-head over said bed, and a collapsible former carried by said cross-head and adapted to rest on said blank as the latter is being folded, of means to retract or move inwardly one end of said former, means to shift said former obliquely to and from said bed, and means to shift it back into vertical position over its previous lowered position, ready to be lowered again to the latter position, substantially as described.

51. In a machine for folding collars and the like, the combination with a former to rest upon a blank to be folded, independent folding-blades to fold said blank, and means to move said blades dissimultaneously to make said folds, of means to crease certain of said folds after they are made and before other of said folds are made, substantially as described.

52. In a machine for folding collars and the like, a folder mounted on the machine and carrying a folding-blade at its front edge, said folding-blade being movably mounted on said folder to move transversely thereof, and means to move said blade in its said transverse movement, substantially as described.

53. In a machine for folding collars and the like, a former, a bridge to hold it, and a hanger to support said bridge, said former comprising independent pieces having dovetailed connection with said bridge, whereby they may be adjusted along the latter toward and from each other, said pieces being adjustably secured in slotted brackets provided therefor adjacent said hangers, and extension-sections having transverse dovetails to enter transverse grooves in said bridge, whereby one or more of said sections may be interposed between said independent pieces, and means to lock said sections in place, substantially as described.

54. In a machine for folding collars and the like, a former, a bridge to hold it, and a hanger to support said bridge, said hanger being provided with ways, and said bridge being adjustable on said ways transversely of said former, said former comprising independent pieces having dovetailed connection with said bridge, whereby they may be adjusted along the latter toward and from each other, said pieces being adjustably secured in slotted brackets provided therefor adjacent said hangers, and extension-sections having dovetails to enter transverse grooves in said bridge, whereby one or more of said sections may be interposed between said independent pieces, and means to lock said sections in place, substantially as described.

55. In a machine for folding collars and the like, a former, a bridge to hold it, and hangers supporting said bridge, said former comprising independent pieces longitudinally adjustable on said bridge, and said bridge being transversely adjustable on said hangers, substantially as described.

56. In a machine for folding collars and the like, a bed adapted to receive a plurality of blanks to be folded and having a former and folding mechanism for each blank, said folding mechanism including end-folding blades to fold the ends of said blanks, and means to move simultaneously one of said end blades for each of said blanks, and means to move simultaneously the other of said end blades for each of said blanks, said two sets of simultaneously-moving end blades being moved dissimultaneously, whereby one end of each blank is folded before the other end thereof, substantially as described.

57. In a machine for folding collars and the like, the combination with a former to rest on a blank to be folded, of a folder to fold an edge of the blank, said folder being pivotally mounted on the machine, means to move said folder to make a fold, and means to engage said pivoted folder as it moves into its forward folding position, said means forcing said folder down with a yielding pressure, substantially as described.

58. In a machine for folding collars and the like, a folder pivotally mounted on the machine and having a blade-like portion to engage a blank and make a fold, and yielding means intermittingly engaging said folder for maintaining it with a downward pressure when in folding position, substantially as described.

59. In a machine for folding collars and the like, the combination with a former adapted to rest on a blank to be folded, of independent folding-blades to fold the edges of the blank to make an acute-angled corner, a corner device to lay over the projecting edge of the top one of said folds and fold it in from said corner, and means to raise said corner device above said folded-back corner and retract it from and without engaging the latter, substantially as described.

60. In a machine for folding collars and the like, the combination with a former adapted to rest on a blank to be folded, of independent folding-blades to fold the edges of the blank to make an acute-angled corner, means to move one of said blades to make its fold before the other, said second blade being provided with a projecting finger adjacent said acute-angled corner, and means to move said second blade forward to make its fold and obliquely away from said first fold, whereby its said finger folds over within the corner the projecting edge of its fold, substantially as described.

61. In a machine for folding collars and the like, the combination with a collapsible former to rest on a blank to be folded, and folding mechanism, of means to retract the middle portion of the former from beneath the folded edge and to raise it, and means to move inwardly toward each other the end portions of the former from beneath the end folds, substantially as described.

62. In a machine for folding collars and the like, the combination with a collapsible former to rest on a blank to be folded, and folding mechanism, of means to retract the middle portion of the former from beneath the folded edge and to raise it, means to move inwardly toward each other the end portions of the former from beneath the end folds, and means thereafter to separate said end portions and to lower the middle portion in line therewith as before, substantially as described.

63. In a machine for folding collars and the like, the combination with a collapsible former, of means to move the middle portion thereof obliquely upward, and means to move an end portion of the former obliquely forward into longitudinal alinement with said middle portion, substantially as described.

64. In a machine for folding collars and the like, a collapsible former having separate end and side portions normally extended and having an unbroken forming edge or perimeter, and means to collapse said separate portions and move them relatively inward toward each other, whereby the normal perimeter of the former is contracted, substantially as described.

65. In a machine for folding collars and the like, a collapsible former composed of interlocked separate pieces, and means to disengage said pieces from their interlocked position and move them inwardly toward each other, to shorten the perimeter of the former, substantially as described.

66. In a machine for folding collars and the like, a former, a frame carrying it, a support in which said frame is movable, said former having sliding connection with said frame, a bell-crank mounted on said support and connected to said former, and means to move said bell-crank independently of said frame, whereby the former is shifted in its sliding engagement with said frame, substantially as described.

67. In a machine for folding collars and the like, a former, a frame carrying it, a support in which said frame is movable, said former having sliding connection with said frame, a bell-crank mounted on said support and connected to said former, and means to move said bell-crank independently of said frame, whereby the former is shifted in its sliding engagement with said frame, said moving means including a plunger mounted on said support, and tripping means carried by said frame intermittingly to engage said plunger, substantially as described.

68. In a machine for folding collars and the like, a former, a frame carrying it, a support in which said frame is movable, said former having sliding connection with said frame, a bell-crank mounted on said support and connected to said former, and means to move said bell-crank independently of said frame, whereby the former is shifted in its sliding engagement with said frame, said moving means including a plunger mounted on said support, tripping means carried by said frame intermittingly to engage said plunger, and a spring normally holding said plunger in one extreme position to be engaged by said tripping means and moved in an opposite position by the movement of said frame, substantially as described.

69. In a machine for folding collars and the like, a collapsible former comprising a middle portion and opposite end portions, and means to swing said end portions relatively to said middle portion, whereby the angle of their adjustment is changed, substantially as described.

70. In a machine for folding collars and the like, a former comprising a middle portion and end portions, said middle portion being composed of two independent pieces longitudinally adjustable from each other, means to correspondingly adjust said end portions, and extension-sections to be inserted between the separated middle pieces, substantially as described.

71. In a machine for folding collars and the like, the combination with a collapsible former having separate end and side portions, each comprising two or more independent pieces, of means independently to move said pieces, whereby the perimeter of said former may be contracted, substantially as described.

72. In a machine for folding collars and the like, folding devices to fold a blank, a collapsible former having two longitudinal portions adapted to form and define the top and bottom respectively of a stand-up collar or the like, and mechanism to move said longitudinal portions independently from beneath the folds made over the same by said folding mechanism, substantially as described.

73. In a machine for folding collars and the like, folding devices to fold a blank, and a former comprising a longitudinal part and an end portion, the latter including two independent pieces, combined with mechanism to move said middle part from beneath a fold or folds of the blank and raise it thereover, and means independently to move said end pieces from beneath the adjacent folds into position beneath said raised middle part, substantially as described.

74. In a machine for folding collars and the like, the combination with means to hold the blank in place to be folded, of a folding-blade to fold an edge of said blank, said blade having a movable plate constituting a portion of its folding edge, and means to move said plate laterally relatively to the rest of said blade, substantially as described.

75. In a machine for folding collars and the like, the combination with means to hold a blank in place to be folded, of a folding-blade to fold an edge of the blank, a gatherer carried by said blade to embrace a fold of the blank, and means to move said gatherer relatively to said blade for creasing down said gathered fold, substantially as described.

76. In a machine for folding collars and the like, the combination with a former to hold a blank in place to be folded, of a folder having its front edge constituting a folding-blade to fold the adjacent edge of said blank, a portion of said front edge being vertically movable therefrom, and a block on said former in front of said movable portion, said block being inclined at its front edge to cause said movable portion to ride up on the block, and said block having a free limited movement on said former, in order to carry said movable portion back a portion of its movement in raised position, to free it from the infold of the blank, substantially as described.

77. In a machine for folding collars and the like, the combination with a former to hold a blank to be folded, and independent folding-blades to fold said blank at a corner, of means to raise an A-shaped portion of the blank at the corner being folded, and to lay over said A-shaped portion, back from the corner, substantially as described.

78. In a machine for folding collars and the like, the combination with a former to hold a blank to be folded, of two folding-blades to fold adjacent edges of the blank, one of said blades having a movable portion at its front edge adjacent the meeting corner of said blades, an upturned knife-edge being carried on said movable portion, said other holding-blade having coöperating fingers to crease the material of the blank down at each side of said knife-edge, and means to move the blade carrying said movable portion first, and means subsequently to move the blade carrying said fingers, substantially as described.

79. In a machine for folding collars and the like, a former, a carriage and its folding-blades to coöperate with said former in folding a blank, and means to vertically lift one edge of said carriage to permit the withdrawal of said former, substantially as described.

80. In a machine for folding collars and the like, a former to rest on a blank to be folded; independent folding-blades to fold the blank, and operating mechanism including a rock-shaft, means to rock it, cams on said shaft, and independent lifting-bars from said cams to said independent folding-blades, whereby said folding-blades are independently lifted, substantially as described.

81. In a machine for folding collars and the like, a former to rest on a blank to be folded, independent folding-blades to fold the blank, and operating mechanism including a rock-shaft, means to rock it, cams on said shaft, and independent lifting-bars from said cams to said independent folding-blades, whereby said folding-blades are independently lifted, said cams being provided with movable cam projections, and means to hold said cam projections extended when the rock-shaft turns in one direction, and to permit them to be depressed when the rock-shaft turns in an opposite direction, whereby the lifting movements of said blades differ with the rocking of said shaft, substantially as described.

82. In a machine for folding collars and the like, a former to rest on a blank to be folded, independent folding-blades to fold the blank, and operating mechanism including a rock-shaft, means to rock it, cams on said shaft, independent lifting-bars from said cams to said independent folding-blades, whereby said folding-blades are independently lifted, and a second rock-shaft receiving motion from said rocking means, and independent connections between said independent blades and said second shaft to move said blades toward and from said former, substantially as described.

83. In a machine for folding collars and the like, a former to rest on a blank to be folded, independent folding-blades to fold the blank, and operating mechanism including a rock-shaft, means to rock it, cams on said shaft, independent lifting-bars from said cams to said independent folding-blades, whereby said folding-blades are independently lifted, lifting-bars for said former, and connections between the latter lifting-bars and said rock-shaft, for lifting said bars, substantially as described.

84. In a machine for folding collars and the like, a positioning device to properly place a blank in the machine, a former to engage the blank, folding-blades to fold the blank over said former, and operating mechanism therefor including a rock-shaft, lifting-bars operated therefrom to lift said blades, lifting-bars to lift said former, operating connections between the latter bars and said rock-shaft, and lifters extending from said latter bars to engage said positioning device, whereby the latter is lifted and lowered at the same time with said former, substantially as described.

85. In a machine for folding collars and the like, folding mechanism to fold a blank, and means to shift said folding mechanism, said means including a rock-shaft and a T-lever, said rock-shaft being provided with a bell-crank having at its opposite ends dogs pivotally mounted thereon to move away from each other and held against movement toward each other, and means tending to maintain said dogs in radial position, whereby as said shaft rocks it causes the forward dog to engage and move the depending arm of the T-lever, and the following dog yields and passes said T-lever, being automatically restored for the return movement, substantially as described.

86. In a machine for folding collars and the like, an end-folder to fold the end of a blank, a track along which said folder slides, a rock-shaft and lever to move said folder on said track, a roll depending from one end of said rock-shaft, and a rocker-arm having a latch-like projection to engage said roll, said projection being pivoted to move the roll in one direction and to yield in the other direction, substantially as described.

87. In a machine for folding collars and the like, a bed provided with longitudinal ways and comprising independent receiving-plates movable on said ways, said plates being formed to receive a blank to be folded, and spacing-blocks to enter between the separated receiving-plates, substantially as described.

88. A bed provided with longitudinal ways and transverse ways, and having independent receiving-plates movable on said longitudinal ways, said plates being formed to receive a blank to be folded, means coöperating with said plates to move them, and spacing-blocks movable on said transverse ways to enter between the separate receiving-plates, said blocks and the adjacent ends of said receiving-plates being provided with interlocking shoulders, substantially as described.

89. A bed provided with longitudinal ways and transverse ways, and having independent receiving-plates movable on said longitudinal ways, said plates being formed to receive a blank to be folded, and spacing-blocks movable on said transverse ways to enter between the separate receiving-plates, said blocks and the adjacent ends of said receiving-plates being provided with interlocking shoulders, said plates and blocks and their said ways being dovetailed together, substantially as described.

90. In a machine for folding collars and the like, a table having a receiving-shelf and a delivering-shelf, said shelves being provided with transverse ways to receive the lugs of feeding-plates, said receiving-shelf also having automatic means to engage and retain a plate delivered thereto, substantially as described.

91. In a machine for folding collars and the like, a table having a receiving-shelf and a delivering-shelf, said shelves being provided with transverse ways to receive the lugs of feeding-plates, said receiving-shelf also having automatic means to engage and retain a plate delivered thereto, and said delivering-shelf having buffers against which the lugs of the plates may rest as they are seized by the feeding mechanism of the machine, substantially as described.

92. In a machine for folding collars and the like, the combination with a table provided with receiving and delivering shelves, of a feeding-plate provided with depending lugs, said shelves having ways formed therein registering with said lugs to receive the latter and thereby retain the plate respectively for delivery and as it is received, the delivering-shelf being provided with buffer-blocks to engage said lugs, and a yielding device normally holding said blocks forward from the ends of said ways, substantially as described.

93. In a machine for folding collars and the like, a former composed of a plurality of adjustable forming portions, and means to change the shape of said former by their adjustment, substantially as described.

94. In a machine for folding collars and the like, a former to form a blank to be folded, said former including two independent pieces longitudinally adjustable from each other, and extension-sections to be inserted between said pieces, substantially as described.

95. In a machine for folding collars and the like, folding mechanism to fold a blank, and means to shift said folding mechanism, said means including a T-lever, a shaft, and movable dogs pivotally mounted on said shaft to move from their normal position in one direction, means to prevent said dogs from moving from said normal position in an opposite direction, and means tending to maintain said dogs in said normal position, to engage a depending arm of said T-lever, whereby, as said shaft moves, one dog engages said depending arm of the T-lever and moves it, and the other dog yields and passes said T-lever, being automatically restored for the return movement, substantially as described.

96. In a machine for folding collars and the like, a bed provided with longitudinal ways and transverse ways, and independent receiving-plates moving on said longitudinal ways, said plates being formed to receive a blank to be folded, and spacing-blocks movable on said transverse ways to enter between the separated receiving-plates, substantially as described.

97. In a machine for folding collars and the like, a bed provided with longitudinal ways and transverse ways, and independent receiving-plates moving on said longitudinal ways, said plates being formed to receive a blank to be folded, and spacing-blocks movable on said transverse ways to enter between the separated receiving-plates, said blocks and the adjacent ends of said receiving-plates being provided with interlocking shoulders, substantially as described.

98. The cross-head, and its attached multipart former having a middle portion and independent end pieces to descend on the blank to be folded, means to move said end pieces in a straight line one toward the other, and relatively to said middle portion, and automatic means to operate said cross-head up and down, substantially as described.

99. In a machine for folding collars and the like, a movable cross-head, and its attached multipart former, and mechanism carried by said movable cross-head for automatically collapsing said multipart former, substantially as described.

100. In a machine for folding collars and the like, a movable cross-head, and former carried thereby and movable relatively to said cross-head, and mechanism for automatically moving said former relatively to said cross-head, substantially as described.

101. In a machine for folding collars and the like, a movable cross-head, and former carried thereby and movable relatively to said cross-head, and mechanism for automatically moving said former relatively to said cross-head, said mechanism including means for giving said former a compound lateral and rearward movement, substantially as described.

102. In a machine for folding collars and the like, a movable cross-head, and former carried thereby and movable relatively to said cross-head, and mechanism for automatically moving said former relatively to said cross-head, said mechanism including means for giving said former a compound lateral and forward-and-rearward movement, substantially as described.

103. In a machine for folding collars and the like, a movable cross-head, and former carried thereby and movable relatively to said cross-head, and mechanism for automatically moving said former relatively to said cross-head, said mechanism including means for shifting said former from beneath certain of the folds of a blank being folded, and means for momentarily raising said former from the blank, substantially as described.

104. In a machine for folding collars and the like, a movable cross-head, a rotary shaft journaled therein, a former carried by said cross-head and movable relatively thereto by said shaft, and means for rotating said shaft, substantially as described.

105. In a machine for folding collars and the like, a movable cross-head, a rotary shaft journaled therein, a former carried by said cross-head and movable relatively thereto by said shaft, and means for intermittingly rotating said shaft, substantially as described.

106. In a machine for folding collars and the like, a carrier for feeding the blanks to the machine, a plurality of cross-heads, each cross-head being provided with a former for engaging and holding said blanks, mechanism for alternately moving said cross-heads up and down, and means to operate said carrier intermittingly as one or the other of said cross-heads is in raised position, substantially as described.

107. In a machine for folding collars and the like, a carrier for feeding the blanks to the machine, a plurality of cross-heads, each cross-head being provided with a former for engaging and holding said blanks, mechanism for alternately moving said cross-heads up and down, and means to operate said carrier intermittingly as one or the other of said cross-heads is in raised position, said cross-heads having a dwell or period of rest in their raised positions during the operation of said carrier, substantially as described.

108. In a machine for folding collars and the like, a plurality of cross-heads, means to intermittingly raise said cross-heads out of time with each other, whereby one is up when another is down, feeding mechanism for carrying the blanks, and means for operating said feeding mechanism to deliver a folded blank from the machine and carry an unfolded blank to the machine as each cross-head is in raised position, substantially as described.

109. In a machine for folding collars and the like, a plurality of sets of folding mechanisms, a plurality of formers coöperating therewith, and mechanism for automatically operating said several sets of folding mechanisms and formers out of time with each other, whereby folding operations are proceeding automatically and continuously in the machine, substantially as described.

110. In a machine for folding collars and the like, a plurality of sets of folding mechanisms, a plurality of formers coöperating therewith, and mechanism for automatically operating said several sets of folding mechanisms and formers out of time with each other, whereby folding operations are proceeding automatically and continuously in the machine, feeding mechanism for carrying the blanks to the machine and delivering them therefrom, and means for operating said feeding mechanism to coöperate successively with said plurality of sets of mechanisms for supplying and delivering blanks at the proper time for each of said sets of mechanism, substantially as described.

111. In a machine for folding collars and the like, a former to rest upon and hold stationary a blank to be folded, said former having a narrow single-piece end for defining a narrow end of the blank, such as a collar-tab or the end of a collar-band, mechanism for infolding said blank at said end, other mechanism for infolding the rest of said blank, and means to withdraw said former from beneath the folds of said tab or narrow end of the blank in the direction of the length of said narrow end, after said end has been folded and before the entire folding operation is completed, substantially as described.

112. In a machine for folding collars and the like, the combination with a former to rest on a blank to be folded, a plurality of folding-blades for infolding a plurality of the ends and edges of the blank, mechanism for moving said blades dissimultaneously, and means for shifting said former from beneath a fold before another fold is made and to place it for said other fold before the folding-blade operates to make the said latter fold, substantially as described.

113. In a machine for folding collars and the like, the combination with a former to rest on a blank to be folded, of a plurality of folding-blades for infolding a plurality of the ends and edges of the blank, mechanism for moving said blades dissimultaneously, and means for shifting said former from beneath and placing it on top of one fold and in place for another fold before said other fold is infolded, substantially as described.

114. In a machine for folding collars and the like, the combination with a former to rest on a blank to be folded, of a plurality of folding-blades, mechanism for moving said blades dissimultaneously, means for shifting said former from beneath one fold into position for another fold, and means for holding the blank against displacement during said shifting movement of the former, substantially as described.

115. In a machine for folding collars and the like, a plurality of folding-blades for infolding the various ends and edges of the blank, and automatic mechanism for moving said blades in succession to make the folds one after the other with the ends of the first fold overlapped by subsequent folds, and the last fold overlapping the preceeding folds, substantially as described.

116. In a machine for folding collars and the like, a plurality of folding-blades for infolding the various ends and edges of the blank, automatic mechanism for moving said blades in succession to make the folds one after the other with the ends of the first fold overlapped by subsequent folds, and the last fold overlapping the preceding folds, a former for holding the blank as it is being infolded, and means for shifting said former at times from beneath a fold and placing it for a subsequent fold, said shifting movements taking place between successive folding movements of the blades, substantially as described.

117. In a machine for folding collars and the like, the combination with a former to rest on a blank to be folded, of a folder to fold an edge of the blank, said folder including a blade to do the folding, means to move the blade into folding position, and a spring depressing said blade when in said folding position, substantially as described.

118. In a machine for folding collars and the like, the combination with a former to rest on a blank to be folded, of a folder to fold an edge of the blank, said folder including a blade to do the folding, means to move the blade into folding position, and a spring depressing said blade when in said folding position, and means to relieve the blade from its depressed condition when the folding is completed, substantially as described.

In testimony whereof I have signed my name to this specification in the presence of two subscribing witnesses.

ALBERT D. FENWICK.

Witnesses:
 GEO. H. MAXWELL,
 GEO. W. GREGORY.

It is hereby certified that in Letters Patent No. 606,528, granted June 28, 1898, upon the application of Albert D. Fenwick, of Philadelphia, Pennsylvania, for an improvement in "Machines for Forming and Folding Collar-Blanks or the Like," errors appear in the printed specification requiring correction, as follows: In lines 58 and 66, page 23, the word "removable" should read *removably;* and that the said Letters Patent should be read with these corrections therein that the same may conform to the record of the case in the Patent Office.

Signed, countersigned, and sealed this 12th day of July, A. D., 1898.

[SEAL.]

WEBSTER DAVIS,
*Assistant Secretary of the Interior.*

Countersigned:
C. H. DUELL,
*Commissioner of Patents.*